United States Patent
Sathe et al.

(10) Patent No.: US 12,299,209 B2
(45) Date of Patent: May 13, 2025

(54) HUMAN-COMPUTER INTERFACE SYSTEM

(71) Applicant: Sensel, Inc., Sunnyvale, CA (US)

(72) Inventors: Ninad Sathe, Sunnyvale, CA (US); Ilya Daniel Rosenberg, Sunnyvale, CA (US); Jacob Terracina, Sunnyvale, CA (US)

(73) Assignee: Sensel, Inc., Sunnyvale, CA (US)

( * ) Notice: Subject to any disclaimer, the term of this patent is extended or adjusted under 35 U.S.C. 154(b) by 41 days.

(21) Appl. No.: 18/141,308

(22) Filed: Apr. 28, 2023

(65) Prior Publication Data

US 2023/0266829 A1  Aug. 24, 2023

Related U.S. Application Data

(63) Continuation-in-part of application No. 18/099,698, filed on Jan. 20, 2023, now Pat. No. 12,050,748, and
(Continued)

(51) Int. Cl.
*G06F 3/02* (2006.01)
*G06F 3/01* (2006.01)
(Continued)

(52) U.S. Cl.
CPC ............ *G06F 3/0202* (2013.01); *G06F 3/016* (2013.01); *H01H 13/85* (2013.01);
(Continued)

(58) Field of Classification Search
CPC ........ G06F 3/0202; G06F 3/016; G06F 1/169; G06F 3/03547; G06F 3/04144;
(Continued)

(56) References Cited

U.S. PATENT DOCUMENTS

| 4,959,631 A | 9/1990 | Hasegawa et al. |
| 7,663,607 B2 | 2/2010 | Hotelling et al. |

(Continued)

FOREIGN PATENT DOCUMENTS

| CN | 102341768 A | 2/2012 |
| CN | 101828161 B | 4/2013 |

(Continued)

OTHER PUBLICATIONS

U.S. Appl. No. 17/367,572, filed Jul. 5, 2021, James Junus.
(Continued)

*Primary Examiner* — Rodney Amadiz
(74) *Attorney, Agent, or Firm* — Run8 Patent Group, LLC; Peter Miller; Alexander Rodriguez

(57) ABSTRACT

One variation for a seamless touch sensor includes: a substrate, a baseplate, a haptic actuator, a cover layer, and a controller. The substrate includes: a top layer including a set of drive and sense electrode pairs; and a bottom layer including an array of force sensors. The baseplate is: arranged below the substrate; and including an array of spring elements coupling the baseplate to the substrate. The haptic actuator is arranged below the substrate and includes: a multi-layer inductor; and a first magnetic element facing the multi-layer inductor. The cover layer is arranged over the substrate to define a continuous surface defining an active region and a inactive touch region. The controller is configured to drive an oscillating voltage across the multi-layer inductor to: induce alternating magnetic coupling between the multi-layer inductor and the magnetic element; and oscillate the active touch region of the cover layer relative to the magnetic element.

20 Claims, 20 Drawing Sheets

Related U.S. Application Data a continuation-in-part of application No. 17/946,931, filed on Sep. 16, 2022, now Pat. No. 12,093,458, and a continuation-in-part of application No. 17/855,747, filed on Jun. 30, 2022, now Pat. No. 11,703,950, said application No. 18/099,698 is a continuation of application No. 17/669,209, filed on Feb. 10, 2022, now Pat. No. 11,592,935, said application No. 17/946,931 is a continuation of application No. 17/626,669, filed as application No. PCT/US2021/053660 on Oct. 5, 2021, now Pat. No. 11,880,506, said application No. 17/855,747 is a continuation of application No. 17/367,572, filed on Jul. 5, 2021, now Pat. No. 11,422,631, said application No. 17/669,209 is a continuation of application No. 17/191,636, filed on Mar. 3, 2021, now Pat. No. 11,281,330, said application No. 17/367,572 is a continuation-in-part of application No. 17/092,002, filed on Nov. 6, 2020, now Pat. No. 11,360,563, which is a continuation of application No. 16/297,426, filed on Mar. 8, 2019, now Pat. No. 10,866,642, which is a continuation-in-part of application No. 15/845,751, filed on Dec. 18, 2017, now Pat. No. 10,564,839, which is a continuation-in-part of application No. 15/476,732, filed on Mar. 31, 2017, now Pat. No. 10,331,265.

(60) Provisional application No. 63/336,825, filed on Apr. 29, 2022, provisional application No. 63/088,359, filed on Oct. 6, 2020, provisional application No. 63/063,168, filed on Aug. 7, 2020, provisional application No. 63/048,071, filed on Jul. 3, 2020, provisional application No. 63/040,433, filed on Jun. 17, 2020, provisional application No. 62/984,448, filed on Mar. 3, 2020, provisional application No. 62/640,138, filed on Mar. 8, 2018, provisional application No. 62/343,453, filed on May 31, 2016, provisional application No. 62/316,417, filed on Mar. 16, 2016.

(51) Int. Cl.
 H01H 13/85 (2006.01)
 *H01H 3/00* (2006.01)
 *H01H 13/785* (2006.01)

(52) U.S. Cl.
 CPC ..... *H01H 2003/008* (2013.01); *H01H 13/785* (2013.01); *H01H 2201/036* (2013.01); *H01H 2215/05* (2013.01)

(58) Field of Classification Search
 CPC ....... G06F 3/0446; G06F 3/045; H01H 13/85; H01H 13/785; H01H 2003/008; H01H 2201/036; H01H 2215/05
 See application file for complete search history.

(56) References Cited

U.S. PATENT DOCUMENTS

| | | | |
|---|---|---|---|
| 8,981,242 B2 | 3/2015 | Bayramoglu | |
| 9,158,377 B2 | 10/2015 | Shinozaki | |
| 9,229,592 B2 | 1/2016 | Bulea et al. | |
| 9,454,268 B2 | 9/2016 | Badaye et al. | |
| 9,459,736 B2 | 10/2016 | Badaye et al. | |
| 9,829,981 B1 | 11/2017 | Ji | |
| 9,983,757 B2 | 5/2018 | Porter et al. | |
| 10,101,859 B2 | 10/2018 | Jin | |
| 10,209,846 B2 | 2/2019 | Wang et al. | |
| 10,459,542 B1 | 10/2019 | Costante et al. | |
| 10,495,486 B2 | 12/2019 | Liu | |
| 10,564,839 B2 | 2/2020 | Rosenberg et al. |
| 10,585,481 B2 | 3/2020 | Czelnik et al. |
| 10,635,248 B2 | 4/2020 | Hinson et al. |
| 10,963,059 B2 | 3/2021 | Rosenberg et al. |
| 11,360,563 B2 | 6/2022 | Rosenberg et al. |
| 11,422,631 B2 | 8/2022 | Junus et al. |
| 2002/0149561 A1 | 10/2002 | Fukumoto et al. |
| 2003/0095095 A1 | 5/2003 | Pihlaja |
| 2005/0038944 A1 | 2/2005 | Harada et al. |
| 2005/0180082 A1 | 8/2005 | Nakamura et al. |
| 2006/0279548 A1 | 12/2006 | Geaghan |
| 2007/0015966 A1 | 1/2007 | Niwa et al. |
| 2008/0202251 A1 | 8/2008 | Serban et al. |
| 2009/0256817 A1 | 10/2009 | Perlin et al. |
| 2010/0128002 A1 | 5/2010 | Stacy et al. |
| 2010/0141606 A1 | 6/2010 | Bae et al. |
| 2010/0156818 A1 | 6/2010 | Burrough et al. |
| 2010/0189314 A1 | 7/2010 | Benkley et al. |
| 2010/0231530 A1 | 9/2010 | Lin et al. |
| 2010/0253633 A1 | 10/2010 | Nakayama et al. |
| 2011/0025631 A1 | 2/2011 | Han |
| 2011/0025648 A1 | 2/2011 | Laurent et al. |
| 2011/0090151 A1 | 4/2011 | Huang et al. |
| 2011/0134061 A1 | 6/2011 | Lim |
| 2011/0248957 A1 | 10/2011 | Park |
| 2012/0050207 A1 | 3/2012 | Westhues et al. |
| 2012/0068938 A1 | 3/2012 | Kontio |
| 2012/0068971 A1 | 3/2012 | Pemberton-Pigott |
| 2012/0154316 A1 | 6/2012 | Kono |
| 2012/0188194 A1 | 7/2012 | Sulem et al. |
| 2012/0293450 A1 | 11/2012 | Dietz et al. |
| 2013/0106718 A1 | 5/2013 | Sundara-Rajan |
| 2013/0187742 A1 | 7/2013 | Porter et al. |
| 2013/0264179 A1 | 10/2013 | Ryonai et al. |
| 2014/0002113 A1 | 1/2014 | Schediwy et al. |
| 2014/0008203 A1 | 1/2014 | Nathan et al. |
| 2014/0055407 A1 | 2/2014 | Lee et al. |
| 2014/0347311 A1 | 11/2014 | Joharapurkar et al. |
| 2014/0362014 A1 | 12/2014 | Ullrich et al. |
| 2015/0002416 A1 | 1/2015 | Koike et al. |
| 2015/0054768 A1 | 2/2015 | Grant et al. |
| 2015/0091858 A1 | 4/2015 | Rosenberg et al. |
| 2015/0153829 A1 | 6/2015 | Shiraishi |
| 2015/0185848 A1 | 7/2015 | Levesque et al. |
| 2016/0062574 A1 | 3/2016 | Anzures et al. |
| 2016/0165931 A1 | 6/2016 | Lengerich et al. |
| 2016/0209441 A1 | 7/2016 | Mazzeo et al. |
| 2016/0259411 A1 | 9/2016 | Yoneoka et al. |
| 2016/0370899 A1 | 12/2016 | Chang et al. |
| 2017/0076885 A1 | 3/2017 | Stryker |
| 2017/0285848 A1 | 10/2017 | Rosenberg et al. |
| 2017/0336891 A1 | 11/2017 | Rosenberg et al. |
| 2017/0336904 A1 | 11/2017 | Hsieh et al. |
| 2017/0344115 A1 | 11/2017 | Ji |
| 2018/0059791 A1 | 3/2018 | Hajati |
| 2019/0196646 A1 | 6/2019 | Rosenberg et al. |
| 2019/0212842 A1 | 7/2019 | Hinson et al. |
| 2019/0212874 A1 | 7/2019 | Nathan et al. |
| 2019/0265834 A1 | 8/2019 | Rosenberg et al. |
| 2019/0339776 A1 | 11/2019 | Rosenberg et al. |
| 2021/0109615 A1 | 4/2021 | Hu et al. |
| 2021/0333880 A1 | 10/2021 | Junus et al. |

FOREIGN PATENT DOCUMENTS

| | | |
|---|---|---|
| CN | 104199563 B | 3/2017 |
| EP | 0469255 A1 | 2/1992 |
| EP | 2375308 A1 | 10/2011 |
| EP | 3043240 A1 | 7/2016 |
| JP | H1185380 A | 3/1999 |
| JP | H11212725 A | 8/1999 |
| JP | 2002149312 A | 5/2002 |
| JP | 2004310518 A | 11/2004 |
| JP | 2007026344 A | 2/2007 |
| JP | 2008192092 A | 8/2008 |
| JP | 2011048409 A | 3/2011 |
| JP | 2011048665 A | 3/2011 |
| JP | 2011209785 A | 10/2011 |
| JP | 2012027875 A | 2/2012 |

(56) References Cited

FOREIGN PATENT DOCUMENTS

| JP | 2012048407 A | 3/2012 |
|---|---|---|
| JP | 2012181833 A | 9/2012 |
| JP | 2012522317 A | 9/2012 |
| JP | 2015002853 A | 1/2015 |
| JP | 2015125666 A | 7/2015 |
| WO | 2011111906 A1 | 9/2011 |
| WO | 2012081182 A1 | 6/2012 |
| WO | 2014092758 A1 | 6/2014 |
| WO | 2018112466 A1 | 6/2018 |
| WO | 2019021466 A1 | 1/2019 |
| WO | 2019156672 A1 | 8/2019 |

OTHER PUBLICATIONS

ESSR received in EP Application No. 19764741.5 Dated Nov. 15, 2021.
International Search Report and Written Opinion for International Patent Application No. PCT/US21/053660, mailed on Dec. 30, 2021, 12 pages.
International Search Report received in PCT/US19/21466 dated Jun. 21, 2019.
International Search Report received in PCT/US21/0753 dated Jul. 27, 2021.
ISR received in PCT/US2021/040404 dated Oct. 20, 2021.
Non-Final Office Action for U.S. Appl. No. 17/557,024 dated Aug. 9, 2022.
Non-Final Office Action for U.S. Appl. No. 17/626,669 dated Jun. 23, 2023.
Notice of Allowance and Fees Due for U.S. Appl. No. 17/367,572 dated Apr. 18, 2022.
Notice of Allowance and Fees Due for U.S. Appl. No. 17/367,572 dated Nov. 12, 2021.
Notice of Allowance and Fees Due for U.S. Appl. No. 17/586,524 dated Feb. 6, 2023.
Notice of Allowance and Fees Due for U.S. Appl. No. 17/669,209 dated Nov. 3, 2022.
Notice of Allowance received in U.S. Appl. No. 17/092,002 dated Sep. 20, 21.
Notice of Allowance Received in U.S. Appl. No. 17/092,002 dated Feb. 16, 2022.
Notice of Allowance received in U.S. Appl. No. 17/191,636 dated Oct. 1, 2021.
Notice of Allowance received in U.S. Appl. No. 17/367,572 dated Feb. 3, 2022.
Notice of Allowance received in U.S. Appl. No. 17/191,631 dated Oct. 27, 2021.
Office Action received in U.S. Appl. No. 16/297,426 dated Apr. 22, 2020.

HUMAN-COMPUTER INTERFACE SYSTEM

CROSS-REFERENCE TO RELATED APPLICATIONS

This application claims the benefit of U.S. Provisional Application No. 63/336,825, filed on 29 Apr. 2022, which is incorporated in its entirety by this reference.

This application is a continuation-in-part application of U.S. patent application Ser. No. 17/946,931, filed on 16 Sep. 2022, which is a continuation of U.S. patent application Ser. No. 17/626,669, filed on 12 Jan. 2022, which claims the benefit under 35 U.S.C. 371 to International Application No. PCT/US21/53660, filed on 5 Oct. 2021, which claims priority to U.S. Provisional Patent Application 63/088,359, filed on 6 Oct. 2020, each of which is incorporated in its entirety by this reference.

This application is also a continuation-in-part application of U.S. patent application Ser. No. 17/855,747, filed on 30 Jun. 2022, which is a continuation of U.S. patent application Ser. No. 17/367,572, filed on 5 Jul. 2021, which claims priority to U.S. Provisional Application No. 63/048,071, filed on 3 Jul. 2020, which is incorporated in its entirety by this reference.

U.S. patent application Ser. No. 17/367,572 is also a continuation-in-part application of U.S. patent application Ser. No. 17/092,002, filed on 6 Nov. 2020, which is a continuation application of U.S. patent application Ser. No. 16/297,426, filed on 8 Mar. 2019, which claims the benefit of U.S. Provisional Application No. 62/640,138, filed on 8 Mar. 2018, each of which is incorporated in its entirety by this reference.

U.S. patent application Ser. No. 16/297,426 is also a continuation-in-part application of U.S. patent application Ser. No. 15/845,751, filed on 18 Dec. 2017, which is a continuation-in-part application of U.S. patent application Ser. No. 15/476,732, filed on 31 Mar. 2017, which claims the benefit of U.S. Provisional Application No. 62/316,417, filed on 31 Mar. 2016, and U.S. Provisional Application No. 62/343,453, filed on 31 May 2016, each of which is incorporated in its entirety by this reference.

This application is also a continuation-in-part application of U.S. patent application Ser. No. 18/099,698, filed on 20 Jan. 2023, which is a continuation of U.S. Non-Provisional patent application Ser. No. 17/669,209, filed on 10 Feb. 2022, which is a continuation of U.S. Non-Provisional patent application Ser. No. 17/191,636, filed on 3 Mar. 2021, and claims the benefit of U.S. Provisional Patent Application Nos. 62/984,448, filed on 3 Mar. 2020, 63/040,433, filed on 17 Jun. 2020, and 63/063,168, filed on 7. Aug. 2020, each of which is incorporated in its entirety by this reference.

TECHNICAL FIELD

This invention relates generally to the field of touch sensors and more specifically to a new and useful human-computer interface system in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
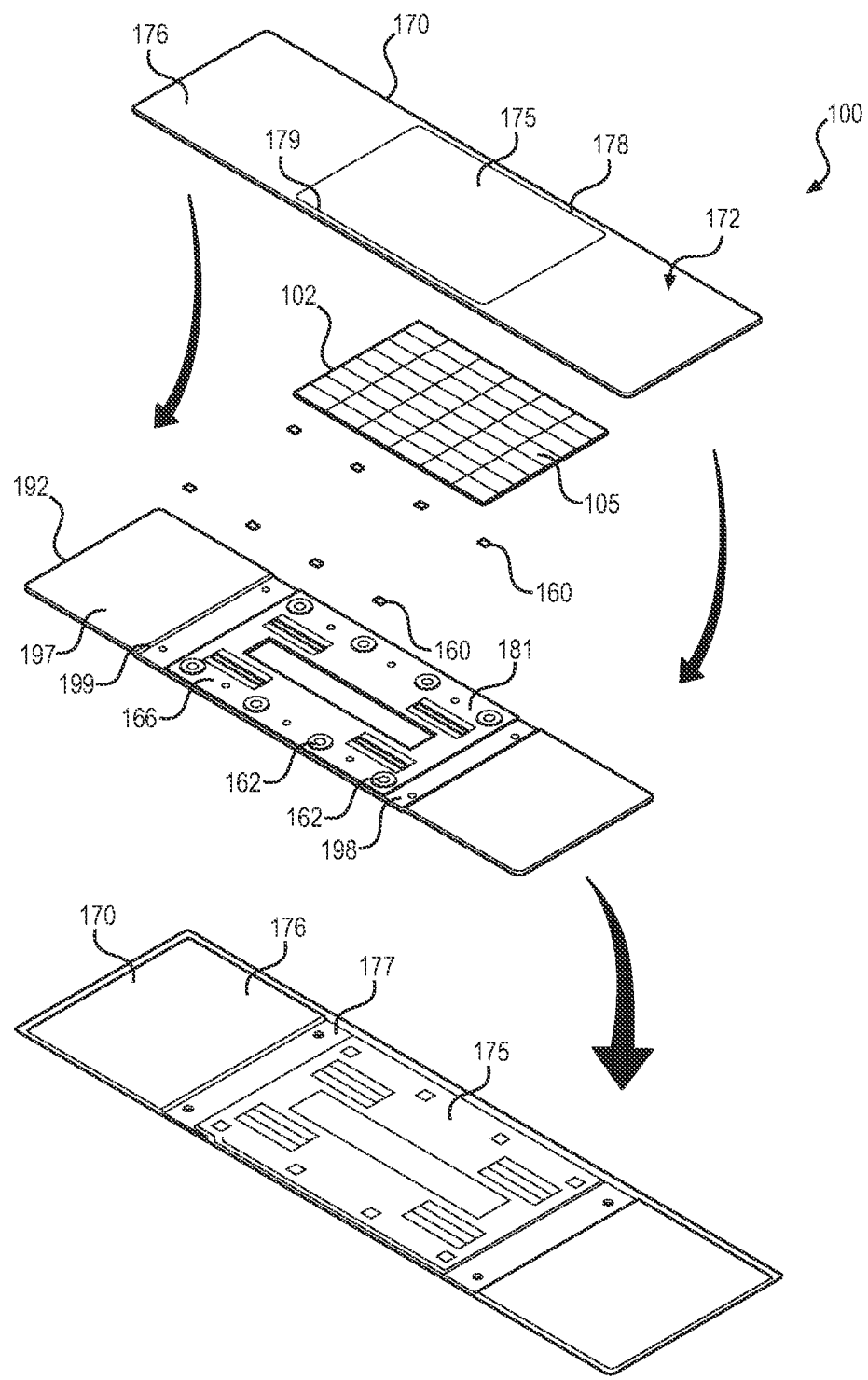
FIG. 1 is a schematic representation of the system.
Figure 2:
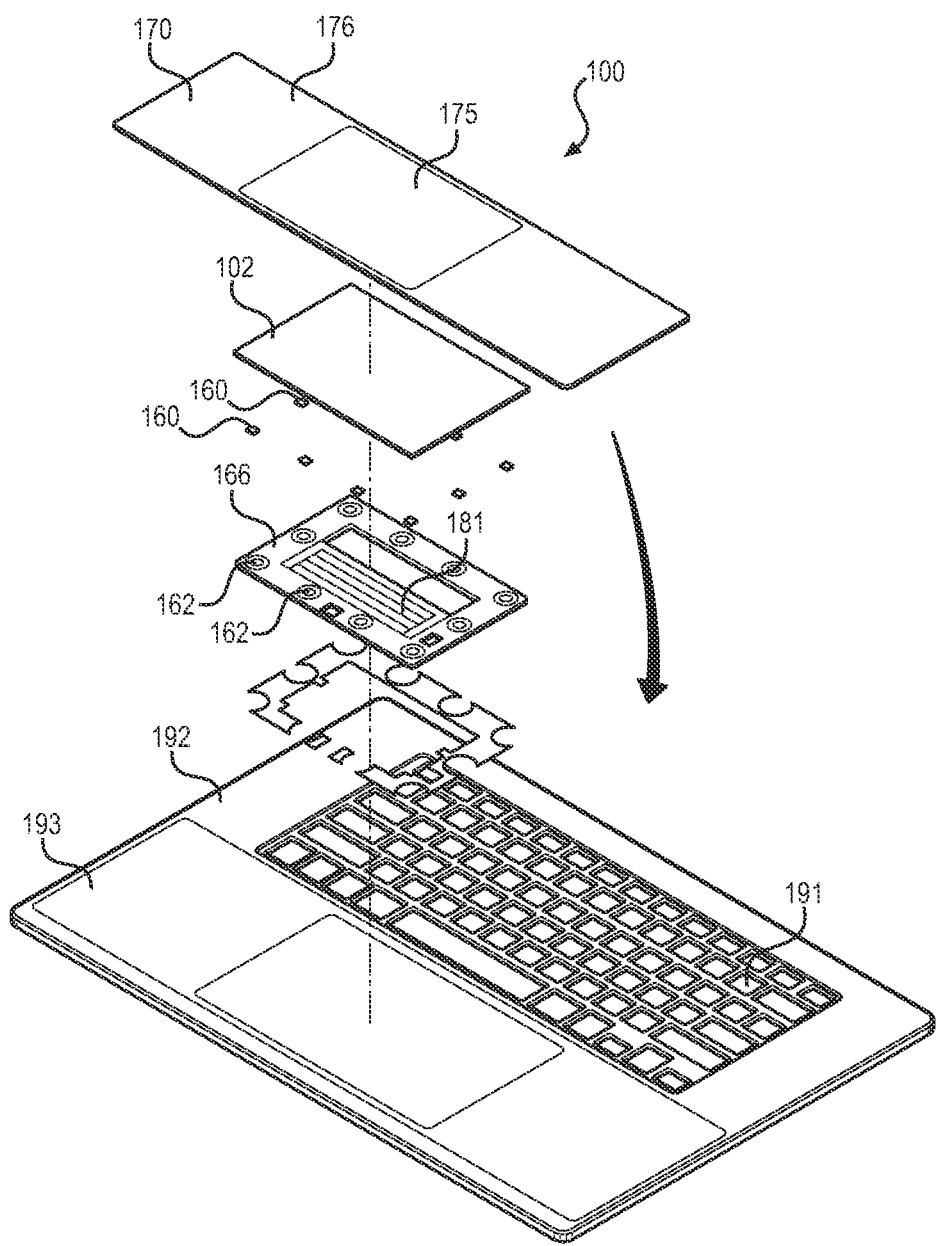
FIG. 2 is a schematic representation of one variation of the system.
Figure 3:
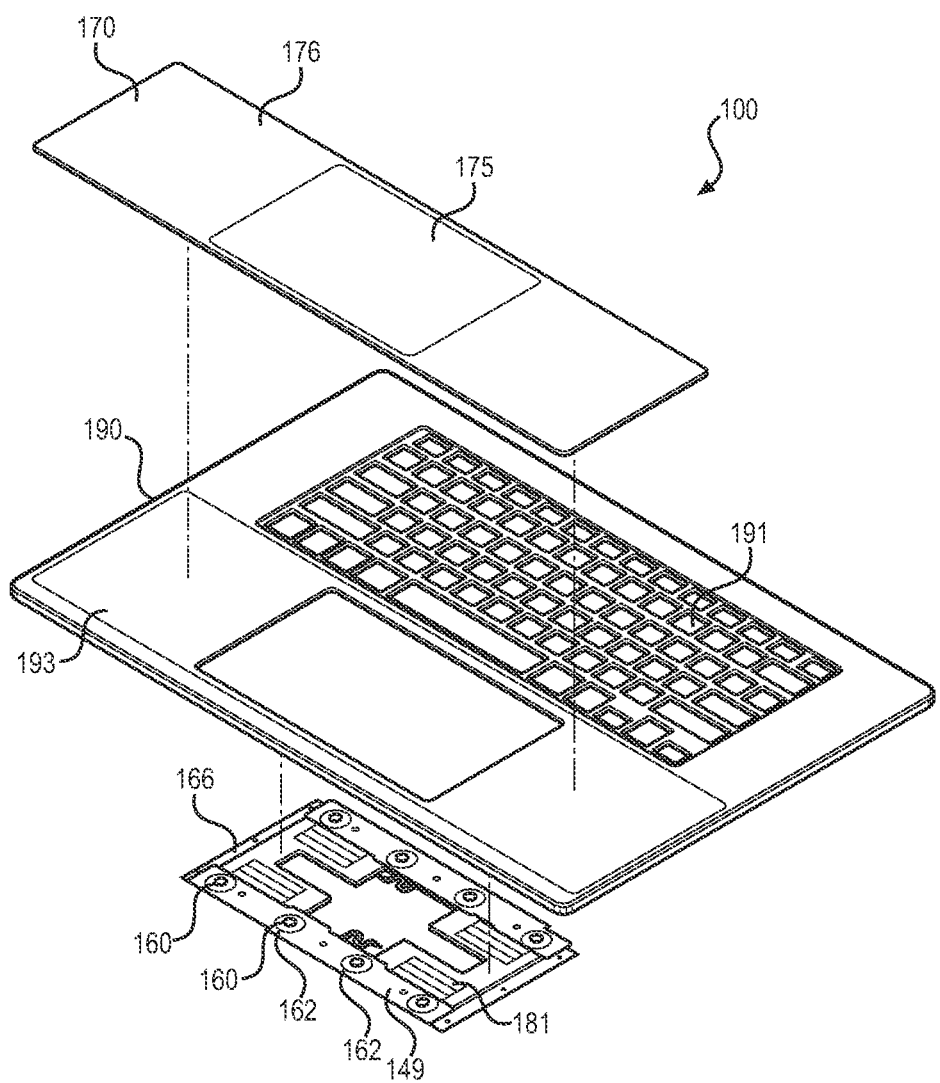
FIG. 3 is a schematic representation of one variation of the system.
Figure 4:
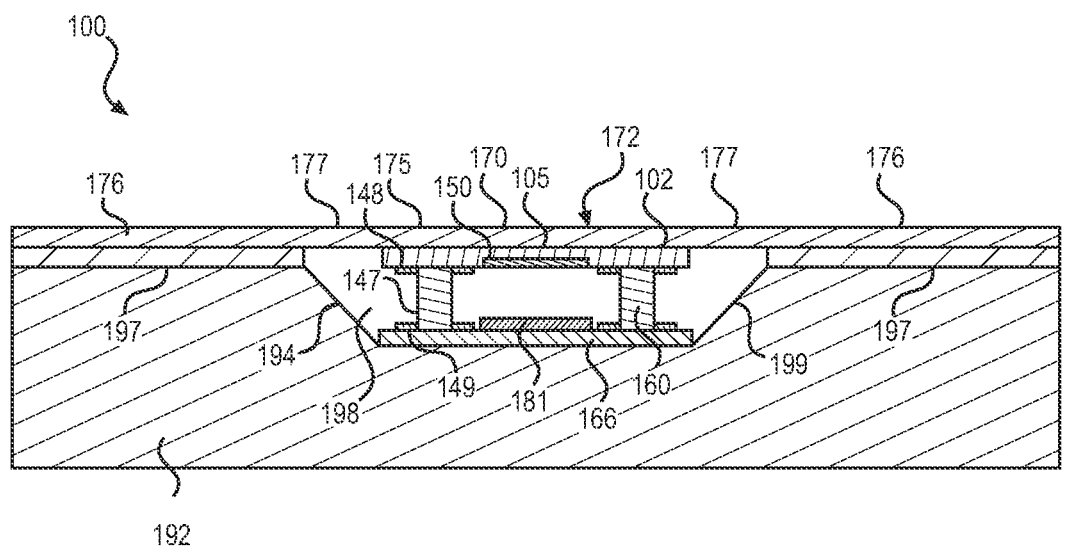
FIG. 4 is a schematic representation of one variation of the system.
Figure 5:
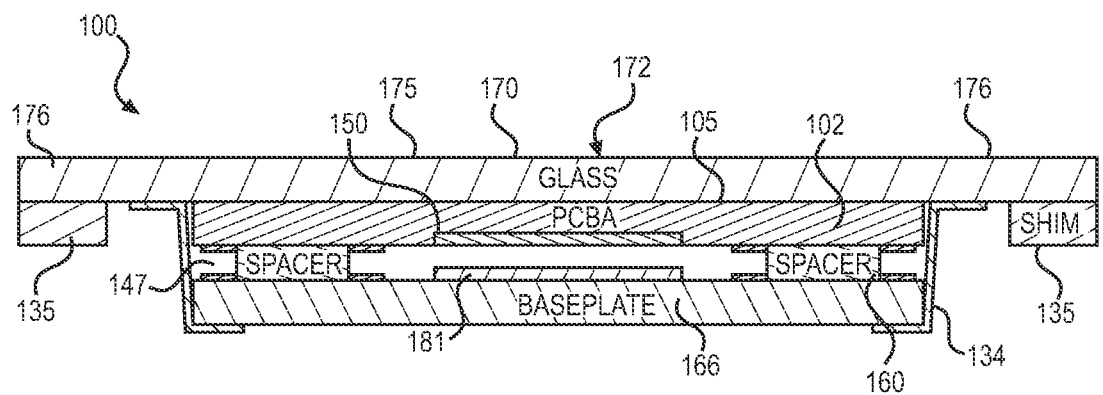
FIG. 5 is a schematic representation of one variation of the system.

As shown in FIG. 1, a system 100 includes: a substrate 102; a baseplate 166; a first haptic actuator; a cover layer 170; and a controller 190.

The substrate 102 includes: a top layer 104 including a first set of drive and sense electrode pairs 105 arranged across the top layer 104; and a bottom layer 140 arranged below the top layer 104 and including an array of force sensors 147 arranged across the bottom layer 140.

The baseplate 166: is arranged below the substrate 102; and includes an array of spring elements 162 a) coupling the baseplate 166 to the bottom layer 140 of the substrate 102 and b) configured to yield to displacement of the substrate 102 responsive to forces applied over the substrate 102.

The first haptic actuator is arranged below the substrate 102 and includes: a first multi-layer inductor 150; and a first magnetic element 181 defining a first polarity facing the first multi-layer inductor 150.

The cover layer 170: is arranged over the substrate 102 to define a continuous touch sensor surface 172 spanning across the substrate 102 and the baseplate 166; and is coupled to the top layer 104 of the substrate 102 to define a first active touch region 175 and a first inactive touch region 176 on the continuous touch sensor surface 172.

The controller 190 is configured to, in response to detecting a first input at the first active touch region 175 on the continuous touch sensor surface 172, drive an oscillating voltage across the multi-layer inductor 150: to induce alternating magnetic coupling between the multi-layer inductor 150 and the first magnetic element 181; and to oscillate the first active touch region 175 of the cover layer 170 relative to the first magnetic element 181.

2. Applications

Generally, the system 100 operates as a touch sensor defining a seamless and continuous touch sensor surface 172 (e.g., flat, curved) that can: receive touch inputs, such as from a user applying a touch and/or force input on an active touch region 175 on the touch sensor surface 172; and execute haptic feedback cycles to induce normal oscillation of the touch sensor surface 172 responsive to the application of the touch inputs. In particular, the system 100 can include a cover layer 170: that defines a continuous touch sensor surface 172 extending across a substrate 102 including a touch sensor; and coupled (e.g., bonded) to a chassis 192 of a computer interface (e.g., trackpad chassis 192, laptop chassis 192, mobile device chassis 192, vehicle steering wheel 123 chassis 192). The cover layer 170 defines: an active touch region 175 extending across the substrate 102 that receives touch inputs from a user; and an inactive touch region 176 encompassing the active touch region 175 and coupled to support regions 197 of the chassis 192.

In one example, the substrate 102 includes: a top layer 104 including a set of drive and sense electrode pairs 105 patterned across the top layer 104; and a bottom layer 140 including an array of force sensors 147. The cover layer 170 is arranged over the top layer 104 of the substrate 102 to define the active touch region 175 of the cover layer 170. Thus, touch inputs applied over the active touch region 175 of the cover layer 170 affect: electrical values of the set of drive and sense electrode pairs 105; and the array of force sensors 147 below the bottom layer 140 of the substrate 102. In this example, the force sensors 147 on the bottom layer 140 includes: a set of support locations about the bottom layer 140; and a set of sense electrodes 148 encompassing the set of support locations across the bottom layer 140. The system 100 further includes a baseplate 166: arranged below the substrate 102; including a set of spring elements 162 facing the set of support locations along the bottom layer 140 of the substrate 102; and a set of drive electrodes 149 arranged (e.g., printed) about the top surface of the baseplate 166 in alignment with the set of sense electrodes 148 to form the array of force sensors 147. Thus, application of the touch input on the active touch region 175 of the cover layer 170 results in movement of the substrate 102 toward the baseplate 166, which induces changes in electrical values between the set of sense electrodes 148 and the set of drive electrodes 149 in the array of force sensors 147.

In this example, the system 100 further includes a haptic actuator: coupled (e.g., integrated, bonded) to the substrate 102; and configured to trigger haptic feedback cycles to oscillate the active touch region 175 of the cover layer 170 responsive to application of touch inputs. The haptic actuator can include: a multi-layer inductor 150 coupled to (e.g., integrated, bonded) the substrate 102; and a magnetic element 181 defining a first polarity facing the multi-layer inductor 150. Thus, responsive to application of a touch input on the active touch region 175, the system 100 can drive an oscillating voltage across the multi-layer inductor 150 to: induce alternating magnetic coupling between the multi-layer inductor 150 and the first magnetic element 181; and oscillate the first active touch region 175 of the cover layer 170 relative to the first magnetic element 181.

Furthermore, the system 100 can include a chassis 192: coupled to the cover layer 170 to support the continuous touch sensor surface 172; and encompassing the substrate 102 and the baseplate 166. In particular, the chassis 192 can include: a support region 197 defining a nominal plane; and a cavity 198 inset from the nominal plane that receives the substrate 102 and the baseplate 166 within the chassis 192. The cover layer 170 can then: include the inactive touch region 176 coupled (e.g., bonded) to the support region 197 of the chassis 192; and includes the active touch region 175 extending across the cavity 198 of the chassis 192. Thus, responsive to application of a touch input on the active touch region 175 of the cover layer 170, the system 100 can trigger a haptic feedback cycle that: induces normal oscillations across the active touch region 175 of the cover layer 170; and dampens oscillations across the inactive touch region 176 of the cover layer 170. Additionally, the cover layer 170 can include an indicator 178 (e.g., light elements) arranged about the active touch region 175 visually representing a boundary of the active touch region 175 that can receive touch inputs.

Therefore, the system 100 can: include a cover layer 170 defining a continuous touch sensor surface 172 (e.g., flat, curved) and including an active touch region 175; detect touch inputs and force magnitudes applied to the active touch region 175 of the cover layer 170; and execute haptic feedback cycles to induce normal oscillations of the active touch region 175 on the cover layer 170 responsive to detecting the touch inputs and force magnitudes on the active touch region 175 of the cover layer 170.

3. Substrate and Touch Sensor

In one implementation, the system 100 includes a substrate 102 that includes a set of (e.g., six) conductive layers etched to form a set of conductive traces; a set of (e.g., five) substrate layers interposed between the stack of conductive layers; and a set of vias that connect the set of conductive tracers through the set of substrate layers. For example, the substrate 102 can include a six-layer, rigid fiberglass PCB.

In particular, a top conductive layer and/or a second conductive layer of the substrate 102 can include a set of traces that cooperate to form an array (e.g., a grid array) of drive and sense electrode pairs 105 within a touch sensor. Subsequent conductive layers of the substrate 102 below the touch sensor can include interconnected spiral traces that cooperate to form a single- or multi-core, single- or multi-winding, multi-layer inductor 150. Furthermore, a bottom conductive layer and/or a penultimate conductive layer of the substrate 102 can include a set of interdigitated electrodes distributed about the perimeter of the substrate 102 to form a sparse array of force sensors.

3.1 Resistive Touch Sensor

In one implementation, the first and second conductive layers of the substrate 102 include columns of drive electrodes and rows of sense electrodes (or vice versa) that terminate in a grid array of drive and sense electrode pairs 105 on the top layer 104 of the substrate 102. In this implementation, the system 100 further includes a force-sensitive layer 174: arranged over the top conductive layer of the substrate 102 (e.g., interposed between the top layer 104 of the substrate 102 and the cover layer 170); and exhibiting local changes in contact resistance across the set of drive and sense electrode pairs 105 responsive to local application of forces on the cover layer 170 (i.e., on the touch sensor surface 172.)

Accordingly, during a scan cycle, the controller 190 can: serially drive the columns of drives electrodes; serially read electrical values—(e.g., voltages) representing electrical resistances across drive and sense electrode pairs 105—from the rows of sense electrodes; detect a first input at a first location (e.g., an (x, y) location) on the touch sensor surface 172 based on deviation of electrical values—read from a subset of drive and sense electrode pairs 105 adjacent the first location—from baseline resistance-based electrical values stored for this subset of drive and sense electrode pairs 105; and interpret a force magnitude of the first input based on a magnitude of this deviation. As described below, the controller 190 can then drive an oscillating voltage across the multi-layer inductor 150 in the substrate 102 during a haptic feedback cycle in response to the force magnitude of the first input exceeding a threshold input force.

The array of drive and sense electrode pairs 105 on the first and second conductive layers of the substrate 102 and the force-sensitive layer 174 can thus cooperate to form a resistive touch sensor readable by the controller 190 to detect lateral positions, longitudinal positions, and force (or pressure) magnitudes of inputs (e.g., fingers, styluses, palms) on the touch sensor surface 172.

3.2 Capacitive Touch Sensor

In another implementation, the first and second conductive layers of the substrate 102 include columns of drive electrodes and rows of sense electrodes (or vice versa) that terminate in a grid array of drive and sense electrode pairs 105 on the top conductive layer (or on both the top and second conductive layers) of the substrate 102.

During a scan cycle, the controller 190 can: serially drive the columns of drive electrodes; serially read electrical values (e.g., voltage, capacitance rise time, capacitance fall time, resonant frequency)—representing capacitive coupling between drive and sense electrode pairs 105—from the rows of sense electrodes; and detect a first input at a first location (e.g., an (x, y) location) on the touch sensor surface 172 based on deviation of electrical values—read from a subset of drive and sense electrode pairs 105 adjacent the first location—from baseline capacitance-based electrical values stored for this subset of drive and sense electrode pairs 105. For example, the controller 190 can implement mutual capacitance techniques to read capacitance values between these drive and sense electrode pairs 105 and to interpret inputs on the touch sensor surface 172 based on these capacitance values.

The array of drive and sense electrode pairs 105 on the first and second conductive layers of the substrate 102 and the force-sensitive layer 174 can thus cooperate to form a capacitive touch sensor readable by the controller 190 to detect lateral and longitudinal positions of inputs (e.g., fingers, styluses, palms) on the touch sensor surface 172.

3.3 Touchscreen

In one variation, the system includes (or interfaces with) a touchscreen 196 arranged over the substrate and that includes: a digital display; a touch sensor arranged across the display; and a cover layer arranged over the display and defining the touch sensor surface 172. Accordingly, in this variation, the controller is configured to drive the oscillating voltage across the multi-layer inductor during the haptic feedback cycle in response to the touchscreen 196 detecting the input on the touch sensor surface.

In particular, in this variation, the substrate 102 can: receive or integrate with a touch screen (i.e., an integrated display and touch sensor); and can cooperate with the first magnetic element 181 and the controller 190 to vibrate the touch sensor surface over the touchscreen 196 responsive to an input on the touch sensor surface, such as detected by a separate controller coupled to the touchscreen 196.

4. Multi-Layer Inductor

As described above, the system 100 includes a multi-layer inductor 150 formed by a set of interconnected spiral traces fabricated directly within conductive layers within the substrate 102.

Generally, the total inductance of a single spiral trace may be limited by the thickness of the conductive layer. Therefore, the system 100 can include a stack of overlapping, interconnected spiral traces fabricated on a set of adjacent layers of the substrate 102 to form a multi-layer, multi-turn, and/or multi-core inductor that exhibits greater inductance—and therefore greater magnetic coupling to the set of magnetic elements—than a single spiral trace on a single conductive layer of the substrate 102. These spiral traces can be coaxially aligned about a common vertical axis (e.g., centered over the set of magnetic elements) and electrically interconnected by a set of vias through the intervening substrate layers of the substrate 102.

Furthermore, the substrate 102 can include conductive layers of different thicknesses. Accordingly, spiral traces within thicker conductive layers of the substrate 102 can be fabricated with narrower trace widths and more turns, and spiral traces within thinner conductive layers of the substrate 102 can be fabricated with wider trace widths and fewer turns in order to achieve similar electrical resistances within each spiral trace over the same coil footprint. For example, lower conductive layers within the substrate 102 can include heavier layers of conductive material (e.g., one-ounce copper approximately 35 microns in thickness) in order to accommodate narrower trace widths and more turns within the coil footprint in these conductive layers, thereby increasing inductance of each spiral trace and yielding greater magnetic coupling between the multi-layer inductor 150 and the set of magnetic elements during a haptic feedback cycle. Conversely, in this example, the upper layers of the substrate 102—which include many (e.g., thousands of) drive and sense electrode pairs 105 of the touch sensor—can include thinner layers of conductive material.

4.1 Single Core+Even Quantity of Coil Layers

In one implementation, the substrate 102 includes an even quantity of spiral traces fabricated within an even quantity of substrate layers within the substrate 102 to form a single-coil inductor.

In one example, the substrate 102 includes: a top layer 104 and an intermediate layer 106 containing the array of drive and sense electrode pairs 105; a first layer 110; a second layer 120; a third layer 130; and a fourth (e.g., a bottom) layer. In this example, the first layer 110 includes a first spiral trace 111 coiled in a first direction and defining a first end and a second end. In particular, the first spiral trace 111 can define a first planar coil spiraling inwardly in a clockwise direction from the first end at the periphery of the first planar coil to the second end proximal a center of the first planar coil. The second layer 120 includes a second spiral trace 122 coiled in a second direction opposite the first direction and defining a third end—electrically coupled to the second end of the first spiral trace 111—and a fourth end.

In particular, the second spiral trace 122 can define a second planar coil spiraling outwardly in the clockwise direction from the third end proximal the center of the second planar coil to the fourth end at a periphery of the second planar coil.

Similarly, the third layer 130 includes a third spiral trace 133 coiled in the first direction and defining a fifth end—electrically coupled to the fourth end of the second spiral trace 122—and a sixth end. In particular, the third spiral trace 133 can define a third planar coil spiraling inwardly in the clockwise direction from the fifth end at the periphery of the third planar coil to the sixth end proximal a center of the third planar coil. Furthermore, the fourth layer includes a fourth spiral trace 144 coiled in the second direction and defining a seventh end—electrically coupled to the sixth end of the first spiral trace 111—and an eighth end. In particular, the fourth spiral trace 144 can define a fourth planar coil spiraling outwardly in the clockwise direction from the seventh end proximal the center of the fourth planar coil to the eighth end at a periphery of the fourth planar coil.

Accordingly: the second end of the first spiral trace 111 can be coupled to the third end of the second spiral trace 122 by a first via; the fourth end of the second spiral trace 122 can be coupled to the fifth end of the third spiral trace 133 by a second via; the sixth end of the third spiral trace 133 can be coupled to the seventh end of the fourth spiral trace 144 by a third via; and the first, second, third, and fourth spiral traces 111, 122, 133, 144 can cooperate to form a single-core, four-layer inductor. The controller 190 (or a driver): can be electrically connected to the first end of the first spiral trace 111 and the eighth end of the fourth spiral trace 144 (or "terminals" of the multi-layer inductor 150); and can drive these terminals of the multi-layer inductor 150 with an oscillating voltage during a haptic feedback cycle in order to induce an alternating magnetic field through the multi-layer inductor 150, which couples to the magnetic elements and oscillates the substrate 102 within the chassis 192. In particular, when the controller 190 drives the multi-layer inductor 150 at a first polarity, current can flow in a continuous, clockwise direction through the first, second, third, and fourth spiral traces 111, 122, 133, 144 to induce a magnetic field in a first direction around the multi-layer inductor 150. When the controller 190 reverses the polarity across terminals of the multi-layer inductor 150, current can reverse directions and flow in a continuous, counter-clockwise direction through the first, second, third, and fourth spiral traces 111, 122, 133, 144 to induce a magnetic field in a second, opposite direction at the multi-layer inductor 150.

Furthermore, in this implementation, because the multi-layer inductor 150 spans an even quantity of conductive layers within the substrate 102, the terminals of the multi-layer inductor 150 can be located on the peripheries of the first and last layers of the substrate 102 and thus enable direct connection to the controller 190 (or driver).

4.2 Single Core+Odd Quantity of Coil Layers

In another implementation, the multi-layer inductor 150 spans an odd number of (e.g., 3, 5) conductive layers of the substrate 102. In this implementation, a conductive layer of the substrate 102 can include two parallel and offset spiral traces that cooperate with other spiral traces in the multi-layer inductor 150 to locate the terminals of the multi-layer inductor 150 at the periphery of the multi-layer inductor 150 for direct connection to the controller 190 or driver.

In one example, the substrate 102 includes: a top layer 104 and an intermediate layer 106 containing the array of drive and sense electrode pairs 105; a first layer 110; a second layer 120; a third layer 130; and a fourth (e.g., a bottom) layer. In this example, the first layer 110 includes a ground electrode (e.g., a continuous trace): spanning the footprint of the array of drive and sense electrode pairs 105 in the top and intermediate layers 104, 106; driven to a reference potential by the controller 190; and configured to shield the drive and sense electrode pairs 105 from electrical noise generated by the multi-layer inductor 150.

In this example, the third layer 130 includes a first spiral trace 111 coiled in a first direction and defining a first end and a second end. In particular, the first spiral trace 111 can define a first planar coil spiraling inwardly in a clockwise direction from the first end at the periphery of the first planar coil to the second end proximal a center of the first planar coil. The second layer 120 includes a second spiral trace 122 coiled in a second direction opposite the first direction and defining a third end—electrically coupled to the second end of the first spiral trace 111 in the third layer 130—and a fourth end. In particular, the second spiral trace 122 can define a second planar coil spiraling outwardly in the clockwise direction from the third end proximal the center of the second planar coil to the fourth end at a periphery of the second planar coil.

The third layer 130 further includes a third spiral trace 133 coiled in the first direction and defining a fifth end—electrically coupled to the fourth end of the second spiral trace 122 in the second layer 120—and a sixth end. In particular, the third spiral trace 133 can define a third planar coil: spiraling inwardly in the clockwise direction from the fifth end at the periphery of the third planar coil to the sixth end proximal a center of the third planar coil; and nested within the first planar coil that also spirals inwardly in the clockwise direction within the third layer 130.

Furthermore, the fourth layer includes a fourth spiral trace 144 coiled in the second direction and defining a seventh end—electrically coupled to the sixth end of the first spiral trace 111—and an eighth end. In particular, the fourth spiral trace 144 can define a fourth planar coil spiraling outwardly in the clockwise direction from the seventh end proximal the center of the fourth planar coil to the eighth end at a periphery of the fourth planar coil.

Accordingly: the second end of the first spiral trace 111 within the third layer 130 can be coupled to the third end of the second spiral trace 122 within the second layer 120 by a first via; the fourth end of the second spiral trace 122 within the second layer 120 can be coupled to the fifth end of the third spiral trace 133 within the third layer 130 by a second via; the sixth end of the third spiral trace 133 within the third layer 130 can be coupled to the seventh end of the fourth spiral trace 144 within the fourth layer by a third via; and the first, second, third, and fourth spiral traces 111, 122, 133, 144 can cooperate to form a single-core, three-layer inductor. The controller 190: can be electrically connected to the first end of the first spiral trace 111 within the third layer 130 and the eight end of the fourth spiral trace 144 within the fourth layer (or "terminals" of the multi-layer inductor 150); and can drive these terminals of the multi-layer inductor 150 with an oscillating voltage during a haptic feedback cycle in order to induce an alternating magnetic field through the multi-layer inductor 150, which couples to the magnetic elements and oscillates the substrate 102 within the chassis 192. In particular, when the controller 190 drives the multi-layer inductor 150 at a first polarity, current can flow in a continuous, clockwise direction through the first, second, third, and fourth spiral traces 111, 122, 133, 144 within the second, third, and fourth layers of the substrate 102 to induce a magnetic field in a first direction around the multi-layer inductor 150. When the controller 190 reverses the polarity across terminals of the multi-layer inductor 150, current can reverse directions and flow in a continuous, counter-clockwise direction through the first, second, third, and fourth spiral traces 111, 122, 133, 144 to induce a magnetic field in a second, opposite direction at the multi-layer inductor 150.

Therefore, in this implementation, the substrate 102 can include an even number of single-coil layers and an odd number of two-coil layers selectively connected to form a multi-layer inductor 150 that includes two terminals located on the periphery of the multi-layer inductor 150.

4.3 Double Core+Even Quantity of Coil Layers

In another implementation, the substrate 102 includes an even quantity of spiral traces fabricated within an even quantity of substrate layers within the substrate 102 to form a dual-core inductor (that is, two separate single-core inductors connected in series).

In one example, the substrate 102 includes: a top layer 104 and an intermediate layer 106 containing the array of drive and sense electrode pairs 105; a first layer 110; a second layer 120; a third layer 130; and a fourth (e.g., a bottom) layer.

In this example, the first layer 110 includes a first spiral trace 111 coiled in a first direction and defining a first end and a second end. In particular, the first spiral trace in can define a first planar coil spiraling inwardly in a clockwise direction from the first end at the periphery of the first planar coil to the second end proximal a center of the first planar coil. The second layer 120 includes a second spiral trace 122 coiled in a second direction opposite the first direction and defining a third end—electrically coupled to the second end of the first spiral trace 111—and a fourth end. In particular, the second spiral trace 122 can define a second planar coil spiraling outwardly in the clockwise direction from the third end proximal the center of the second planar coil to the fourth end at a periphery of the second planar coil. The third layer 130 includes a third spiral trace 133 coiled in the first direction and defining a fifth end—electrically coupled to the fourth end of the second spiral trace 122—and a sixth end. In particular, the third spiral trace 133 can define a third planar coil spiraling inwardly in the clockwise direction from the fifth end at the periphery of the third planar coil to the sixth end proximal a center of the third planar coil. Furthermore, the fourth layer includes a fourth spiral trace 144 coiled in the second direction and defining a seventh end—electrically coupled to the sixth end of the first spiral trace 111—and an eighth end. In particular, the fourth spiral trace 144 can define a fourth planar coil spiraling outwardly in the clockwise direction from the seventh end proximal the center of the fourth planar coil to the eighth end at a periphery of the fourth planar coil.

Accordingly: the second end of the first spiral trace 111 can be coupled to the third end of the second spiral trace 122 by a first via; the fourth end of the second spiral trace 122 can be coupled to the fifth end of the third spiral trace 133 by a second via; the sixth end of the third spiral trace 133 can be coupled to the seventh end of the fourth spiral trace 144 by a third via; and the first, second, third, and fourth spiral traces 111, 122, 133, 144 can cooperate to form a first single-core, four-layer inductor.

Furthermore, in this example, the first layer no includes a fifth spiral trace adjacent the first spiral trace 111, coiled in the second direction, and defining a ninth end—coupled to the first end of the first planar coil—and a tenth end. In particular, the fifth spiral trace can define a fifth planar coil spiraling inwardly in a clockwise direction from the ninth end at the periphery of the fifth planar coil to the tenth end proximal a center of the fifth planar coil. The second layer 120 includes a sixth spiral trace adjacent the second spiral trace 122, coiled in the first direction, and defining an eleventh end—electrically coupled to the tenth end of the fifth spiral trace—and a twelfth end. In particular, the sixth spiral trace can define a sixth planar coil spiraling outwardly in the clockwise direction from the eleventh end proximal the center of the sixth planar coil to the twelfth end at a periphery of the sixth planar coil. The third layer 130 includes a seventh spiral trace adjacent the third spiral trace 133, coiled in the second direction, and defining a thirteenth end—electrically coupled to the twelfth end of the sixth spiral trace—and a fourteenth end. In particular, the seventh spiral trace can define a seventh planar coil spiraling inwardly in the clockwise direction from the thirteenth end at the periphery of the seventh planar coil to the fourteenth end proximal a center of the seventh planar coil. Furthermore, the fourth layer includes an eighth spiral trace adjacent the fourth spiral trace 144, coiled in the first direction, and defining a fifteenth end—electrically coupled to the fourteenth end of the seventh spiral trace—and a sixteenth end. In particular, the eighth spiral trace can define an eighth planar coil spiraling outwardly in the clockwise direction from the fifteenth end proximal the center of the eighth planar coil to the sixteenth end at a periphery of the eighth planar coil.

Accordingly: the tenth end of the fifth spiral trace can be coupled to the eleventh end of the sixth spiral trace by a fourth via; the twelfth end of the sixth spiral trace can be coupled to the thirteenth end of the seventh spiral trace by a fifth via; the fourteenth end of the seventh spiral trace can be coupled to the fifteenth end of the eighth spiral trace by a sixth via; and the fifth, sixth, seventh, and eighth spiral traces can cooperate to form a second single-core, four-layer inductor.

Furthermore, the first end of the first spiral trace 111 can be coupled to (e.g., form a continuous trace with) the ninth end of the fifth spiral trace within the first conductive layer. The first and second single-core, four-layer inductors can therefore be fabricated in series to form a four-layer, dual-core inductor with the eighth and sixteenth ends of the fourth and eighth spiral traces, respectively, forming the terminals of the four-layer, dual-core inductor. Therefore, when these first and second multi-layer inductors are driven to a first polarity, current can flow in a continuous circular direction through both the first multi-layer inductor such that the first and second multi-layer inductors produce magnetic fields in the same phase and in the same direction.

The controller 190 (or a driver): can be electrically connected to these terminals and can drive these terminals with an oscillating voltage during a haptic feedback cycle in order to induce: a first alternating magnetic field through the first single-core, four-layer inductor (formed by the first, second, third, and fourth spiral traces 111, 122, 133, 144); and a second alternating magnetic field—in phase with the first alternating magnetic field—through the second single-core, four-layer inductor (formed by the fifth, sixth, seventh, and eighth spiral traces). In particular, when the controller 190 drives the four-layer, dual-core inductor at a first polarity, current can flow: in a continuous, clockwise direction through the first, second, third, and fourth spiral traces 111, 122, 133, 144 to induce a magnetic field in a first direction around the first single-core, four-layer inductor; and in a continuous, clockwise direction through the fifth, sixth, seventh, and eighth spiral traces to induce a magnetic field in the first direction around the second single-core, four-layer inductor. When the controller 190 reverses the polarity across terminals of the dual-core, four-layer inductor, current can reverse directions to: flow in a continuous, counter-clockwise direction through the first, second, third, and fourth spiral traces 111, 122, 133, 144 to induce a magnetic field in a second, opposite direction around the first single-core, four-layer inductor; and in a continuous, counter-clockwise direction through the fifth, sixth, seventh, and eighth spiral traces to induce a magnetic field in the second direction around the second single-core, four-layer inductor.

4.4 Double Core+Odd Quantity of Coil Layers

In a similar implementation, the substrate 102 includes an odd quantity of spiral traces fabricated within an odd quantity of substrate layers within the substrate 102 to form a dual-core inductor.

For example, in this implementation, the dual-core inductor can include two single-coil, three-layer inductors connected in series. In this example, each single-coil, three-layer inductors includes: an even number of single-coil layers; and an odd number of two-coil layers selectively connected to form a single-coil, three-layer inductor that includes two terminals located on the periphery of the single-coil, three-layer inductor, as described above.

5. Magnetic Element

Generally, the system 100 includes a set of magnetic elements: rigidly coupled to the chassis 192 beneath the multi-layer inductor 150; and configured to magnetically couple to the multi-layer inductor 150 during a haptic feedback cycle, thereby applying an oscillating force to the multi-layer inductor 150 and oscillating the substrate 102—and therefore the touch sensor surface 172—within the receptacle 194 during this haptic feedback cycle.

In particular, the spiral traces within the multi-layer inductor 150 can span a coil footprint, such as a rectangular or ellipsoidal footprint including: long sides parallel to a primary axis of the multi-layer inductor 150; and short sides parallel to a secondary axis of the multi-layer inductor 150. For example: the substrate 102 can be 5 inches in width and 3 inches in length; the touch sensor surface 172 can span an area approximately 5 inches by 3 inches over the substrate 102; and the coil footprint of each single-core multi-layer inductor 150 within the substrate 102 can be approximately 1.5 inches in length and 0.5 inches in width with the primary axis of the single-core multi-layer inductor 150 extending laterally across the width of the substrate 102.

5.1 Vertical Oscillation

In another implementation, the set of magnetic elements are arranged relative to the multi-layer inductor 150 in order to induce an oscillating force—between the multi-layer inductor 150 and the magnetic elements—normal to the touch sensor surface 172 such that the substrate 102 oscillates vertically within the chassis 192 during a haptic feedback cycle.

In the implementation described above in which the substrate 102 includes a single-core multi-layer inductor 150, the system 100 can include a first magnetic element 181: arranged in the receptacle 194 of the chassis 192; defining a first magnetic polarity facing the single-core multi-layer inductor 150; approximately centered under the multi-layer inductor 150; and extending laterally across the primary axis of the multi-layer inductor 150. The first magnetic element 181 can thus generate a magnetic field that extends predominantly vertically toward the multi-layer inductor 150 and that is approximately centered under the multi-layer inductor 150. More specifically, the first magnetic element 181 can generate a magnetic field that extends predominately normal to the touch sensor surface 172 proximal the center of the multi-layer inductor 150. The controller 190 drives the multi-layer inductor 150 to a positive voltage during a haptic feedback cycle, the multi-layer inductor 150 can generate a magnetic field that extends vertically through the substrate 102 in a first vertical direction, which: repels the first magnetic element 181 (arranged with the first polarity facing the multi-layer inductor 150); yields a first vertical force in a first vertical direction; and lifts the substrate 102 vertically off of the first magnetic element 181. When the controller 190 then reverses the voltage across the multi-layer inductor 150 during this haptic feedback cycle, the multi-layer inductor 150 can generate a magnetic field that extends vertically through the substrate 102 in a second, opposite vertical direction, which: attracts the first magnetic element 181; yields a second vertical force in a second, opposite vertical direction; and draws the substrate 102 downward and back toward the first magnetic element 181.

Therefore, by oscillating the polarity of the multi-layer inductor 150, the controller 190 can: induce oscillating interactions (i.e., alternating attractive and repelling forces)—normal to the touch sensor surface 172—between the multi-layer inductor 150 and the first magnetic element 181; and thus oscillate the substrate 102 and touch sensor surface 172 vertically (e.g., normal to the touch sensor surface 172).

Furthermore, the system 100 can be reconfigured for vertical and horizontal oscillations of the touch sensor surface 172 by exchanging: a single magnetic element that spans the full width of and is centered under the multi-layer inductor 150; for a pair of opposing magnetic elements arranged under the multi-layer inductor 150 and on each of the primary axis of the multi-layer inductor 150 with no or minimal other modifications to the system 100.

5.2 Vertical Oscillation: Dual-Core Multi-Layer Inductor

Similarly, in the implementation described above in which the substrate 102 includes two adjacent single-core, multi-layer inductors 150 connected in series and in phase (i.e., phased by 0°), the system 100 can include a first magnetic element 181: arranged in the receptacle 194; defining a first magnetic polarity facing the first single-core multi-layer inductor 150; approximately centered under the first single-core multi-layer inductor 150; and extending laterally across the primary axis of the first single-core multi-layer inductor 150. The system 100 can similarly include a second magnetic element 182: arranged in the receptacle 194 adjacent the first magnetic element 181; defining the first magnetic polarity facing the second single-core multi-layer inductor 150; approximately centered under the second single-core multi-layer inductor 150; and extending laterally across the primary axis of the second single-core multi-layer inductor 150.

Accordingly, by oscillating the polarity of the first and second single-core multi-layer inductors 150—which are in phase—the controller 190 can: induce oscillating interactions normal to the touch sensor surface 172 between the first single-core multi-layer inductor 150 and the first magnetic element 181 and between the second single-core multi-layer inductor 150 and the second magnetic element 182; and thus oscillate the substrate 102 and touch sensor surface 172 vertically (e.g., normal to the touch sensor surface 172).

5.3 Independent Haptic Actuator

In one implementation, the system 100 can: include a haptic actuator (e.g., vibrator, inductor+magnet) coupled (e.g., bonded) to the bottom layer 140 of the substrate 102; and trigger haptic feedback cycles to induce normal oscillations of the substrate 102 responsive to applications of touch inputs on the active touch region 175 of the touch sensor surface 172. In this implementation, the haptic actuator is separate from the substrate 102 coupled to the cover layer 170. Thus, the system 100 can include a haptic actuator: bonded to a target location (e.g., a lateral edge) of the substrate 102; and/or bonded to the cover layer 170 separate from the substrate 102. Additionally or alternatively, the system 100 can include an array of haptic actuators arranged below the active touch region 175 of the cover layer 170.

In one example, the haptic actuator is arranged at a target location on the baseplate 166 proximal a first lateral edge of the active touch region 175 on the cover layer 170. The haptic actuator can include a set of inductor layers including: a first layer 110 coupled to the bottom layer 140 of the substrate 102 and including a first spiral trace 111 coiled in a first direction; and a second layer 120 arranged below the first layer 110 and including a second spiral trace 122. The second spiral trace 122: is coiled in a second direction opposite the first direction; is coupled to the first spiral trace 111; and cooperates with the first spiral trace 111 to form the first multi-layer inductor 150. Furthermore, the haptic actuator includes the first magnetic element 181: arranged below the second layer 120; and defining the first polarity facing the first multi-layer inductor 150. Thus, the controller 190 can, in response to detecting the first input proximal the lateral edge at the first active touch region 175, drive an oscillating voltage across the first spiral trace 111 and the second spiral trace 122 to: induce alternating magnetic coupling between the multi-layer inductor 150 and the first magnetic element 181; and oscillate the first active touch region 175 of the cover layer 170 normal to the first magnetic element 181.

In another example, the system 100 includes an array of haptic actuators arranged below the substrate 102. Each haptic actuator, in the array of haptic actuators: is arranged proximal a lateral edge of the baseplate 166 to locate the haptic actuator proximal a lateral edge of the first active touch region 175 on the continuous touch sensor surface 172; and coupled to the bottom layer 140 of the substrate 102. Thus, the controller 190 can then: read a set of electrical values from the first set of drive and sense electrode pairs 105; interpret the first touch input proximal a first lateral edge on the first active touch region 175 of the continuous touch sensor surface 172 based on the set of electrical values; and, in response to interpreting the first touch input proximal the first lateral edge on the first active touch region 175, drive an oscillating voltage at the first haptic actuator, in the array of haptic actuators, proximal the first touch input to induce oscillations on the first active touch region 175 proximal the first lateral edge.

Thus, the system 100 can: independently trigger a haptic actuator in an array of haptic actuators; and trigger a haptic feedback cycle at the haptic actuator to deliver localized haptic feedback responsive to detecting a touch input proximal the haptic actuator.

6. Chassis Integration

As described above, the substrate 102 is flexibly mounted to the chassis 192 (e.g., within or over a receptacle 194 defined by the chassis 192) to enable the substrate 102 to oscillate horizontally or vertically relative to the chassis 192 during a haptic feedback cycle.

6.1 Deflection Spacers

In one configuration as described in U.S. patent application Ser. No. 17/191,631, which is incorporated in its entirety by this reference: the top layer 104 of the substrate 102 includes an array of drive and sense electrode pairs 105 arranged in a grid array, at a first density, and in a mutual capacitance configuration; and a bottom layer 140 of the substrate 102 includes a second set of sensor traces 146 (e.g., a sparse perimeter array of interdigitated drive and sense electrode pairs 105) located proximal a perimeter of the substrate 102 at a second density less than the first density. In this implementation, the system 100 further includes a set of deflection spacers 160 (e.g., short elastic columns or buttons, adhesive films) coupled to the bottom layer 140 of the substrate 102 over each sensor trace and configured to support the substrate 102 on the chassis 192 of the device. In particular, each deflection spacer 160 can include a force-sensitive layer 174: arranged across a sensor trace in the second set of sensor traces 146; and exhibiting changes in contact resistance across the sensor trace responsive to a load on the touch sensor surface 172 that compresses the deflection space against the substrate 102.

Accordingly, in this implementation, the controller 190 can: read a first set of electrical values—representing capacitive coupling between drive and sense electrode pairs 105—from the set of drive and sense electrode pairs 105; and detect a first input at a first location on the touch sensor surface 172 based on deviation of electrical values—read from a subset of drive and sense electrode pairs 105 adjacent the first location—from baseline capacitance values stored for this subset of drive and sense electrode pairs 105. During this same scan cycle, the controller 190 can also: read a second set of electrical values (e.g., electrical resistances)—representing compression of the set of deflection spacers 160 against the second set of sensor traces 146—from the second set of sensor traces 146; interpret a force magnitude of the first input based on magnitudes of deviations of electrical (e.g., resistance) values from baseline electrical values across the set of sensor traces 146; and drive an oscillating voltage across the multi-layer inductor 150 during a haptic feedback cycle in response to the force magnitude of the first input exceeding a threshold input force.

Generally, in this configuration, the set of deflection spacers 160: are interposed between the bottom layer 140 of the substrate 102 and the base of the receptacle 194; and vertically support the substrate 102 within the receptacle 194.

In one implementation, each deflection spacer 160 includes a coupon: bonded to the bottom face of the substrate 102 and to the base of the receptacle 194; and formed in a low-durometer or elastic material that deflects laterally (or "shears") to enable the substrate 102 to translate laterally within the receptacle 194 responsive to alternating magnetic coupling between the multi-layer inductor 150 and the set of magnetic elements during a haptic feedback cycle. In another implementation, each deflection spacer 160 includes: a coupon bonded to the bottom face of the substrate 102; and a bottom face coated or including a low-friction material configured to slide across the base of the receptacle 194 to enable the substrate 102 to translate laterally in the receptacle 194 during a haptic feedback cycle while also vertically supporting the substrate 102 over the receptacle 194. In yet another implementation and as described below, each deflection spacer 160 is mounted to a spring or flexure element—which is mounted to the chassis 192—that enables the deflection spacer 160 to move laterally within the receptacle 194 while vertically supporting the substrate 102 within the receptacle 194.

In this configuration, the bottom conductive layer of the substrate 102 can include a pair of interdigitated drive and sense electrodes in each deflection spacer location about the perimeter of the substrate 102. Furthermore, each deflection spacer 160 can include a layer of force-sensitive material—such as described above—facing the pair of interdigitated drive and sense electrodes at this deflection spacer location on the substrate 102. The controller 190 can thus: read an electrical resistance (or a voltage representing electrical resistance) across a pair of sensor traces 146 at a deflection spacer location; and transform this resistance into a force magnitude carried from the touch sensor surface 172, into the substrate 102, and into the adjacent the deflection spacer 160. In particular, the system 100 can include multiple deflection spacers 160, and the controller 190 can: read electrical values from sensor traces 146 at each deflection spacer location; convert these electrical values into force magnitudes carried by each deflection spacer 160; and aggregate these force magnitudes into a total force magnitude of an input on the touch sensor surface 172.

Therefore, in this configuration, the substrate 102 can define a unitary structure including a dense array of drive and sense electrode pairs 105 that form a touch sensor, a column of spiral traces that form a multi-layer inductor 150, and a sparse array of drive and sense electrode pairs 105 that form a set of force sensors that support the substrate 102 on the chassis 192.

6.1.1 Capacitive Deflection Spacer

Alternatively, the bottom layer 140 of the substrate 102 can include a sparse array of sensor traces 146 (e.g., interdigitated drive and sense electrode pairs 105) arranged in a capacitive sensing configuration at each deflection spacer location such that each of these sensor traces 146 capacitively couples: to the chassis 192; to the adjacent deflection spacer 160; to a spring element 162 supporting the substrate 102 at this deflection spacer location; or to another fixed metallic element at this deflection spacer location. Accordingly, during a scan cycle, the controller 190 can: read capacitance values from the sensor traces 146 at these deflection spacer locations; convert these capacitance values into force magnitudes carried by each deflection spacer 160 during the scan cycle; and aggregate these force magnitudes into a total force magnitude of an input on the touch sensor surface 172.

6.1.2 Inductor Integration with Deflection Spacers

Furthermore, in this configuration, the multi-layer inductor 150 can be integrated into a region of the substrate 102 offset from the deflection spacer 160 locations (i.e., inset from regions of the substrate 102 occupied by sensor traces 146 in these deflection spacer locations). For example, the array of deflection spacers 160 can be located proximal a perimeter of the substrate 102, and the spiral traces that form the multi-layer inductor 150 can be arranged near a lateral and longitudinal center of the substrate 102 in order to limit injection of electrical noise from the multi-layer inductor 150 into sensor traces 146 in these deflection spacers 160 during a haptic feedback cycle.

6.1.3 Deflection Spacer+Capacitive Force Sensors

In one implementation, the system 100 can include: a substrate 102 including a set of sense electrodes 148 arranged across a bottom surface of the substrate 102; and a baseplate 166 including a set of drive electrodes 149 configured to capacitively couple the set of sense electrodes 148 of the substrate 102 to form an array of capacitive force sensors 147 below the substrate 102. The controller 190 can thus: read electrical values from the array of capacitive force sensors 147; interpret a force magnitude applied on the cover layer 170 based on these electrical values; and trigger haptic feedback cycles in response to interpreting the force magnitude exceeding a target force magnitude.

6.1.3.1 Substrate+Force Sense Electrodes

In one implementation, the system 100 includes the substrate 102 including: a top layer 104; and a bottom layer 140 that defines a set of support locations. The substrate 102 further includes a set of sense electrodes 148 arranged across a bottom layer 140 of the substrate 102 and adjacent (e.g., encircling, abutting) the support locations. The set of sense electrodes 148 can be printed across the bottom layer 140 of the substrate 102 and/or can be integrated into a rigid or flexible PCB that is layered over the bottom layer 140 of the substrate 102. In this implementation, the system 100 includes: each support location, in the set of support locations, arranged about a perimeter of the bottom layer 140 of the substrate 102; and the set of sense electrodes 148 arranged across the bottom layer 140 adjacent the support locations.

For example, the set of support locations can include: a first subset of support locations arranged proximal corner edges of the bottom layer 140 of the substrate 102; and a second subset of support locations arranged proximal lateral side edges of the bottom layer 140 of the substrate 102 between the corner edges. In this example, each sense electrode, in the set of sense electrodes 148: can be arranged adjacent a first side of a support location, in the set of support locations; and can define a shape encircling the support location—such as a semi-circular shape (e.g., horseshoe shape, crescent shape) encircling the support location—on the first side of the support locations.

Additionally or alternatively in this example, a sense electrode in the set of sense electrodes 148 can be arranged: proximal the lateral side edges of the bottom layer 140 of the substrate 102 abutting the set of support locations about the perimeter of the bottom layer 140 of the substrate 102; and/or proximal a center of the bottom layer 140 of the substrate 102 abutting support locations about the center of the bottom layer 140 of the substrate 102. In particular, the sense electrodes 148 can extend partially about a first lateral side edge of the bottom layer 140 of the substrate 102, and/or can be arranged proximal a corner edge of the bottom layer 140 of the substrate 102 abutting the set of support locations about the perimeter of the bottom layer 140 of the substrate 102.

The system 100 can therefore: accommodate sense electrodes 148 of varying shapes and sizes on the bottom layer 140 of the substrate 102 to maintain uniformity across the substrate 102; and reduce sensitivity to noise during scan cycles—by the controller 190- to read capacitance values from the set of sense electrodes 148 on the bottom layer 140 of the substrate 102.

6.1.3.2 Force Drive Electrodes

In one implementation, the system 100 includes a set of drive electrodes 149 arranged below the substrate 102, such as arranged on a baseplate 166 vertically aligned to the set of sense electrodes 148 on the bottom layer 140 of the substrate 102. In this implementation, the baseplate 166 is: arranged below the substrate 102; and spans the bottom layer 140 of the substrate 102.

In one example, the set of drive electrodes 149 includes a conductive trace—such as formed from conductive ink (e.g., Ag, C, Cu, etc.), conductive polymers (e.g., PEDOT: PSS), patternable conductive material (e.g., graphene, ITO, metal mesh), and/or rolled annealed metal—across the top layer 104 of the baseplate 166 and aligned with the set of sense electrodes 148 on the bottom layer 140 of the substrate 102. In this example, the set of drive electrodes 149 can be printed directly across a force flex layer of the baseplate 166 and/or can be integrated into a rigid or flexible PCB layered over the top layer 104 of the baseplate 166. Thus, in this example, each drive electrodes 149 can define a segment of the conductive trace—such as a continuous trace across the baseplate 166—configured to align with the set of sense electrodes 148 across the bottom layer 140 of the substrate 102 in order to define the array of capacitive force sensors 147.

Therefore, the system 100 can: drive the set of drive electrodes 149—such as by a target voltage (e.g., 6 volts), over a target time interval, and/or with an alternating voltage at a particular frequency—across the top layer 104 of the baseplate 166; and read a set of capacitance values—from the sense electrodes 148 across the bottom layer 140 of the substrate 102 aligned with the set of drive electrodes 149—that represent measures of mutual capacitance in the array of capacitance force electrodes. As a result, the system 100 can increase the signal-to-noise ratio—such as by implementing drive voltages less than 6 volts—from the capacitance values read from the capacitance force sensors 147 to interpret accurate magnitudes of force inputs applied to the touch sensor surface 172.

6.2 Spring-Loaded Baseplate

Additionally or alternatively as described in U.S. patent application Ser. No. 17/191,631, the system 100 can include a baseplate 166: configured to mount to the chassis 192 of the device; and defining a set of spring elements 162 coupled to the substrate 102 (e.g., via a set of deflection spacers 160) and configured to deflect out of the plane of the baseplate 166 responsive to an input on the touch sensor surface 172 and/or responsive to actuation of the multi-layer inductor 150 during a haptic feedback cycle.

In this implementation, the chassis 192 of the computing device can include a chassis receptacle 194 defining a depth approximating (or slightly more than) the thickness of a set of deflection spacers 160 (e.g., 1.2-millimeter chassis receptacle 194 depth for 1.0-millimeter-thick deflection spacers 160). The deflection spacers 160 are bonded to the baseplate 166 at each spring element 162. The baseplate 166 can then be rigidly mounted to the chassis 192 over the receptacle 194, such as via a set of threaded fasteners or an adhesive. The substrate 102 and the set of deflection spacers 160 may thus transfer a force—applied to the touch sensor surface 172—into these spring elements 162, which deflect inwardly below a plane of the baseplate 166 and into the chassis receptacle 194.

(In the configuration described above in which the substrate 102 includes sensors traces at these deflection spacer locations, each spacer is also compressed between the substrate 102 and the adjacent spring element 162 when a force is applied to the touch sensor surface 172 and therefore exhibits a change in its local contact resistance across the adjacent sensor trace proportional to the force carried into the adjacent spring element 162. The controller 190 can therefore read electrical values (e.g., a resistances) across these sensor traces 146 and convert these electrical values into portion of the input force carried by each sensor trace.)

In one implementation, the baseplate 166 and spring elements 162 define a unitary structure. In one example, the baseplate 166 includes a thin-walled structure (e.g., a stainless steel 20-gage, or 0.8-millimeter-thick sheet) that is punched, etched, or laser-cut to form a flexure aligned to each deflection spacer location. Thus, in this example, each spring element 162 can define a flexure—such as a multi-arm spiral flexure—configured to laterally and longitudinally locate the system 100 over the chassis 192 and configured to deflect inwardly and outwardly from a nominal plane defined by the thin-walled structure. More specifically, in this example, the baseplate 166 can include a unitary metallic sheet structure arranged between the substrate 102 and the chassis 192 and defining a nominal plane. Each spring element 162: can be formed (e.g., fabricated) in the unitary metallic structure; can define a stage coupled to a spacer opposite the bottom layer 140 of the substrate 102; can include a flexure fabricated in the unitary metallic structure; and can be configured to return to approximately the nominal plane in response to absence of a touch input applied to the touch sensor surface 172.

Furthermore, in this implementation, the magnetic elements can be arranged in the receptacle 194, and the spring elements 162 can locate the bottom layer 140 of the substrate 102 at a nominal gap (e.g., one millimeter) above the magnetic elements. However, application of an input on the touch sensor surface 172 can compress the spring elements 162, thereby closing this gap and bringing the multi-layer inductor 150 closer to the magnetic element, which may increase magnetic coupling between the multi-layer inductor 150 and the magnetic elements, increasing a peak-to-peak force between the multi-layer inductor 150 and the magnetic elements, and increasing the oscillation amplitude of the substrate 102 during a haptic feedback cycle. Therefore, the spring elements 162 can compress during application of an input on the touch sensor surface 172, thereby a) closing a gap between the multi-layer inductor 150 and the magnetic elements and b) increasing the oscillation amplitude of the substrate 102 during a haptic feedback cycle—responsive to this input—proportional to the force magnitude of this input.

Accordingly, a low-force input on the touch sensor surface 172 may minimally compress the springs elements, minimally reduce the gap between the multi-layer inductor 150 and the magnetic elements, and thus yield low-amplitude oscillations during a haptic feedback cycle responsive to this low-force input. Conversely, a high-force input on the touch sensor surface 172 may compress the spring elements by a larger distance, significantly reduce the gap between the multi-layer inductor 150 and the magnetic elements, and thus yield higher-amplitude oscillations during a haptic feedback cycle responsive to this high-force input.

Therefore, in this configuration, the system 100 can include a set of spring elements 162: supporting the substrate 102 within the receptacle 194 with the multi-layer inductor 150 located over the first magnetic element 181 and the second magnetic element 182; and biasing the substrate 102 within the receptacle 194 to locate the multi-layer inductor 150 at a nominal offset distance above the first magnetic element 181 and the second magnetic element 182. In particular, the spring elements 162 can compress responsive to application of an input on the touch sensor surface 172 to: locate the multi-layer inductor 150 at a second offset distance, less than the nominal offset distance, above the first magnetic element 181 and the second magnetic element 182; and increase magnetic coupling between the multi-layer inductor 150, the first magnetic element 181, and the second magnetic element 182 during the haptic feedback cycle.

For example, the set of spring elements 162 can bias the substrate 102 within the receptacle 194 to locate the multi-layer inductor 150 (or the bottom spiral trace of the multi-layer inductor 150 in the bottom layer 140 of the substrate 102) at a nominal offset distance—between 400 and 600 microns—above the magnetic elements. The spring elements 162 can also cooperate to yield a spring constant between 800 and 1200 grams per millimeter across the touch sensor surface 172. Therefore, application of force greater than approximately 500 grams to the touch sensor surface 172 can fully compress the set of spring elements 162. However, the system 100 can also exhibit increasing oscillation amplitudes of the substrate 102 during haptic feedback cycles as a function of magnitude of applied force on the touch sensor surface 172, such as from a minimum threshold force of 5 grams up to the maximum force of 500 grams.

In similar implementations the substrate 102 can be mounted to the chassis 192 via a set of flexible grommets that are compliant in vertical and/or horizontal directions to enable the substrate 102 to oscillation within the receptacle 194 during a haptic feedback cycle.

6.3 Spring Elements and Baseplate

In a similar variation, the system includes a set of deflection spacers 160, wherein each deflection spacer in the set is arranged over a discrete deflection spacer location—in a set of discrete deflection spacer locations—on a bottom surface (e.g., the bottom layer) of the substrate below. The system can further include an array of spring elements 162: that couple the set of deflection spacers 160 to the chassis of the computing device; supporting the substrate on the chassis; and configured to yield to oscillation of the substrate (e.g., vertically or horizontally) responsive to an oscillating voltage driven across the multi-layer inductor by the controller 190 during a haptic feedback cycle.

In one implementation, the system includes baseplate 166 defining a unitary metallic structure: arranged between the substrate and the chassis; that defines an aperture below the multi-layer inductor; and that includes a set of flexures arrange about the aperture and defining the array of spring elements 162 (e.g., flexures). In this implementation, the system can also include a magnetic yoke 184 arranged in the aperture of the unitary metallic structure; and the first magnetic element and the second magnetic element can be arranged on the magnetic yoke below the multi-layer inductor. Accordingly, the magnetic yoke 184 can limit a permeability path for magnetic field lines between the rear faces of the first and second magnetic elements opposite the substrate.

6.3.1 Baseplate

More specifically, in this variation, the system 100 can include an array of spring elements 162: coupled to the set of deflection spacers 160 at the array of support locations; configured to support the substrate 102 on a chassis of a computing device; and configured to yield to displacement of the substrate 102 downward toward the chassis responsive to forces applied to the touch sensor surface 172.

In one implementation, the system 100 includes a baseplate 166: configured to mount to the chassis of a computer system; and defining a set of spring elements 162 supported by each spacer 160 and configured to deflect out of the plane of the baseplate 166 responsive to an input on the touch sensor surface 172.

In this implementation, the chassis of the computing device can include a chassis receptacle defining a depth approximating (or slightly more than) the thickness of the deflection spacers 160 (e.g., 1.2-millimeter depth for 1.0-millimeter-thick spacers 160). The deflection spacers 160 are bonded to the baseplate 166 at each spring element 162. The baseplate 166 can then be rigidly mounted to the chassis over the receptacle, such as via a set of threaded fasteners or an adhesive. The substrate 102 and the set of deflection spacers 160 may thus transfer a force—applied to the touch sensor surface 172—into these spring elements 162, which deflect inwardly below a plane of the baseplate 166 and into the chassis receptacle. Concurrently, each spacer 160 is compressed between the substrate 102 and the adjacent spring element 162 and therefore exhibits a change in its local bulk resistance proportional to the force carried by this adjacent spring element 162.

6.3.2 Unitary Spring Elements and Baseplate

In one implementation, the baseplate 166 and spring elements 162 define a unitary structure (e.g., a "spring plate"). In one example, the baseplate 166 includes a thin-walled structure (e.g., a stainless steel 20-gage, or 0.8-millimeter-thick sheet) that is punched, etched, or laser-cut to form a flexure aligned to each support location. Thus, in this example, each spring element 162 can define a flexure—such as a multi-arm spiral flexure—configured to laterally and longitudinally locate the system 100 over the chassis and configured to deflect inwardly and outwardly from a nominal plane defined by the thin-walled structure.

More specifically, in this example, the baseplate 166 can include a unitary metallic sheet structure arranged between the substrate 102 and the chassis and defining a nominal plane. Each spring element 162: can be formed (e.g., fabricated) in the unitary metallic structure; can include a flexure fabricated in the unitary metallic structure; and can be configured to return to approximately the nominal plane in response to absence of a touch input applied to the touch sensor surface 172.

6.3.3 Spring Element Locations

In one implementation, the substrate 102 defines a rectangular geometry with support locations proximal the perimeter of this rectangular geometry. Accordingly, the deflection spacers 160 and the array of spring elements 162 can cooperate to support the perimeter of the substrate 102 against the chassis of the computing device.

In this implementation, the substrate 102 and the cover layer can cooperate to form a semi-rigid structure that resists deflection between support locations. For example, with the perimeter of the substrate 102 supported by the array of spring elements 162, the substrate 102 and the cover layer can exhibit less than 0.3 millimeter of deflection out of a nominal plane when a force of ~1.6 Newtons (i.e., 165 grams, equal to an "click" input force threshold) is applied to the center of the touch sensor surface 172. The substrate 102 and the cover layer can therefore cooperate to communicate this applied force to the perimeter of the substrate 102 and thus into the deflection spacers 160 and spring elements 162 below.

In this implementation, inclusion of a spring element 162 supporting the center of the substrate 102 may produce: a relatively high ratio of applied force to vertical displacement of the substrate 102 near both the center and the perimeter of the substrate 102; and a relatively low ratio of applied force to vertical displacement of the substrate 102 in an intermediate region around the center and inset from the perimeter of the substrate 102. Therefore, to avoid such non-linear changes in ratio of applied force to vertical displacement of the substrate 102—which may cause confusion or discomfort for a user interfacing with the system 100—the system 100 can: include spring elements 162 that support the perimeter of the substrate 102; exclude spring elements 162 supporting the substrate 102 proximal its center; and include a substrate 102 and a cover layer that form a substantially rigid structure.

More specifically, the array of spring elements 162 can support the perimeter of the substrate 102, and the substrate 102 and the cover layer can form a substantially rigid structure in order to achieve a ratio of applied force to vertical displacement of the substrate 102 that is approximately consistent or that changes linearly across the total area of the touch sensor surface 172.

6.3.4 Capacitive Force Sensor

In this variation and as described above, the substrate can alternatively include a bottom layer: arranged below the second layer opposite the first layer; and including a set of sensor traces arranged at the set of discrete deflection spacer locations. The system 100 can also include a coupling plate 168 configured to: couple to the chassis adjacent the array of spring elements; and effect (e.g., modify, change) capacitance values of (e.g., within) the set of sensor traces responsive to displacement of the substrate toward the coupling plate 168.

In this variation, the array of spring elements and the coupling plate 168 can form a unitary metallic structure: arranged between the substrate and the chassis; defining a nominal plane; and defining an array of capacitive coupling regions adjacent the set of discrete deflection spacer locations. Each spring element therefore: can be formed in the unitary metallic structure; can extend from a capacitive coupling region, in the array of capacitive coupling regions; and can be configured to return toward the nominal plane in response to absence of inputs applied to the touch sensor surface. Furthermore, each sensor trace: can capacitively couple to an adjacent capacitive coupling region, in the array of capacitive coupling regions, of the unitary metallic structure; and can move toward the adjacent capacitive coupling region in response to application of inputs on the touch sensor surface proximal the sensor trace.

Accordingly, in this variation, the controller can: read capacitance values from the set of sensor traces; interpret a force magnitude of the input applied to the touch sensor surface based on capacitance values read from the set of sensor traces; and drive the oscillating voltage across the multi-layer inductor during the haptic feedback cycle in response to the force magnitude of the input exceeding a threshold force. For example, a first spring element—in the array of spring elements—can yield to a touch input applied to a first region of the touch sensor surface proximal the first spring element at a first time. Accordingly, a first sensor trace—adjacent the first region of the touch sensor surface—moves toward a first capacitive coupling region by a distance proportional to a force magnitude of the input. Accordingly, the controller: detects a first change in capacitance value of the first sensor trace at the first time; interpret the force magnitude of the input based on the first change in capacitance value; and executes a haptic feedback cycle in response to the force magnitude of the input exceeding the threshold force.

In another example, the controller can: read capacitance values from the set of sensor traces at a scan frequency during a first time period; and interpret the force magnitude of the input applied to the touch sensor surface based on capacitance values read from the drive and sense electrode pairs during the first time period. Then, in response to the force magnitude of the input exceeding the threshold force, the controller can: drive an oscillating voltage across the multi-layer inductor during the haptic feedback cycle, following the first time period; and pause reading electrical values from the set of drive and sense electrode pairs during the haptic feedback cycle. The controller can then resume reading capacitance values from the sensor traces following completion of the haptic feedback cycle.

6.3.4.1 Mutual-Capacitance Sensors

In this variation, each sensor trace at a deflection spacer location on the bottom layer of the substrate can form a capacitance sensor arranged in a mutual-capacitance configuration.

For example, each sensor trace 146 can include: a drive electrode arranged on the bottom layer of the substrate 102 adjacent a first side of a support location; and a sense electrode arranged on the bottom layer of the substrate 102 adjacent a second side of the support location opposite the drive electrode. In this example, the drive electrodes and sense electrodes within a sensor trace 146 can capacitively couple, and an air gap between the substrate 102 and the coupling plate 168 can form an air dielectric between the drive electrodes and sense electrodes. When the touch sensor surface 172 is depressed over a sensor trace 146, the adjacent spring element 162 can yield, thereby moving the drive electrodes and sense electrodes of the sensor trace 146 closer to the coupling plate 168 and reducing the air gap between these drive electrodes and sense electrodes. Because the coupling plate 168 exhibits a dielectric greater than air, the reduced distance between the coupling plate 168 and the substrate 102 thus increases the effective dielectric between the drive electrodes and sense electrodes and thus increases the capacitance of the drive electrodes and sense electrodes. The capacitance value of the sensor trace 146 may therefore deviate from a baseline capacitance value—such as in the form of an increase in the charge time of the sensor trace 146, an increase in the discharge time of the sensor trace 146, or a decrease in the resonant frequency of the sensor trace 146—when the touch sensor surface 172 is depressed over the sensor trace 146.

Therefore, in this implementation, the controller 190 can, during a scan cycle: drive the coupling plate 168 to a reference (e.g., ground) potential; (serially) drive each drive electrode in the sensor traces 146, such as a target voltage, over a target time interval, or with an alternating voltage of a particular frequency; read a set of capacitance values—from the sense electrodes in the array of sensor traces 146—that represent measures of mutual capacitances between drive electrodes and sense electrodes of these sensor traces 146; and interpret a distribution of forces applied to the touch sensor surface 172 based on this set of capacitance values and known spring constants of the array of spring elements 162, as described below.

6.3.4.2 Self-Capacitance Sensors

In another implementation, the sensor traces 146 are arranged in a self-capacitance configuration adjacent each support location.

For example, each sensor trace 146 can include a single electrode arranged on the bottom layer of the substrate 102 adjacent (e.g., encircling) a support location, and the coupling plate 168 can function as a common second electrode for each sensor trace 146. In this example, the single electrode within a sensor trace 146 and the coupling plate 168 can capacitively couple, and an air gap between the substrate 102 and the coupling plate 168 can form an air dielectric between the sensor trace 146 and the coupling plate 168. When the touch sensor surface 172 is depressed over the sensor trace 146, the adjacent spring element 162 can yield, thereby: moving the sensor trace 146 closer to the coupling plate 168; reducing the air gap between the sensor trace 146 and the coupling plate 168; and increasing the capacitance between the sensor trace 146 and the coupling plate 168. The capacitance value of the sensor trace 146 may therefore deviate from a baseline capacitance value—such as in the form of an increase in the charge time of the sensor trace 146, an increase in the discharge time of the sensor trace 146, or a decrease in the resonant frequency of the sensor trace 146—when the touch sensor surface 172 is depressed over the sensor trace 146.

Therefore, in this implementation, the controller 190 can, during a scan cycle: drive the coupling plate 168 to a reference (e.g., ground) potential; (serially) drive each sensor trace 146, such as a target voltage, over a target time interval, or with an alternating voltage of a particular frequency; read a set of capacitance values—from the array of sensor traces 146—that represent measures of self capacitances between the sensor traces 146 and the coupling plate 168; and interpret a distribution of forces applied to the touch sensor surface 172 based on this set of capacitance values and known spring constants of the array of spring elements 162, as described below.

6.3.4.3 Separate Coupling Plate Between Spring Plate and Substrate

The coupling plate 168 is configured to: couple to the chassis adjacent the array of spring elements 162; and effect capacitance values of the array of sensor traces 146 responsive to displacement of the substrate 102 toward the coupling plate 168.

Figure 21:
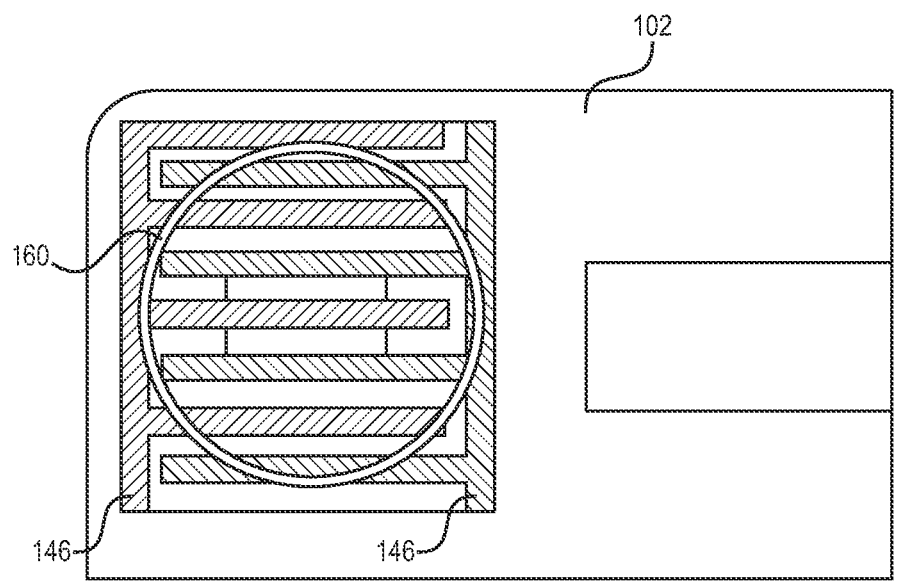
FIG. 21 is a schematic representation of one variation of the system.
Figure 22:
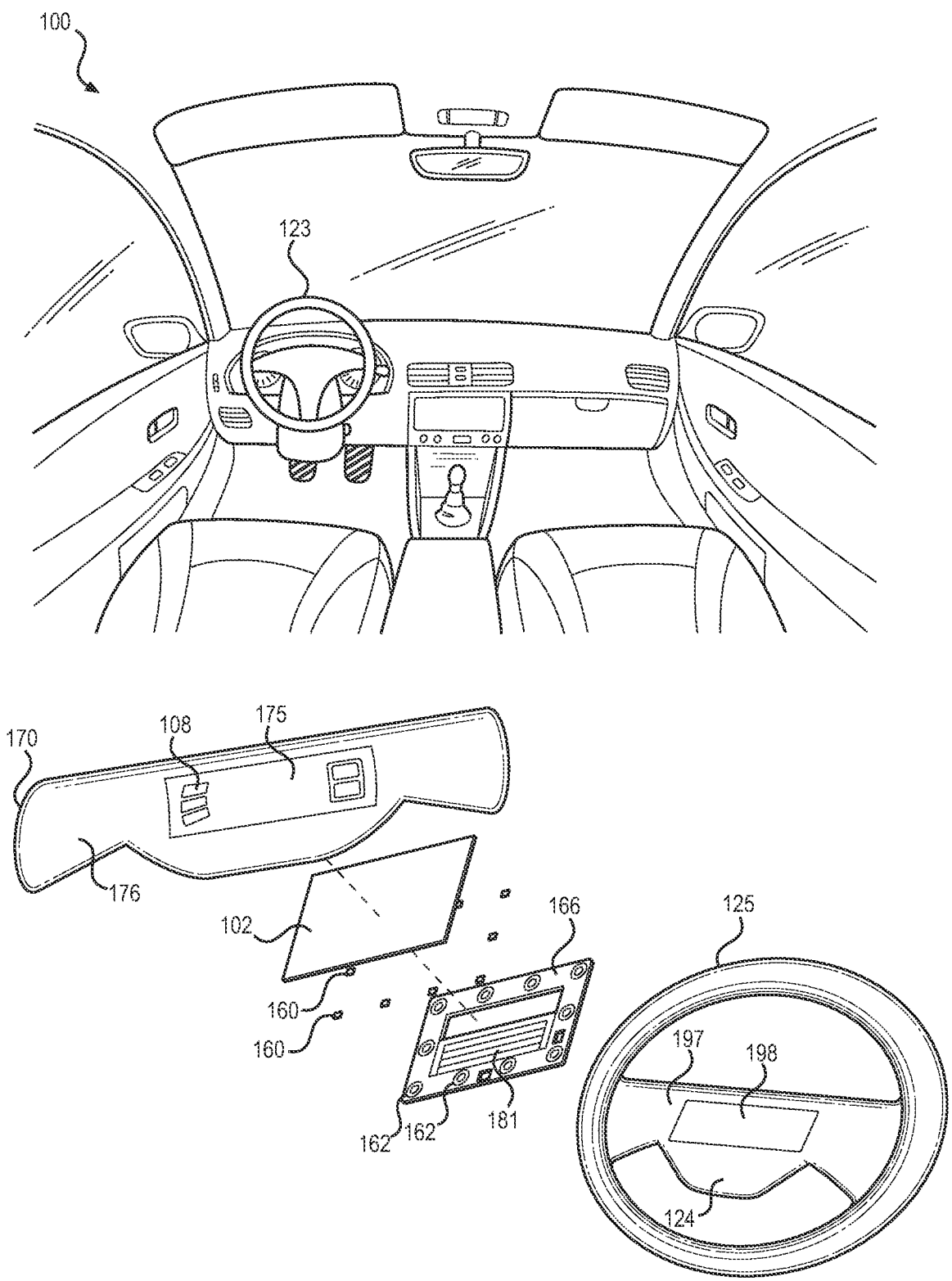
FIG. 22 is a schematic representation of one variation of the system.

In one implementation shown in FIG. 21, the coupling plate 168 defines a discrete structure interposed between the baseplate 166 and the substrate 102 and rigidly mounted to the chassis of the computing device.

Generally, in this implementation, the coupling plate 168: can be interposed between the array of spring elements 162 and the substrate 102; can include an array of perforations aligned (e.g., coaxial) with the array of support locations and the array of spring elements 162 and defining geometries similar to (and slightly larger than) the stages on the spring elements 162; and define an array of capacitive coupling regions adjacent (e.g., encircling) the array of perforations. For example, the coupling plate 168 can include a thin-walled structure (e.g., a stainless steel 20-gage, or 0.8-millimeter-thick sheet) that is punched, etched, or laser-cut to form the array of perforations. In this implementation, each sensor trace 146 (e.g., drive electrodes and sense electrodes in the mutual capacitance configuration, a single electrode in the self capacitance configuration) can extend around a support location on the bottom layer of the substrate 102, such as up to a perimeter of the adjacent perforation in the coupling plate 168 such that the sensor trace 146 (predominantly) capacitively couples to the adjacent capacitive coupling region on the coupling plate 168 rather than the adjacent spring element 162.

Furthermore, in this implementation, the system 100 can further include a set of deflection spacers 160, each of which: extends through a perforation in the coupling plate 168; is (slightly) undersized for the perforation; and couples an adjacent support location on the bottom layer of the substrate 102 to an adjacent spring element 162 in the baseplate 166. For example, each deflection spacer 160 can include a silicone coupon bonded (e.g., with a pressure-sensitive adhesive) to the stage of an adjacent spring element 162 on one side and to the adjacent support location on the substrate 102 on the opposing side.

Therefore, in this implementation, each sensor trace 146 can: capacitively couple to an adjacent capacitive coupling region of the coupling plate 168; and move toward the adjacent capacitive coupling region on the coupling plate 168 in response to application of a force on the touch sensor surface 172 proximal the sensor trace 146, which yields a change in the capacitance value of the sensor trace 146 representative of the portion of the force of this input carried the adjacent spring element 162. More specifically, because the coupling plate 168 is rigid and mechanically isolated from the substrate 102 and the spring elements 162, the capacitive coupling regions of the coupling plate 168 can remain at consistent positions offset above the chassis receptacle such that application of a force to the touch sensor surface 172 compresses all or a subset of the spring elements 162, moves all or a subset of the sensor traces 146 closer to their corresponding capacitive coupling regions, and repeatably changes the capacitance values of these sensor traces 146 as a function of (e.g., proportional to) the force magnitudes carried by the spring elements 162, which the controller 180 can then interpret to accurately estimate these force magnitudes, the total force applied to the touch sensor surface 172, and/or force magnitudes of individual touch inputs applied to the touch sensor surface 172.

Furthermore, in this implementation, the deflection spacer 160 can define a height approximating (or slightly greater than) a height of the maximum vertical compression of the adjacent spring element 162 corresponding to a target dynamic range of the adjacent sensor trace 146. For example, for a target dynamic range of 2 Newtons (e.g., 200 grams) for a pressure sensor given a maximum of one millimeter of vertical displacement of the touch sensor surface 172—and therefore a maximum of one millimeter of compression of the adjacent spring element 162—the spring element 162 can be tuned for a spring constant of 2000 Newtons per meter. Furthermore, the deflection spacer 160 can be of a height of approximately one millimeter, plus the thickness of the coupling plate 168 and/or a stack tolerance (e.g., 10%, of 0.1 millimeter).

In this implementation, the coupling plate 168 and the baseplate 166 can be fastened directly to the chassis of the computing device. Alternatively, the coupling plate 168 and the baseplate 166 can be mounted (e.g., fastened, riveted, welded, crimped) to a separate interface plate that is then fastened or otherwise mounted to the chassis. The system 100 can also include a non-conductive buffer layer arranged between the baseplate 166 and the coupling plate 168, in order to electrically isolate the baseplate 166 from the coupling plate 168.

6.3.4.4 Integral Coupling Plate and Spring Plate

In another implementation, the coupling plate 168 and the baseplate 166 define a single unitary (e.g., metallic) structure arranged between the substrate 102 and the chassis.

Generally, in this implementation, the unitary metallic structure can define: a nominal plane between the chassis receptacle and the substrate 102; and an array of capacitive coupling regions adjacent (e.g., aligned to, coaxial with) the array of support locations on the substrate 102. In this implementation, each spring element 162: can be formed in the unitary metallic structure (e.g., by etching, laser cutting); can extend from its adjacent capacitive coupling region; can define a stage coupled to the corresponding support location on the bottom layer of the substrate 102 (e.g., via a deflection spacer 160 as described above); and can be configured to return to approximately the nominal plane in response to absence of a touch input applied to the touch sensor surface 172.

When the unitary structure is rigidly mounted to the chassis of the computing device, the unitary structure can thus rigidly locate the capacitive coupling regions relative to the chassis and within (or parallel to) the nominal plane, and the stages of the spring elements 162 can move vertically relative to the nominal plane and the capacitive coupling regions.

Thus, each sensor trace 146 on the substrate 102 can: capacitively couple to an adjacent capacitive coupling region on the unitary metallic structure; and move toward this adjacent capacitive coupling region in response to application of a force on the touch sensor surface 172 proximal the sensor trace 146, which thus changes the capacitance value of the sensor trace 146 proportional to compression of the adjacent spring element 162 and therefore proportional to the portion of the force carried by the spring element 162.

Furthermore, in this implementation, the unitary metallic structure can be fastened directly to the chassis of the computing device. Alternatively, the unitary metallic structure can be mounted (e.g., fastened, riveted, welded, crimped) to a separate baseplate that is then fastened or otherwise mounted to the chassis.

6.4 Example: Baseplate+Chassis Integration

Figure 23:
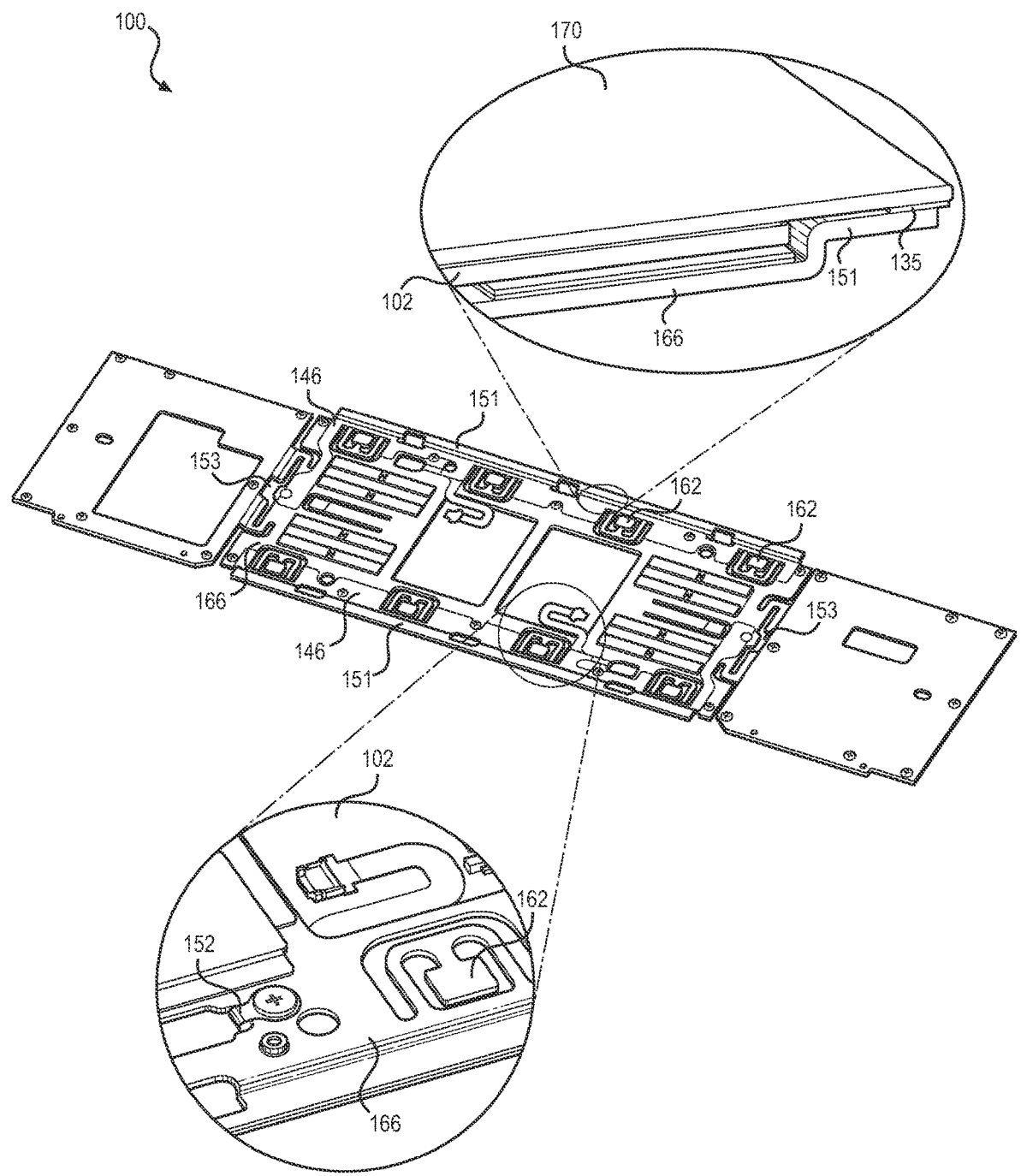
FIG. 23 is a schematic representation of one variation of the system.

In one example, shown in FIG. 23, the system 100 includes a baseplate 166 including: a set of spring elements 162 arranged (e.g., stamped) proximal lateral sides of the baseplate 166; a set of glass support flanges 151 extending from the lateral sides of the baseplate 166; a ground trace 152 coupling the force flex layer across the baseplate 166 to a ground pad on the substrate 102; and a set of baseplate slots 153 configured to alleviate stress and displacement when coupling the baseplate 166 to the chassis 192. In this example, the set of spring elements 162: are fabricated (e.g., stamped) along the periphery of the baseplate 166; and locates a stage of each spring element, in the set of spring elements 162, proximal drive electrodes arranged on the force flex layer.

Additionally, the system 100 includes a set of glass support flanges 151 extending from lateral edges of the baseplate 166 and configured to support the cover layer 170 (e.g., glass layer) by minimizing a thickness of shims arranged across a periphery of the cover layer 170. In particular, the baseplate 166 can include: a center region defining a nominal plane; a first glass support flange extending across a first lateral edge of the baseplate and located above the nominal plane; and a second glass support flange extending across the second lateral edge, opposite the first lateral edge, of the baseplate and located above the nominal plane. Thus, the first glass support flange and the second glass support flange: cooperate to support the cover layer 170 over the center region of the baseplate; and forms a cavity to located the substrate within the baseplate.

Furthermore, the baseplate 166 includes a set of baseplate slots 153 fabricated at target locations on the baseplate 166 and configured to accommodate expected chassis 192 tolerances (e.g., stress, displacement). In particular the baseplate 166 can include: a center region; a first support region arranged adjacent the center region; a first coupling region connecting the first support region and the center region; and a first set of slots interposed between the first support region and the center region. Additionally, the baseplate 166 can include: a second support region, opposite the first support region, and adjacent the center region; a second coupling region connecting the second support region and the center region; and a second set of slots interposed between the second support region and the center region. Thus, when the baseplate 166 is coupled to a chassis 192 (e.g., via screws) the first set of slots and the second set of slots arranged on the baseplate cooperate to alleviate stress and displacement during operation of the system 100.

7. Ground Plane Geometry and Shielding

The substrate 102 can further include a shielding trace fabricated in a conductive layer and configured to shield the touch sensor from electrical noise generated by the multi-layer inductor 150, such as during and after a haptic feedback cycle.

In one implementation, the substrate 102 further includes an intermediate layer 106 interposed between: the top layer 104, which contains the drive and sense electrode pairs 105; and the first layer 110 of the substrate 102 that contains the topmost spiral trace of the multi-layer inductor 150. In this implementation, the intermediate layer 106 can include a contiguous trace area that defines an electrical shield 107 configured to shield the set of drive and sense electrode pairs 105 of the touch sensor from electrical noise generated by the multi-layer inductor 150 when driven with an oscillating voltage by the controller 190 during a haptic feedback cycle. In particular, the controller 190 can drive the electrical shield 107 in the intermediate layer 106 to a reference voltage potential (e.g., to ground, to an intermediate voltage), such as: continuously throughout operation; or intermittently, such as during and/or slightly after a haptic feedback cycle. Thus, when driven to the reference potential, the electrical shield 107 can shield the drive and sense electrode pairs 105 of the touch sensor in the top layer 104 from electrical noise.

Furthermore, the electrical shield 107 can include a cleft—such as in the form of a serpentine break across the width of the electrical shield 107—in order to prevent circulation of Eddy currents within the electrical shield 107, which may otherwise: create noise at the drive and sense electrode pairs 105 in the touch sensor above; and/or induce a second magnetic field opposing the magnetic field generated by the multi-layer inductor 150, which may brake oscillation of the substrate 102 during a haptic feedback cycle.

Additionally or alternatively, in the configuration described above in which the system 100 includes sensor traces 146 at deflection space locations on the bottom layer 140 of the substrate 102, the first layer 110 of the substrate 102—arranged below the top layer 104 and/or the intermediate layer 106 and containing the first spiral trace 11 of the multi-layer inductor 150—can include an electrical shield 107 separate from and encircling the first spiral trace 11. In this implementation, the controller 190 can drive both this electrical shield 107 in the first layer 110 and the multi-layer inductor 150 to a reference voltage potential (e.g., to ground, to an intermediate voltage)—outside of haptic feedback cycles—in order to: shield these sensor traces 146 from electrical noise from outside of the system 100; and/or shield the drive and sense electrode pairs 105 in the touch sensor from electrical noise generated by these sensor traces 146. Therefore in this implementation, the first layer 110 of the substrate 102—containing the first spiral trace 111 of the multi-layer inductor 150—can further include a shield electrode trace 112 adjacent and offset from the first spiral trace nil; and the controller 190 can drive the shield electrode trace 112 and the first spiral trace 111 to a reference potential in order to shield the second set of sensor traces 146—at the deflection spacer locations—from electrical noise when reading electrical values from these sensor traces 146.

For example, in this implementation, the controller 190 can hold the multi-layer inductor 150 (or a topmost spiral trace in the multi-layer inductor 150) at a virtual ground potential while scanning and processing resistance (or capacitance) data from drive and sense electrode pairs 105 in the touch sensor in the top conductive layer(s) of the substrate 102 during a scan cycle. The controller 190 can subsequently: detect an input on the touch sensor surface 172 based on a change in resistance (or capacitance) values read from drive and sense electrode pairs 105 in the touch sensor; release the multi-layer inductor 150 from the virtual reference potential; and polarize the multi-layer inductor 150 via a time-varying current signal during a haptic feedback cycle responsive to detecting this input on the touch sensor surface 172. More specifically, the controller 190 can: ground the electrical shield 107 and the multi-layer inductor 150 during a scan cycle in order to shield the touch sensor from electronic noise; and pause scanning of the touch sensor during haptic feedback cycles (e.g., while the multi-layer inductor 150 is polarized) in order to avoid generating and responding to noisy touch images during haptic feedback cycles.

Thus, in this variation, power electronics (e.g., the multi-layer inductor 150) and sensor electronics in both high- and low-resolution sensors (e.g., drive and sense electrode pairs 105 in the touch sensor and sensor traces 146 at the deflection spacer locations, respectively) can be fabricated on a single, unitary substrate 102, thereby eliminating manufacture and assembly of multiple discrete substrates for different haptic feedback and touch-sensing functions and enable the system 100 to perform touch sensing, force-sensing, and haptic feedback functions in a thinner package.

8. Controller

During operation, the controller 190 can: detect application of an input on the touch sensor surface 172 based on changes in electrical (e.g., capacitance or resistance, etc.) values between drive and sense electrode pairs 105 in the touch sensor integrated into the top layer(s) 104 of the substrate 102; characterize a force magnitude of the input based on these electrical values read from the touch sensor and/or based on electrical values read from sensor traces 146 in the deflection spacers 160 integrated into the bottom layer(s) 140 of the substrate 102; and/or interpret the input as a "click" input if the force magnitude of the input exceeds a threshold force magnitude (e.g., 160 grams). Then, in response to detecting the input and/or interpreting the input as a "click" input, the controller 190 can execute a haptic feedback cycle, such as by transiently polarizing the multi-layer inductor 150 in order to induce alternating magnetic coupling between the multi-layer inductor 150 and the set of magnetic elements and thus vibrating the substrate 102 within the chassis 192, serving haptic feedback to a user, and providing the user with tactile perception of downward travel of the touch sensor surface 172 analogous to depression of a mechanical momentary switch, button, or key.

8.1 Controller Mounted to Substrate

In the foregoing configurations: the controller 190 (and/or a driver) is mounted to the substrate 102, such as opposite the touch sensor (on the inner face of the substrate 102); and the system 100 further includes a flexible circuit extending between the substrate 102 and the chassis 192 and electrically coupled to a power supply arranged in the chassis 192. Thus, in this configuration, the controller 190 can: read electrical values between drive and sense electrode pairs 105 in the touch sensor or otherwise sample the adjacent touch sensor directly; generate a sequence of touch images based on these electrical values between drive and sense electrode pairs 105 in the touch sensor; and then output this sequence of touch images to a processor arranged in the chassis 192 via the flexible circuit. Furthermore, the driver can intermittently source current from the power supply to the multi-layer inductor 150 via the flexible circuit responsive to triggers from the adjacent controller 190. Thus, in this configuration, the touch sensor assembly can include the substrate 102, the touch sensor, (the touch sensor surface 172,) the controller 190, the driver, the multi-layer inductor 150, and the flexible circuit in a self-contained unit. This self-contained unit can then be installed over a receptacle 194 in a chassis 192 and the flexible circuit can be connected to a power and data port in the receptacle 194 to complete assembly of the system 100 into this device.

9. Haptic Feedback Cycle

In this variation, the multi-layer inductor 150—integrated into the substrate 102—and the set of magnetic elements—housed within the chassis 192 below the multi-layer inductor 150—cooperate to define a compact, integrated multi-layer inductor 150 configured to oscillate the substrate 102 and the touch sensor surface 172 responsive to polarization of the multi-layer inductor 150 by the controller 190 (e.g., in response detecting touch inputs on the touch sensor surface 172). More specifically, the controller 190, in conjunction with a drive circuit, can supply an alternating (i.e., time-varying) drive current to the multi-layer inductor 150 during a haptic feedback cycle, thereby generating a time-varying magnetic field through the multi-layer inductor 150 that periodically reverses direction. Thus, the controller 190 and/or the drive circuit can transiently polarize the multi-layer inductor 150 to generate magnetic forces between the multi-layer inductor 150 and the set of magnetic elements, thereby causing the multi-layer inductor 150 (and thus the substrate 102 and touch sensor surface 172) to be alternately attracted and repelled by poles of the set of magnetic elements and oscillating the touch sensor surface 172 relative to the chassis 192.

In particular, in response to detecting a touch input—on the touch sensor surface 172—that exceeds a threshold force (or pressure) magnitude, the controller 190 drives the multi-layer inductor 150 during a "haptic feedback cycle" in order to tactilely mimic actuation of a mechanical snap button. For example, in response to such a touch input, the controller 190 can trigger a motor driver to drive the multi-layer inductor 150 with a square-wave alternating voltage for a target click duration (e.g., 250 milliseconds), thereby inducing an alternating magnetic field through the multi-layer inductor 150, which magnetically couples to the set of magnetic elements, induces an oscillating force between the magnetic element and the multi-layer inductor 150, and oscillates the substrate 102 relative to the chassis 192 of the device.

9.1 Standard Click and Deep Click

In one variation, the controller 190: executes a "standard-click haptic feedback cycle" in Blocks Silo and S120 in response to application of a force that exceeds a first force magnitude and that remains less than a second force threshold (hereinafter a "standard click input"); and executes a "deep haptic feedback cycle" in Blocks S114 and S124 in response to application of a force that exceeds the second force threshold (hereinafter a "deep click input"). In this variation, during a deep haptic feedback cycle, the controller 190 can drive the multi-layer inductor 150 for an extended duration of time (e.g., 750 milliseconds), at a higher amplitude (e.g., by driving the haptic feedback cycle at a higher peak-to-peak voltage), and/or at a different (e.g., lower) frequency in order to tactilely indicate to a user that a deep click input was detected at the touch sensor surface 172.

In one example, the controller 190 can: output a left-click control command and execute a standard-click haptic feedback cycle in response to detecting an input of force magnitude between a low "standard" force threshold and a high "deep" force threshold; and output a right-click control command function and execute a deep-haptic feedback cycle in response to detecting an input of force magnitude greater than the high "deep" force threshold. The system 100 can therefore: detect inputs of different force magnitudes on the touch sensor surface 172; assign an input type to an input based on its magnitude; serve different haptic feedback to the user by driving the multi-layer inductor 150 according to different schema based on the type of a detected input; and output different control functions based on the type of the detected input.

9.2 Hysteresis

In one variation, the controller 190 implements hysteresis techniques to trigger haptic feedback cycles during application and retraction of a single input on the touch sensor surface 172. In particular, in this variation, the controller 190 can selectively: drive the multi-layer inductor 150 according to a "down-click" oscillation profile during a haptic feedback cycle in response to detecting a new input—of force greater than a high force threshold (e.g., 165 grams)—applied to the touch sensor surface 172; track this input in contact with the touch sensor surface 172 over multiple scan cycles; and then drive the multi-layer inductor 150 according to an "up-click" oscillation profile during a later haptic feedback cycle in response to detecting a drop in force magnitude of this input to less than a low force threshold (e.g., 60 grams). Accordingly, the system 100 can: replicate the tactile "feel" of a mechanical snap button being depressed and later released; and prevent "bouncing" haptic feedback when the force magnitude of an input on the touch sensor surface 172 varies around the force threshold.

More specifically, when the force magnitude of an input on the touch sensor surface 172 reaches a high force threshold, the controller 190 can execute a single "down-click" haptic feedback cycle—suggestive of depression of a mechanical button—until the input is released from the touch sensor surface 172. However, the controller 190 can also execute an "up-click" haptic feedback cycle—suggestive of release of a depressed mechanical button—as the force magnitude of this input drops below a second, lower threshold magnitude. Therefore, the controller 190 can implement hysteresis techniques to prevent "bouncing" in haptic responses to the inputs on the touch sensor surface 172, to indicate to a user that a force applied to the touch sensor surface 172 has been registered (i.e., has reached a first threshold magnitude) through haptic feedback, and to indicate to the user that the user's selection has been cleared and force applied to the touch sensor surface 172 has been registered (i.e., the applied force has dropped below a second threshold magnitude) through additional haptic feedback.

10. Seamless Touch Sensor

Generally, the system 100: includes a trackpad module integrated into a human-computer interface system 100 (e.g., a laptop device, mobile device, steering wheel 123); defining a seamless trackpad surface; and can trigger haptic feedback cycles configured to oscillate normal to the seamless trackpad surface (hereinafter in a "z-direction"). In particular, the system 100 includes a cover layer 170: arranged over the substrate 102 to define an active touch region 175 configured to receive touch inputs and an inactive touch region 176 encompassing the active touch region 175; and coupled to a chassis 192 (e.g., laptop, mobile device) to define the continuous touch sensor surface 172. Additionally, the inactive touch region 176 of the cover layer 170 is coupled (e.g., bonded) to: support the active touch region 175; and dampen oscillations across the inactive touch region 176 during execution of a haptic feedback cycle.

The system 100 can include: a substrate 102; a cover layer 170 (e.g., aluminosilicate glass); an array of spring elements 162; a coupling plate 168; a haptic feedback actuator; and a controller 190. The substrate 102 includes: a top layer 104; a bottom layer 140; an array of force sensors 147 arranged on the bottom layer 140; and an array of support locations arranged on the bottom layer 140 adjacent the array of force sensors 147. The cover layer 170 (e.g., cover layer 170, PET layer): includes a top surface defining a touch sensor surface 172 and a bottom surface extending across the top layer 104 of the substrate 102; and is bonded (e.g., with a pressure sensitive adhesive) to the top layer 104 of the substrate 102.

The array of spring elements 162 is configured to couple the substrate 102 to the chassis 192 and to yield to displacement of the substrate 102 downward toward the chassis 192 responsive to forces applied to the touch sensor surface 172, each spring element in the array of spring elements 162 coupled to the substrate 102 at a support location in the array of support locations. The coupling plate 168 is configured to couple to the chassis 192 adjacent the array of spring elements 162 and effect capacitance values of the array of force sensors 147 responsive to displacement of the substrate 102 toward the coupling plate 168.

The haptic feedback actuator: is arranged below the substrate 102; and is configured to oscillate the touch sensor surface 172 in a vertical direction (i.e., the z-direction) in response to interpreting a force magnitude exceeding a target force magnitude for an input applied to the touch sensor surface 172. The controller 190 is configured to read capacitance values from the array of force sensors 147 and interpret force magnitudes of inputs applied to the touch sensor surface 172 based on capacitance values read from the array of force sensors 147.

10.1 Haptics Isolation

In one implementation described in U.S. patent application Ser. No. 17/367,572, filed on 5 Jul. 2021, which is incorporated in its entirety by this reference, the system 100 includes a haptic feedback actuator configured to oscillate an active touch region 175 of the touch sensor surface 172 while isolating inactive touch regions 176 of the touch sensor surface 172 from haptic response.

In one example, the substrate 102 includes: a top layer 104; a bottom layer 140; an array of force sensors 147 arranged on the bottom layer 140; and an array of support locations arranged on the bottom layer 140 adjacent the array of force sensors 147. The cover layer 170 includes: a top layer 104; a bottom layer 140; and an indicator 178 (e.g., a rectangular indicia) etched on the top layer 104. The indicator 178 defines: an active touch region 175 on the top layer 104 of the touch sensor surface 172; and inactive touch regions 176 surrounding the active touch region 175 on the touch sensor surface 172. The top layer 104 of the substrate 102 is bonded to the bottom layer 140 of the cover layer 170 adjacent the indicator 178 defining the active touch region 175 on the touch sensor surface 172 responsive to touch inputs. Therefore, the cover layer 170 extends across the top layer 104 of the substrate 102 and defines the active touch region 175 of the cover layer 170 responsive to touch inputs applied to the touch sensor surface 172.

In another implementation, the system 100 includes a baseplate 166: defining a left section, a right section, and a center section supporting a set of haptic feedback actuators; and located below the cover layer 170. In this implementation, the cover layer 170 defines: a left region (fully or partially) laminated to the left section of the baseplate 166; a right region (fully or partially) laminated to the right section of the baseplate 166; and a center region bonded to the substrate 102 and positioned over the set of haptic feedback actuators on the center section of the baseplate 166. In particular, the baseplate 166: dampens oscillations induced by the set of haptic feedback actuators on the left and right regions of the cover layer 170 (partially or fully) laminated to the baseplate 166; and therefore, in this implementation, the baseplate 166 can isolate inactive touch regions 176 of the touch sensor surface 172 from haptic feedback response triggered for the active touch region 175 on the touch sensor surface 172.

In one variation of the implementation, the system 100 includes a baseplate 166 defining a center section supporting a set of haptic feedback actuators. In this variation, the system 100 further includes a left supporting member defining a left section adjacent a left side of the base plate and a right supporting member defining a left section adjacent a right side of the baseplate 166. The cover layer 170 is arranged over the baseplate 166, left supporting member, and right supporting member configured to span across each of the left section, center section, and right section.

For example, the system 100 can include: a substrate 102; a cover layer 170; an array of spring elements 162; a haptic feedback actuator; and a baseplate 166. The substrate 102 includes a top layer 104; a bottom layer 140; an array of force sensors 147 arranged on the bottom layer 140; and an array of support locations arranged on the bottom layer 140 adjacent the array of force sensors 147. The cover layer 170 includes: a top layer 104; a bottom layer 140; and an indicator 178 (e.g., a rectangular indicia) etched on the top layer 104. The indicator 178 defines: an active touch region 175 on the top layer 104 of the touch sensor surface 172; and inactive touch regions 176 surrounding the active touch region 175 on the touch sensor surface 172. The top layer 104 of the substrate 102 is bonded to the bottom layer 140 of the cover layer 170 adjacent the indicator 178 defining the active touch region 175 on the touch sensor surface 172 responsive to touch inputs. The inactive touch regions 176 on the bottom layer 140 of the cover layer 170 are then partially bonded and/or fixed to the baseplate 166. The array of spring elements 162 is configured to couple the substrate 102 to the baseplate 166 and to yield to displacement of the substrate 102 downward toward the chassis 192 responsive to forces applied to the touch sensor surface 172. The haptic feedback actuator: is arranged below the substrate 102; and is configured to oscillate the substrate 102 in a vertical direction (i.e., the z-direction) in response to force inputs applied to active touch regions 175 on the touch sensor surface 172.

Therefore, the baseplate 166 and the spring elements 162 can define a unitary structure to support all regions of the cover layer 170. Furthermore, the system 100 can trigger haptic feedback for active touch regions 175 on the cover layer 170 responsive to force inputs on the touch sensor surface 172. The bonding and/or coupling of the cover layer 170 to the chassis 192 isolates the inactive touch regions 176 from oscillations resulting from the triggering of haptic feedback for the active touch region 175 of the touch sensor surface 172.

10.2 Bonded Trackpad Module

In one implementation, the system 100 includes a touch and haptics printed circuit board assembly (PCBA) bonded directly to a bottom surface of a cover layer 170 and a chassis 192 of a human-computer interface system 100 (e.g., a laptop device). In this implementation, the cover layer 170 is bonded (e.g., pressure sensitive adhesive) to the chassis 192 to: couple the touch and haptics PCBA to the human-interface system 100; and isolate inactive touch regions 176 from active touch regions 175 responsive to touch inputs applied on the touch sensor surface 172.

For example, the system 100 can include: a substrate 102; a cover layer 170; an array of spring elements 162; a coupling plate 168; a first haptic feedback actuator; and a chassis 192. The substrate 102 includes: a top layer 104; a bottom layer 140; an array of force sensors 147 arranged on the bottom layer 140; and an array of support locations arranged on the bottom layer 140 adjacent the array of force sensors 147. The cover layer 170 includes: a top layer 104; a bottom layer 140; an indicator 178 (e.g., a rectangular indicia) etched on the top layer 104; and a pressure sensitive adhesive (PSA) arranged on the bottom layer 140. The indicator 178 defines: an active touch region 175 on the top layer 104 of the touch sensor surface 172; and inactive touch regions 176 surrounding the active touch region 175 on the touch sensor surface 172. The top layer 104 of the substrate 102 is bonded to the bottom layer 140 of the cover layer 170 adjacent the indicator 178 defining the active touch region 175 on the touch sensor surface 172 responsive to touch inputs. The pressure sensitive adhesive can be aligned about a perimeter (e.g., a C-shape configuration on opposing side ends of the bottom layer 140) of the inactive touch regions 176 on the bottom layer 140 of the cover layer 170. The inactive touch regions 176 of the bottom layer 140 of the cover layer 170 are bonded to the chassis 192 to isolate the inactive touch regions 176 from haptic response. The array of spring elements 162 is configured to couple the substrate 102 to the chassis 192 and to yield to displacement of the substrate 102 downward toward the chassis 192 responsive to forces applied to the touch sensor surface 172, each spring element in the array of spring elements 162 coupled to the substrate 102 at a support location in the array of support locations. The coupling plate 168 is configured to couple to the chassis 192 adjacent the array of spring elements 162 and effect capacitance values of the array of force sensors 147 responsive to displacement of the substrate 102 toward the coupling plate 168. The haptic feedback actuator: is arranged below the substrate 102; and is configured to oscillate the active touch region 175 on the touch sensor surface 172 in a vertical direction (i.e., the z-direction) in response to interpreting a force magnitude exceeding a target force magnitude for an input applied to the touch sensor surface 172. The system 100 can therefore provide a seamless touch module that can be implemented into a computing device (e.g., a laptop device) while triggering haptic response for active touch regions 175 on the touch sensor surface 172.

10.3 Self-Contained Trackpad Module

In one implementation, the system 100 can include: a baseplate 166; a touch and haptics printed circuit board assembly (PCBA); and a cover layer 170. The cover layer 170 is: bonded to the touch and haptics PCBA; and coupled to the baseplate 166 to form a self-contained trackpad module.

For example, the system 100 can include: a substrate 102; a cover layer 170; an array of spring elements 162; a coupling plate 168; a first set of haptic feedback actuators; and a baseplate 166. The substrate 102 includes: a top layer 104; a bottom layer 140; an array of force sensors 147 arranged on the bottom layer 140; and an array of support locations arranged on the bottom layer 140 adjacent the array of force sensors 147. The cover layer 170 includes: a top layer 104; a bottom layer 140; and an indicator 178 (e.g., a rectangular indicia) etched on the top layer 104. The indicator 178 defines: an active touch region 175 on the top layer 104 of the touch sensor surface 172; and inactive touch regions 176 surrounding the active touch region 175 on the touch sensor surface 172. The top layer 104 of the substrate 102 is bonded to the bottom layer 140 of the cover layer 170 adjacent the indicator 178 defining the active touch region 175 on the touch sensor surface 172 responsive to touch inputs. The baseplate 166 includes: a top surface; outer sections; and inserts arranged on the top surface configured to couple the cover layer 170 to the baseplate 166. The outer sections of the baseplate 166 are aligned with the inactive touch regions 176 of the cover layer 170 when the baseplate 166 couples the cover layer 170 to isolate the inactive touch regions 176 from haptic response. The array of spring elements 162 is configured to couple the substrate 102 to the baseplate 166 and to yield to displacement of the substrate 102 downward toward the baseplate 166 responsive to forces applied to the touch sensor surface 172, each spring element in the array of spring elements 162 coupled to the substrate 102 at a support location in the array of support locations. The coupling plate 168 is configured to couple to the baseplate 166 adjacent the array of spring elements 162 and effect capacitance values of the array of force sensors 147 responsive to displacement of the substrate 102 toward the coupling plate 168. The first set of haptic feedback actuators are: arranged below the substrate 102; coupled to the baseplate 166; and configured to oscillate the active touch region 175 on the touch sensor surface 172 in a vertical direction (i.e., the z-direction) in response to interpreting a force magnitude exceeding a target force magnitude for an input applied to the touch sensor surface 172. Additionally, each haptic feedback actuator in the first set of haptic feedback actuators is arranged on corner ends of the baseplate 166 to align with corner ends of the substrate 102. The system 100 can therefore provide a self-contained seamless touch module that can be implemented into a computing device (e.g., a laptop device) while triggering haptic response for active touch regions 175 on the touch sensor surface 172.

10.3.1 Trackpad Chassis

In one implementation, the system 100 can form a self-contained trackpad module that defines: a continuous touch sensor surface 172 defining an active touch region 175; and an inactive touch region 176. In this implementation, the chassis 192: couples the inactive touch region 176 of the cover layer 170; and contains the substrate 102 and the baseplate 166 to support the active touch region 175 of the cover layer 170 thus defining a continuous touch sensor surface 172 for a user. During operation, the system 100 can execute a haptic feedback cycle that induces: normal oscillations (i.e., z-direction) across the active touch region 175 of the cover layer 170; and dampened (or "muted") oscillations across the inactive touch region 176 of the cover layer 170.

In one example for a system 100 defining a self-contained trackpad module, the system 100 includes a chassis 192 including: a first support region 197 defining a nominal plane; a second support region 197—arranged opposite the first support region 197—aligned with the nominal plane; and a cavity 198 centrally located on the chassis 192. Additionally, the cavity 198 is: interposed between the first support region 197 and the second support region 197; inset from the nominal plane; and locates the baseplate 166 within the chassis 192. In this example, the cover layer 170: extends entirely across a top area of the chassis 192 to define a continuous surface; forms the first inactive touch region 176 coupled to the first support region 197 on the chassis 192; and defines a first transition region 177 between the first inactive touch region 176 and a first lateral edge of the first active touch region 175; and is configured to oscillate responsive to alternating magnetic coupling between the multi-layer inductor 150 and the first magnetic element 181.

Similarly, the system 100 includes a second inactive touch region 176: arranged opposite the first inactive touch region 176; coupled to the second support region 197 on the chassis 192; and defining a second transition region 177 interposed between a) the second inactive touch region 176 and a second lateral edge, opposite the first lateral edge, of the first active touch region 175. The second inactive touch region 176 is configured to oscillate responsive to alternating magnetic coupling between the multi-layer inductor 150 and the first magnetic element 181.

In the aforementioned example, the chassis 192 can further include a first lead-in feature 199: arranged proximal a first lateral edge of the first support region 197; and defining a first tapered surface transitioning from the first lateral edge of the first support region 197 downward toward a bottom surface of the cavity 198. Furthermore, the cover layer 170 includes the first transition region 177 extending across the first lead-in feature 199 of the chassis 192. Thus, the first transition region 177 cooperates with the first lead-in feature 199 to vertically oscillate the first active touch region 175 responsive to alternating magnetic coupling between the multi-layer inductor 150 and the first magnetic element 181.

Therefore, the system 100 can: include a cover layer 170 that defines an active touch region 175, a transition region 177, and an inactive touch region 176; and trigger haptic feedback cycles responsive to application of a touch input on an active touch region 175 to induce normal oscillations across the active touch region 175 and the transition region 177 of the cover layer 170.

Additionally or alternatively, the system 100 can include an indicator 178: arranged about a periphery of the active touch region 175 on the cover layer 170; and visually representing a boundary of the active touch region 175. For example, the system 100 can include an array of light elements 179 defining an indicator 178 about a periphery of the first active touch region 175 on the cover layer 170. Each light element in the array of light elements 179: is arranged on the top layer 104 of the substrate 102 adjacent a lateral edge of the substrate 102; faces the first active touch region 175 of the cover layer 170; and is configured to illuminate a periphery of the first active touch region 175 on the cover layer 170. Alternatively, the system 100 can include the indicator 178 printed and/or marked directly on the cover layer 170 about the periphery of the active touch region 175.

10.4 Transition Zone

In one implementation, the system 100 can include: a touch and haptics printed circuit board assembly (PCBA); a baseplate 166; and a cover layer 170. The baseplate 166 defines: a left section defining a left bonding zone; a right section defining a right bonding zone; and a center section inset below the left bonding zone and the right bonding zone of the baseplate 166 and defining a pocket. The baseplate 166 is located below the cover layer 170. The cover layer 170 defines: a left region (fully or partially) laminated to the left section of the baseplate 166; a right region (fully or partially) laminated to the right section of the baseplate 166; and a center region bonded to the touch and haptics printed circuit board assembly and coupled within the pocket of the baseplate 166. In particular, the baseplate 166 supports the cover layer 170 to define: rigid regions of glass (fully or partially) laminated to the bonding zones of the baseplate 166; flexible regions of glass that are not laminated to the baseplate 166; and transition regions 177 of glass between the bonding zones of the baseplate 166 and the touch and haptics printed circuit board assembly coupled within the pocket of the baseplate 166. Therefore, in this implementation, the transition region 177: defines a narrow section (e.g., between 18 mm and 23 mm) of the cover layer 170 between the bonded zone and the active touch region 175; defines an unsupported region of the cover layer 170; and functions to transition the cover layer 170 between attenuated oscillation at the bonded zone and less-constrained (e.g., maximum) oscillation at the active touch region 175 during a haptic feedback cycle.

In this implementation, the baseplate 166 can also define: a left lead-in feature 199 along a lateral edge of the left section; and a right lead-in feature 199 along a lateral edge of the right section. As described above, the center section of the baseplate 166 can be inset below the left section and right section of the baseplate 166 and defining a pocket, and the left and right lead-in features 199 can define tapered surfaces that transition downwardly toward the center section, such as at an angle between 30 degrees and 75 degrees below the cover layer 170. The cover layer 170 is (fully or partially) laminated to the baseplate 166 to define: a left transition region 177 extending (e.g., between 18 mm and 23 mm) over the left lead-in feature 199 of the baseplate 166; and a right transition region 177 extending (e.g., between 18 mm and 23 mm) over the right lead-in feature 199 of the baseplate 166.

In one example, the left lead-in feature 199: is defined by a left incline with respect to the cover layer 170 (e.g., between 30 degrees and 35 degrees); and is configured to smooths the transition between the lateral edge of the left section of the baseplate 166 and the pocket of the baseplate 166. Additionally, the right lead-in feature 199: is defined by a right incline with respect to the cover layer 170 (e.g., between 30 degrees and 35 degrees); and smooths the transition between the lateral edge of the right section of the baseplate 166 and the pocket of the baseplate 166. In one variation of this implementation the incline of the lead-in feature 199 is directly proportional to a thickness of the cover layer 170. In another variation of this implementation the include of the lead-in feature 199 is directly proportional to a durometer of the pressure sensitive adhesive bonding the cover layer 170 to the baseplate 166. Therefore, in this implementation, the lead-in features 199 of the baseplate 166 can cooperate with the transition regions 177 of the cover layer 170 to function as relief from the rigid regions of glass to enable active touch regions 175 of the touch sensor surface 172 to oscillate vertically.

10.5 Sealing Element

In one implementation, the system 100 can include: a touch and haptics printed circuit board assembly (PCBA); a baseplate 166; a cover layer 170; and a sealing element (e.g., foam insert) configured to reduce exposure of the system 100 to moisture and/or dust particles when integrating the system 100 into a self-contained or bonded trackpad module.

10.5.1 Sealing Element: Foam Insert

In one implementation, the sealing element includes a foam insert arranged about a perimeter of the cover layer 170. In this implementation, the cover layer 170 is: arranged over the touch and haptics PCBA; and bonded to the baseplate 166 to define a perimeter zone about perimeter side edges of the baseplate 166. The foam insert is arranged about the perimeter zone and configured to fill a void between the cover layer 170 and the chassis 192. Therefore, the system 100 can reduce exposure of the trackpad module to moisture and/or dust particles when integrating the trackpad module with a computing device.

10.5.2 Sealing Element: Tape

Figure 6:
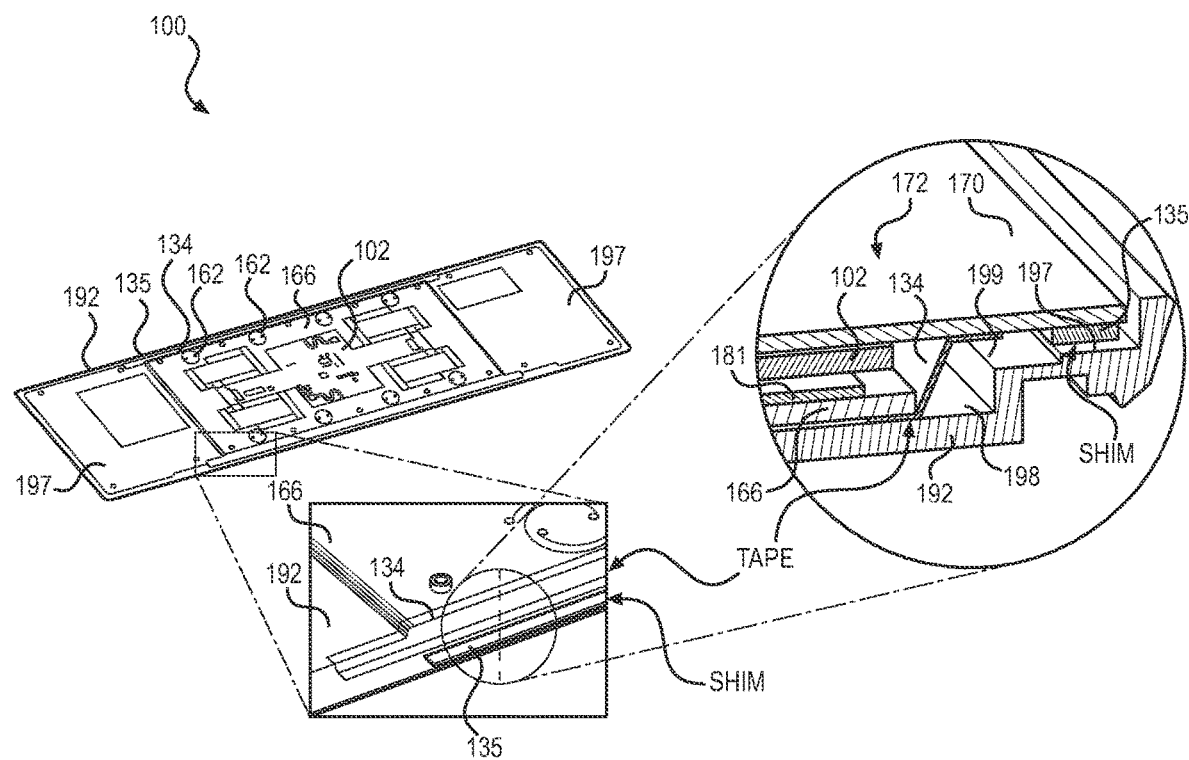
FIG. 6 is a schematic representation of one variation of the system.
Figure 7:
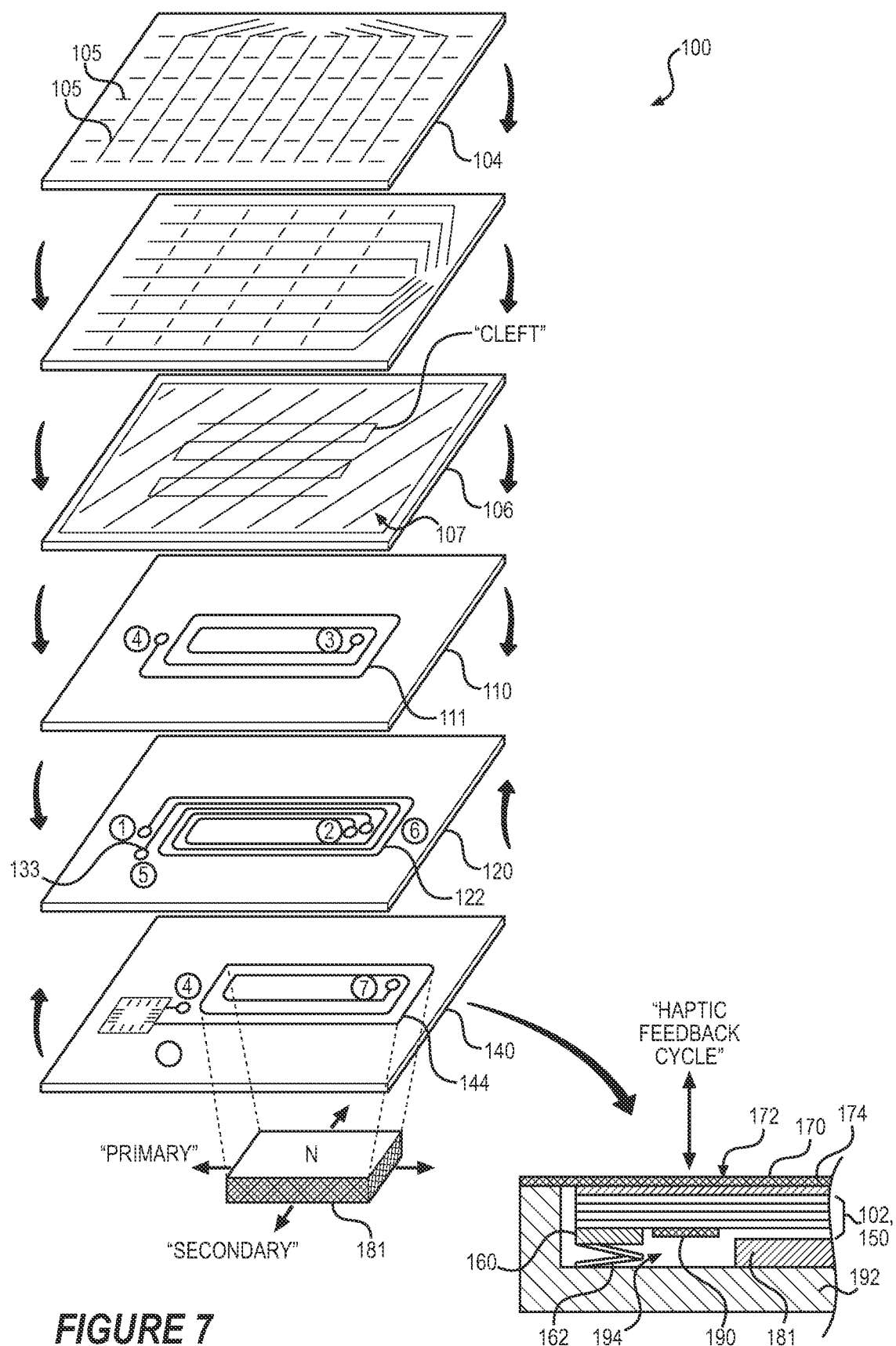
FIG. 7 is a schematic representation of one variation of the system.
Figure 8:
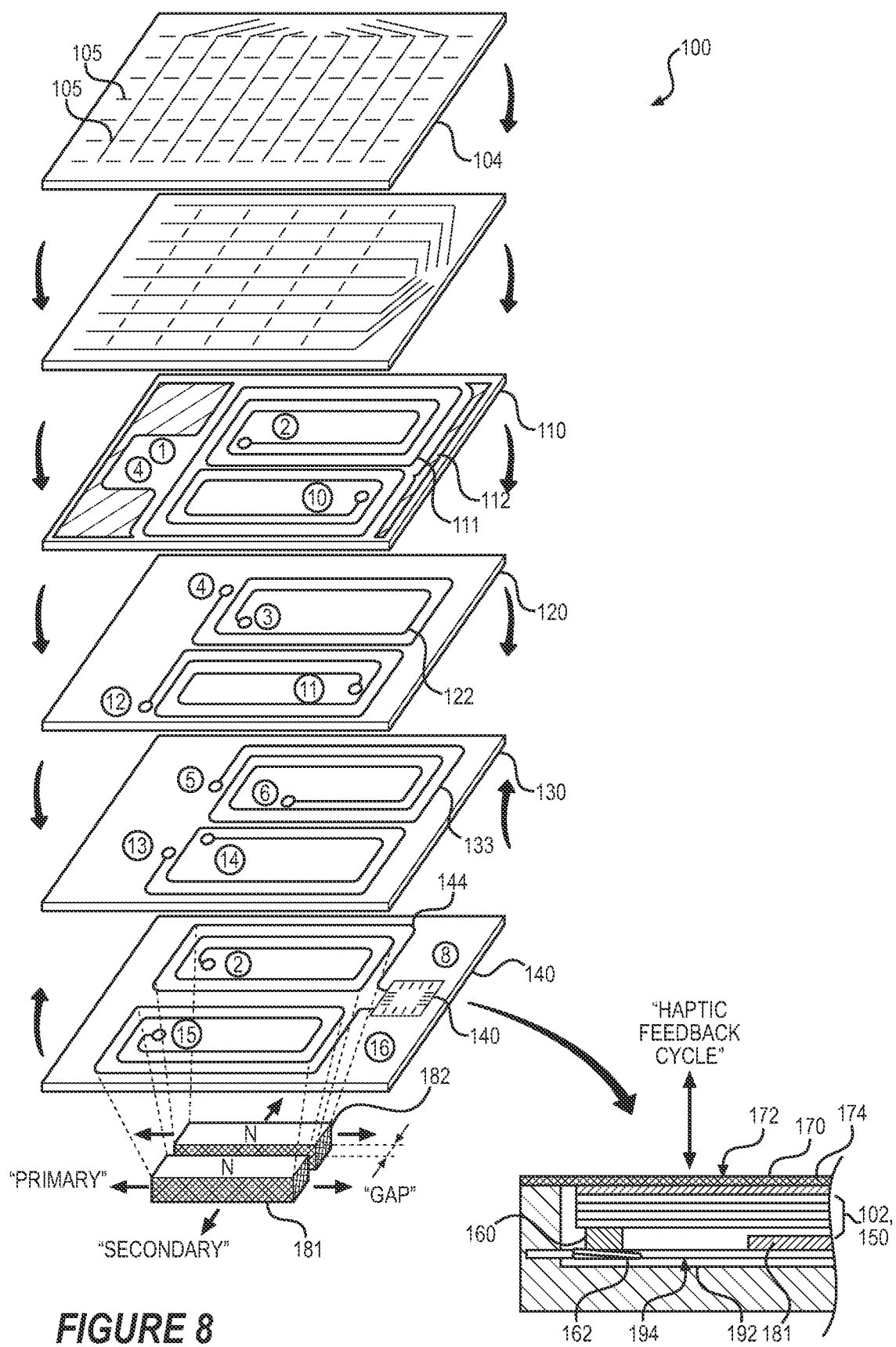
FIG. 8 is a schematic representation of one variation of the system.
Figure 9:
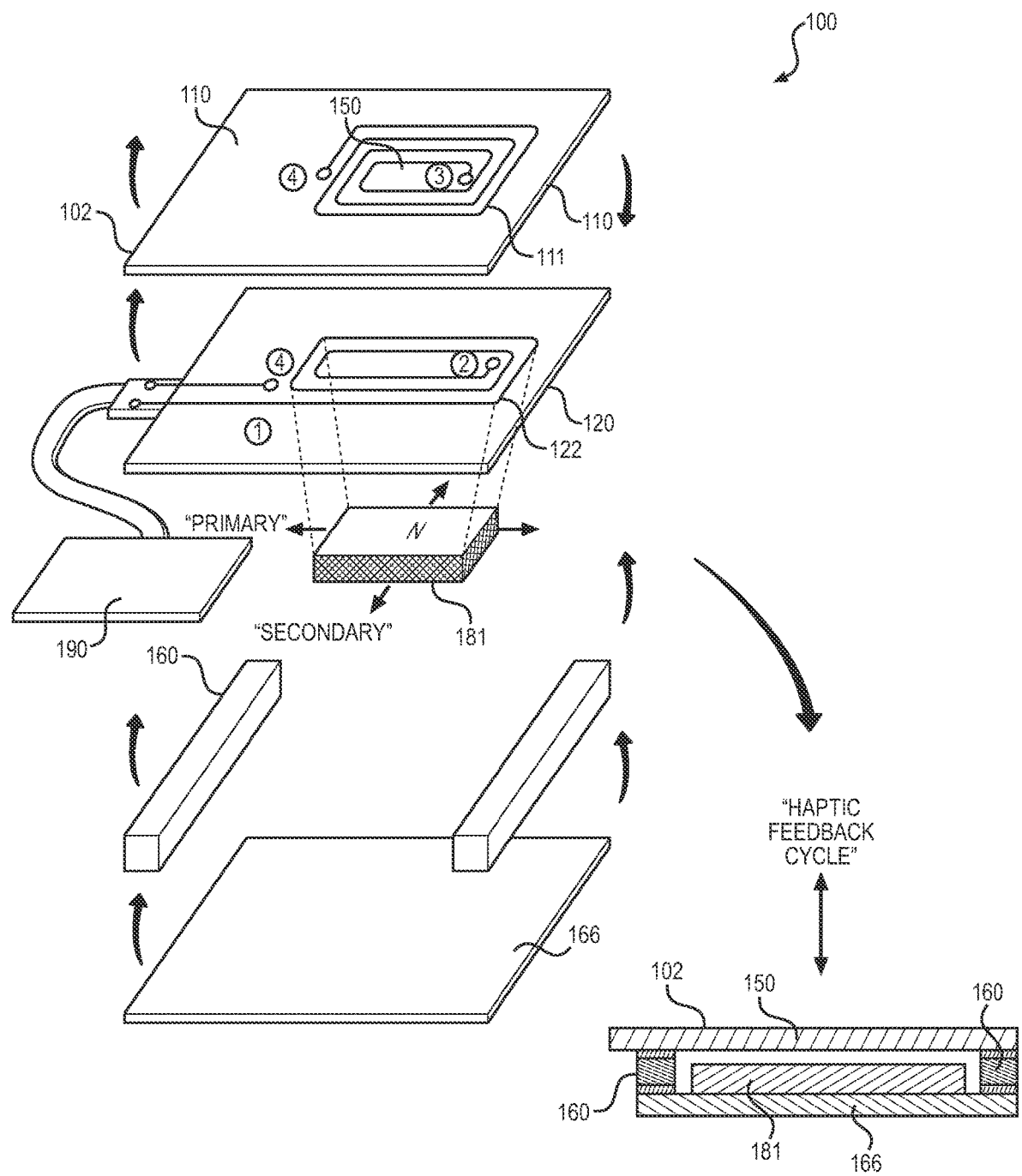
FIG. 9 is a schematic representation of one variation of the system.
Figure 10A:
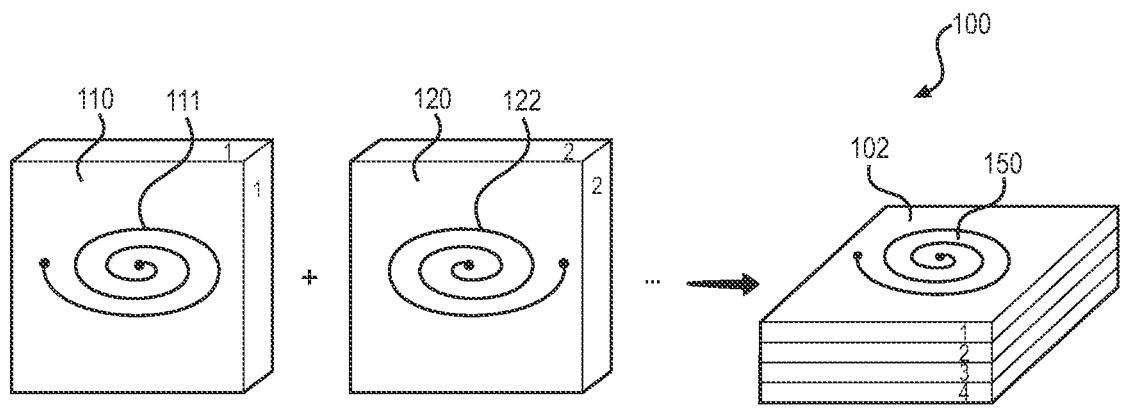
FIGS. 10A and 10B are schematic representations of one variation of the system.
Figure 10B:
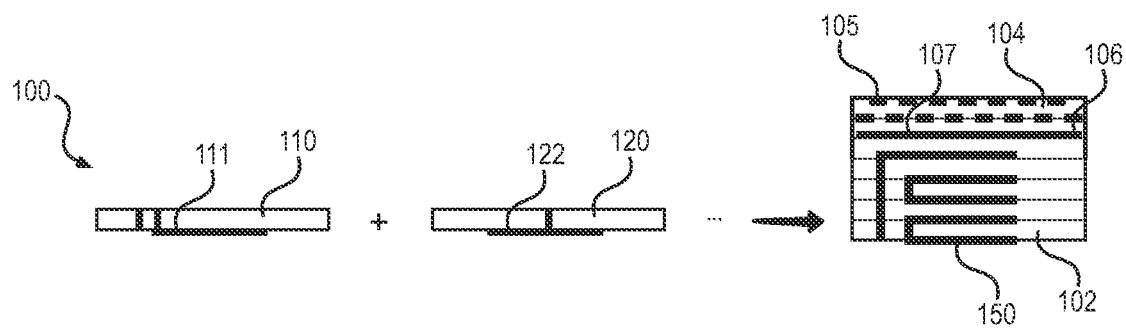
Figure 11:
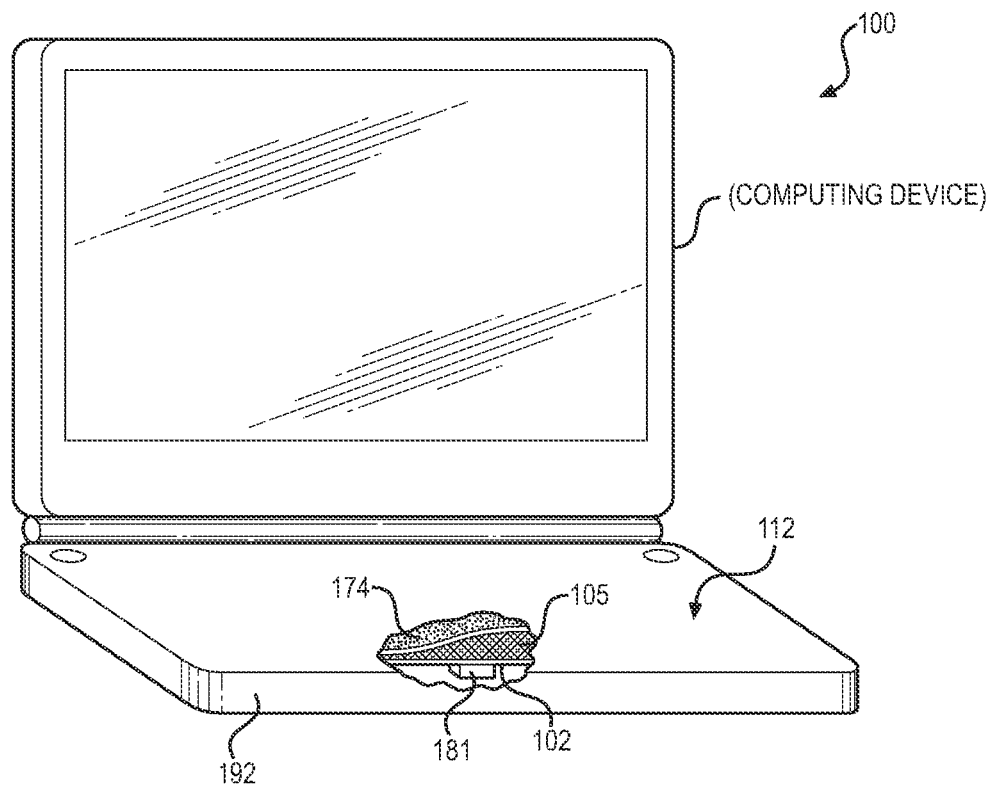
FIG. 11 is a schematic representation of one variation of the system.
Figure 12:
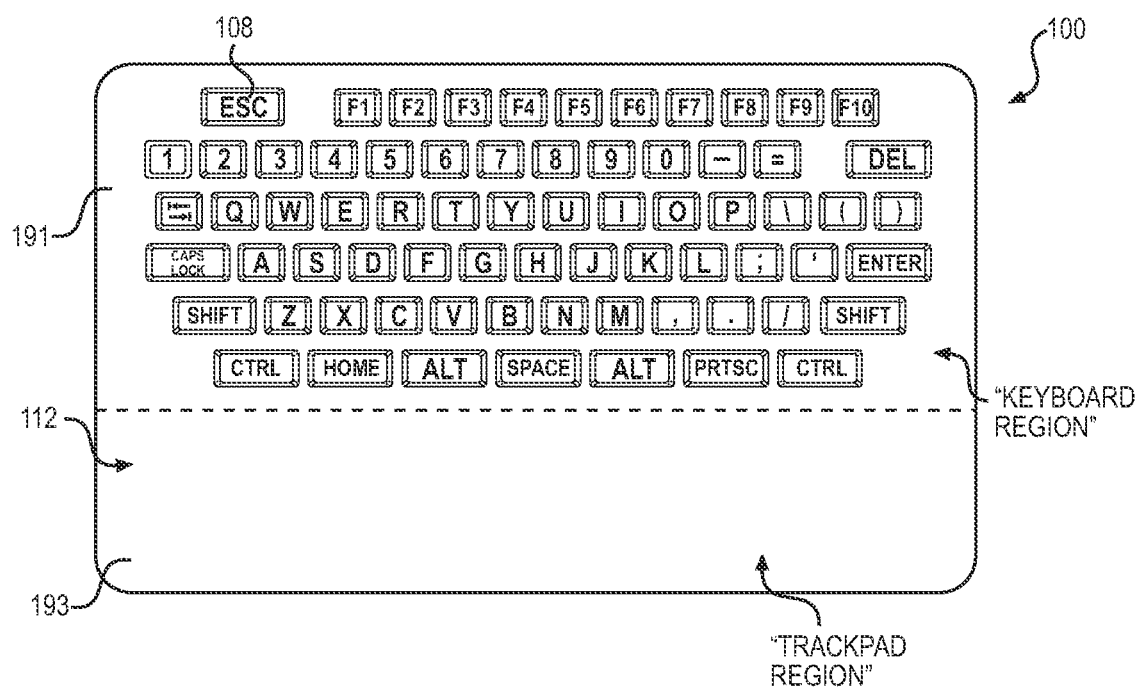
FIG. 12 is a schematic representation of one variation of the system.
Figure 13A:
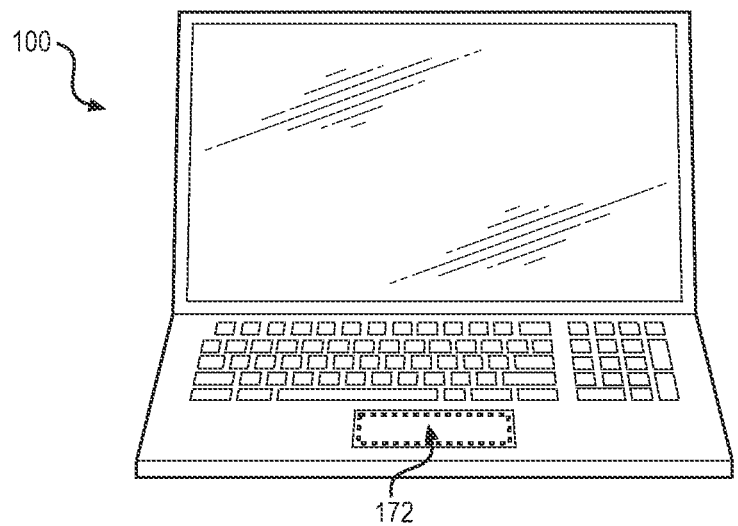
FIGS. 13A, 13B, and 13C are schematic representations of one variation of the system.
Figure 13B:
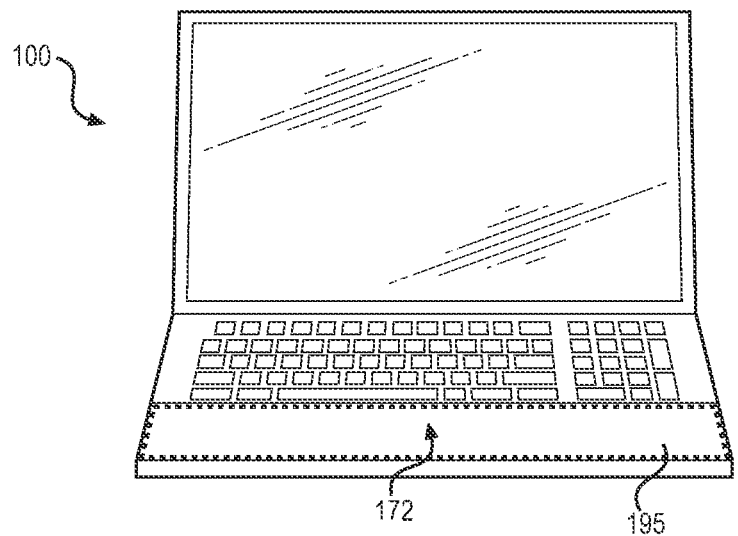
Figure 13C:
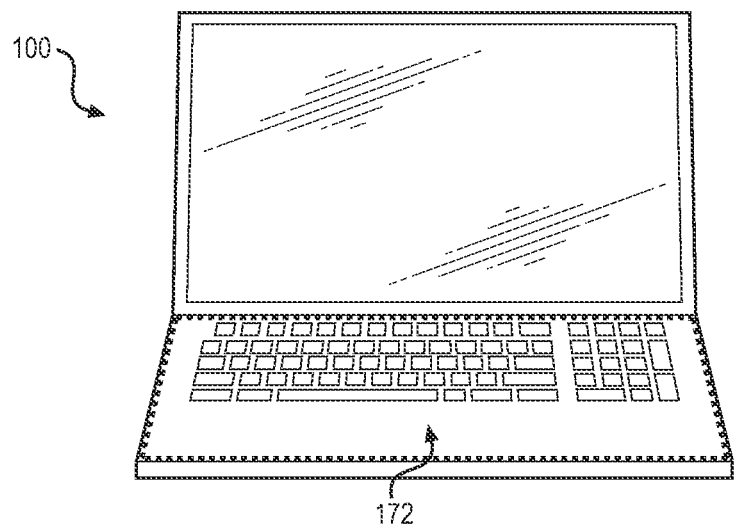
Figure 14:
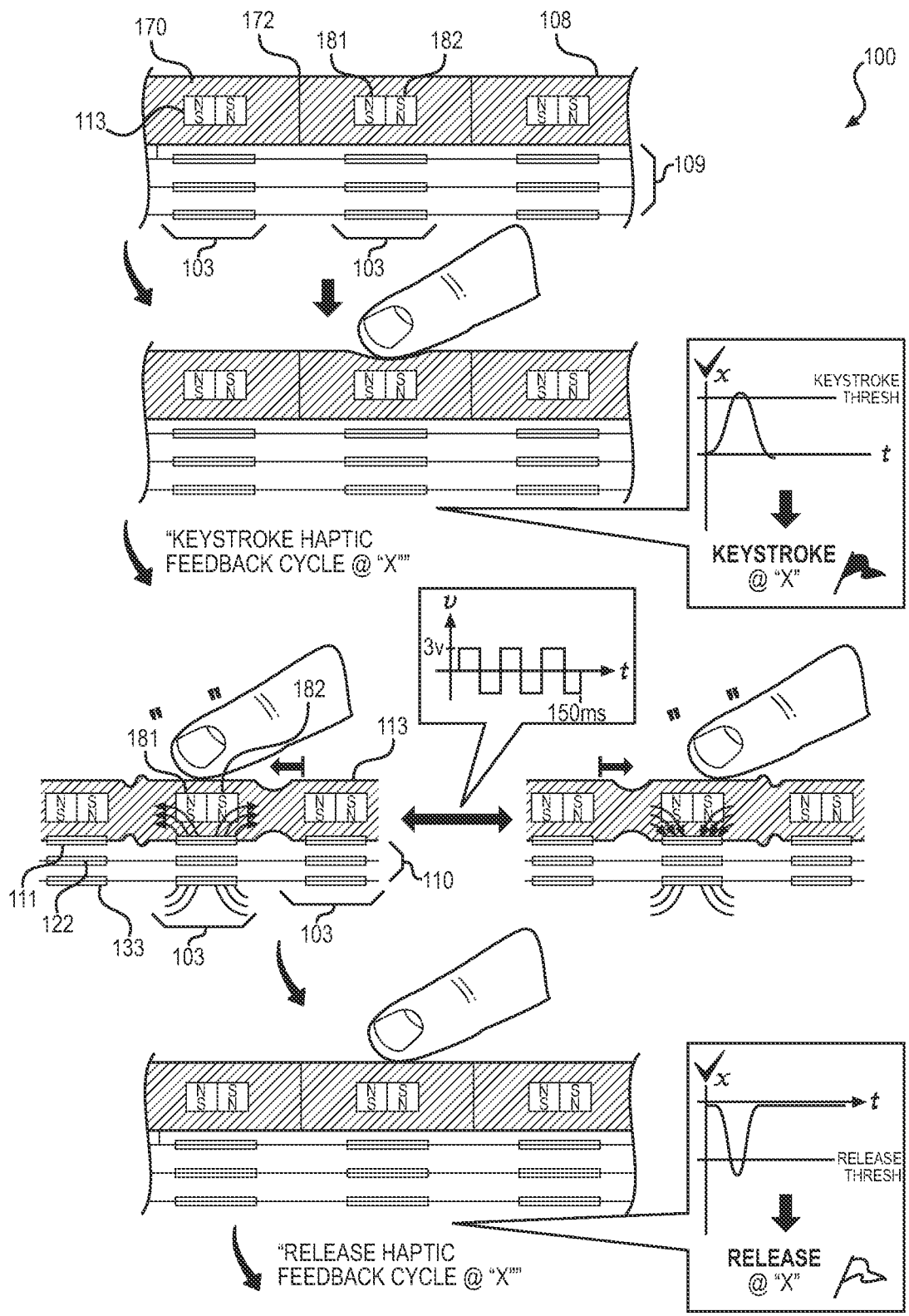
FIG. 14 is a flowchart representation of one variation of the system.
Figure 15:
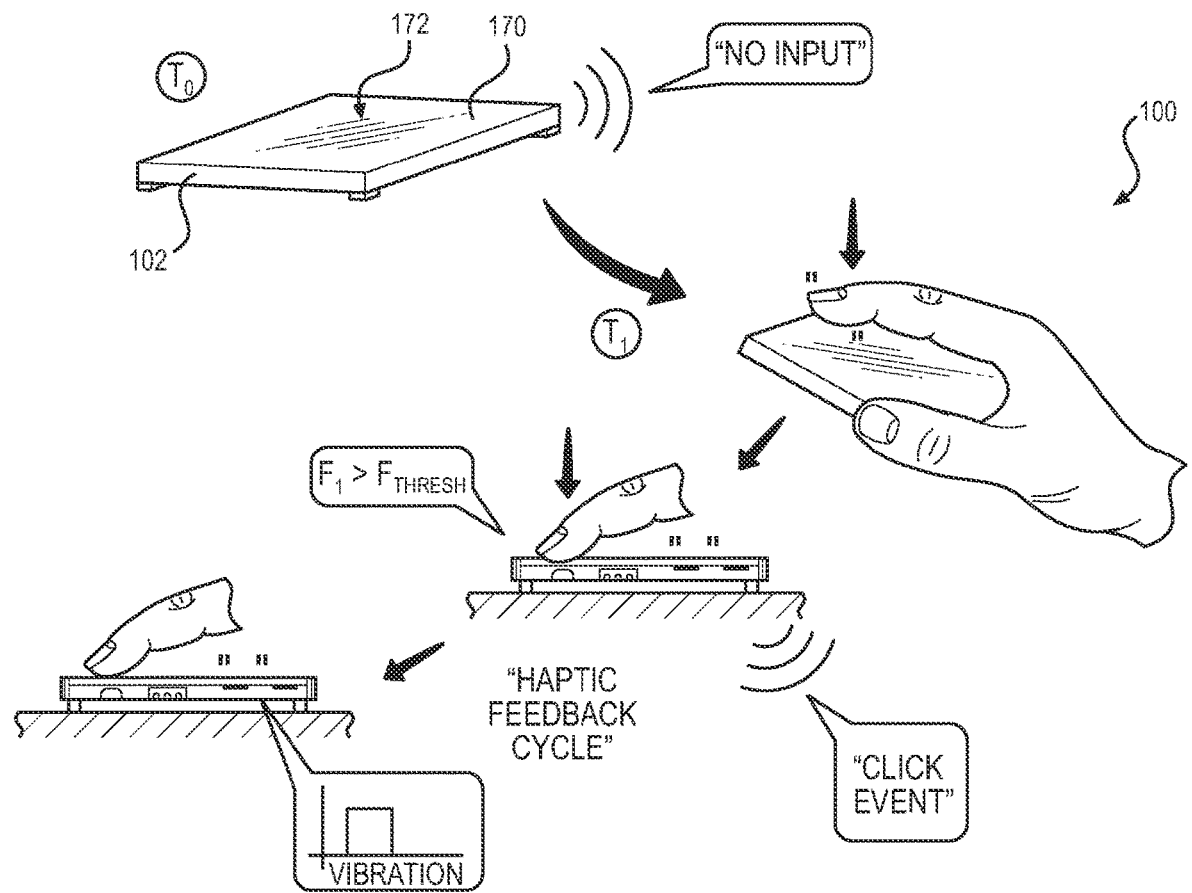
FIG. 15 is a flowchart representation of one variation of the system.
Figure 16:
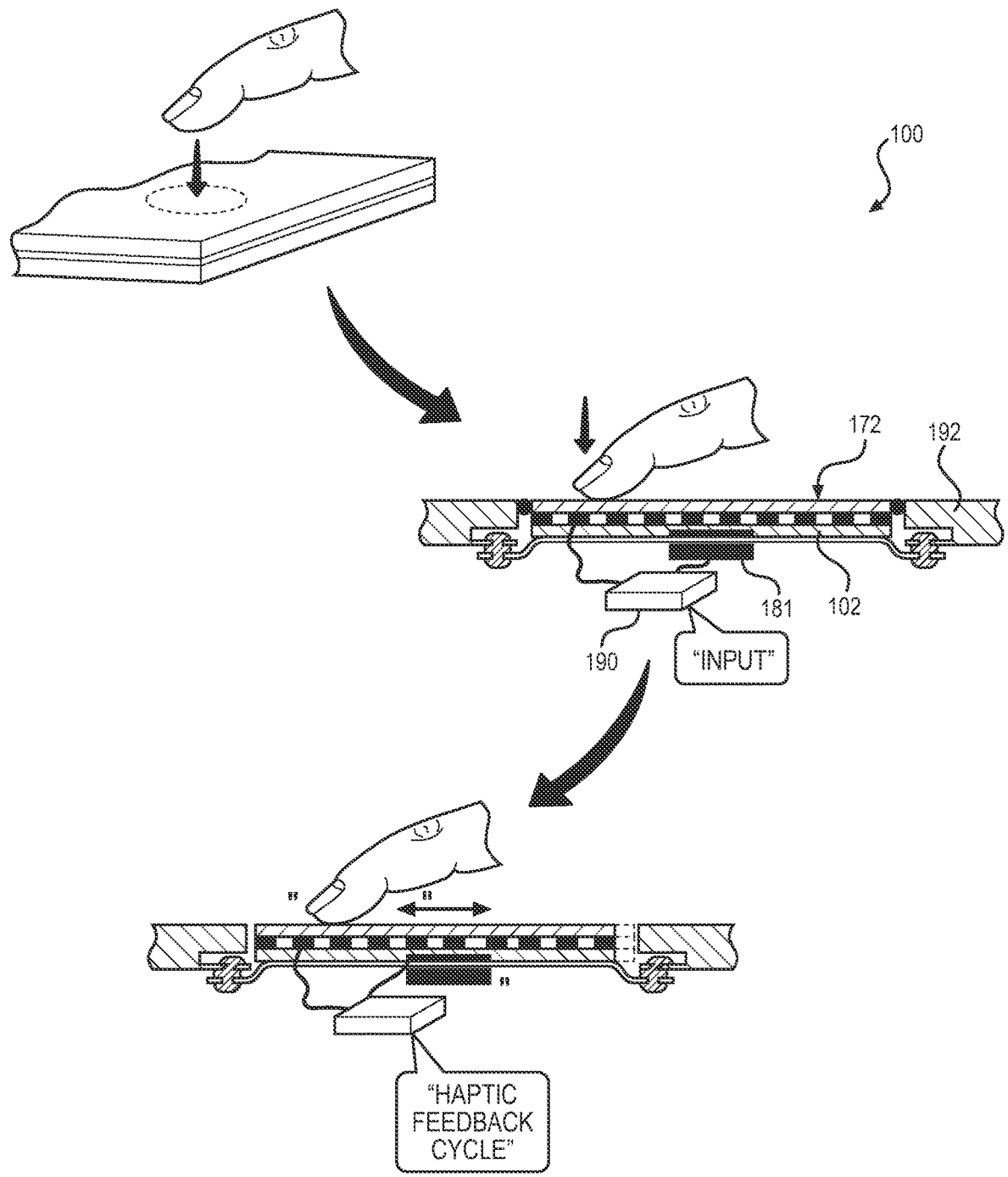
FIG. 16 is a flowchart representation of one variation of the system.
Figure 17:
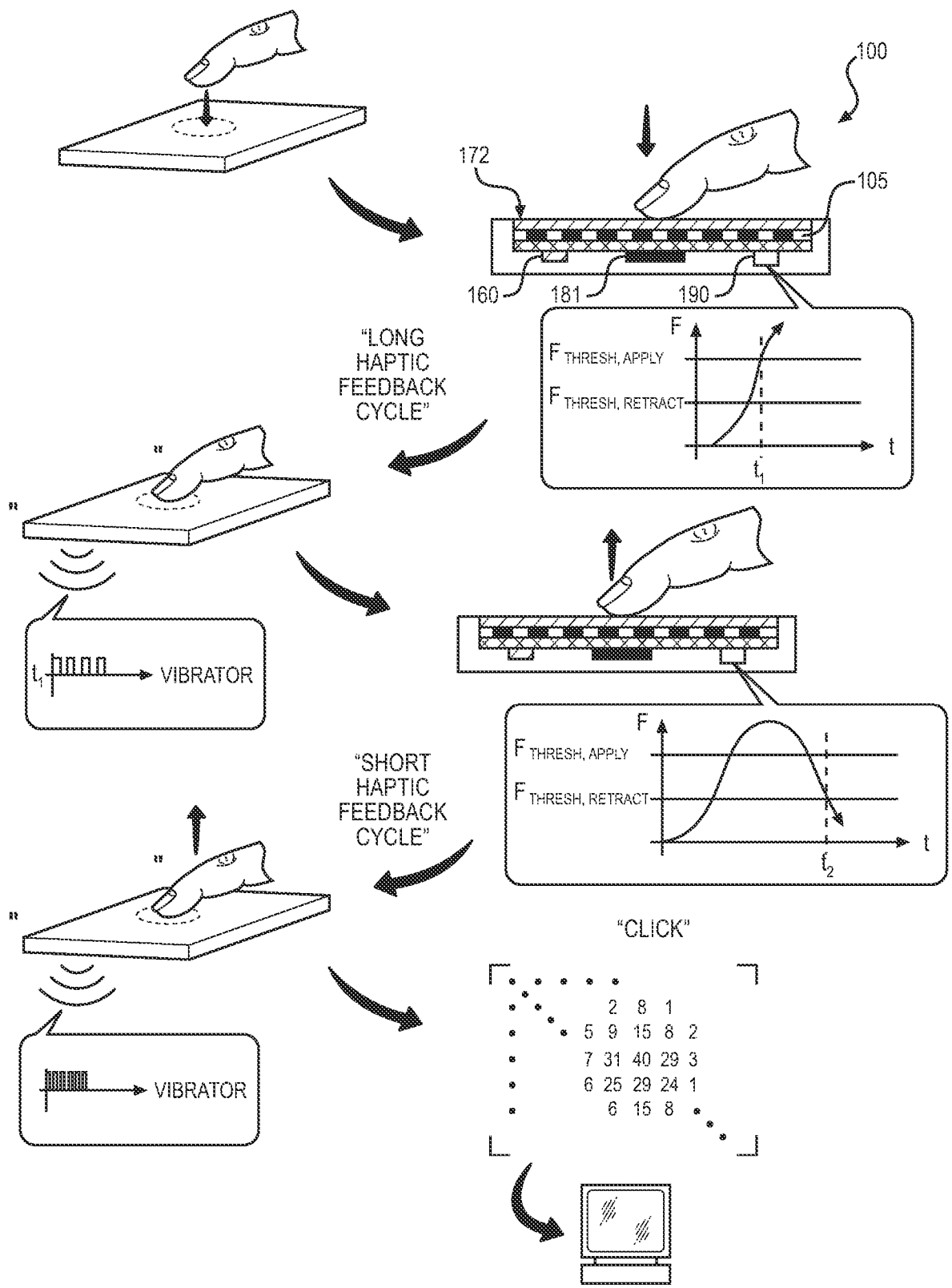
FIG. 17 is a flowchart representation of one variation of the system.
Figure 18:
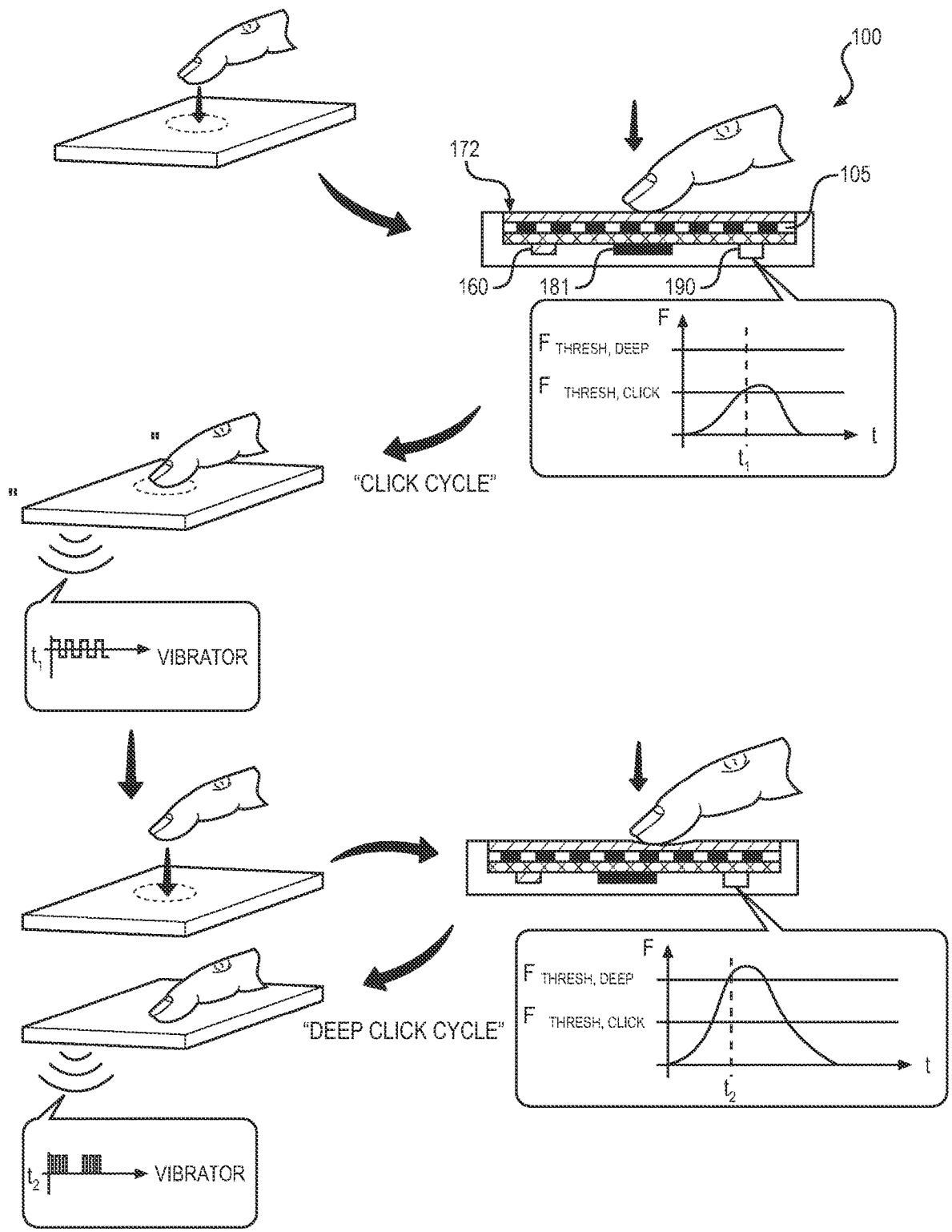
FIG. 18 is a flowchart representation of one variation of the system.
Figure 19:
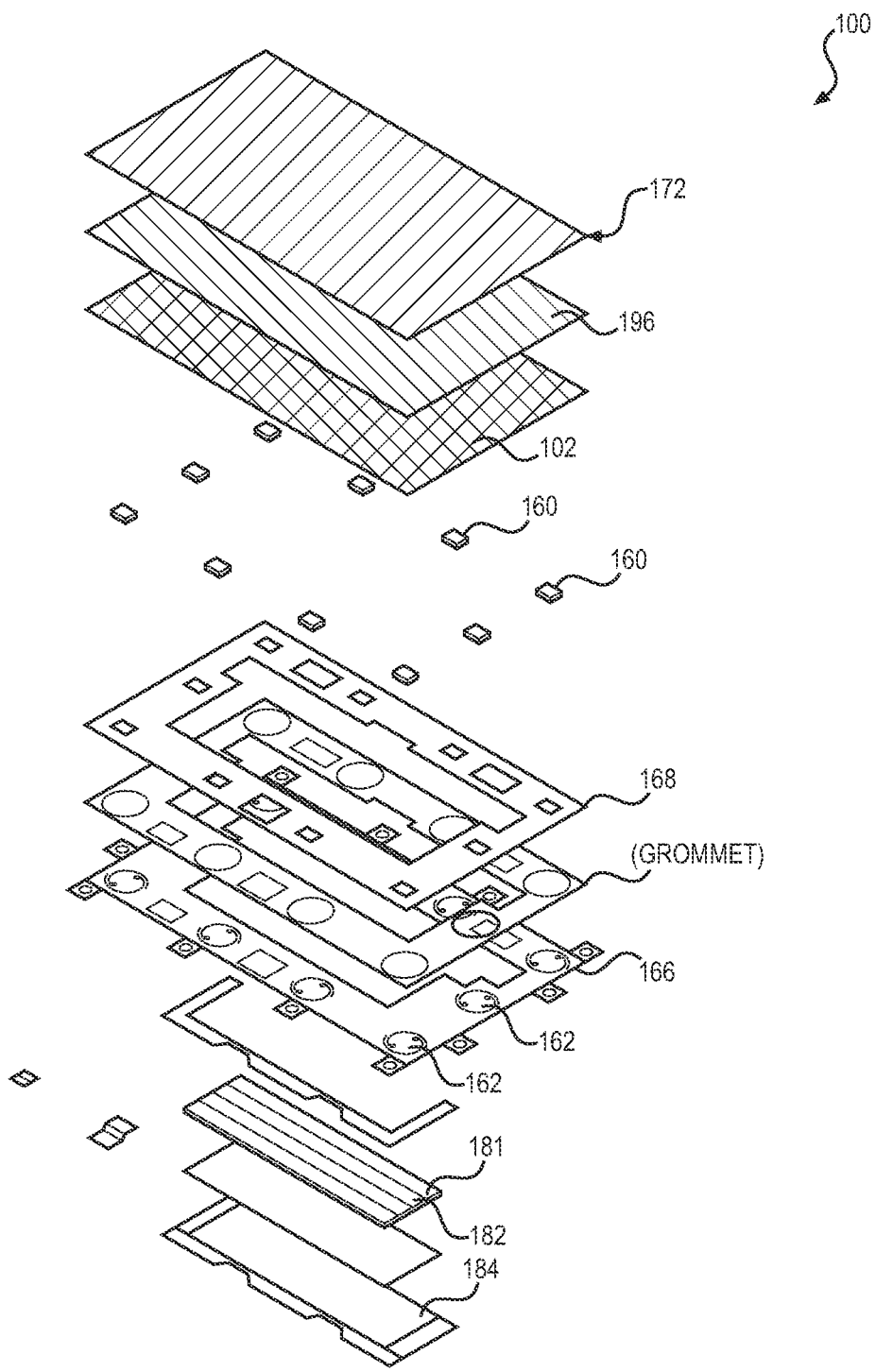
FIG. 19 is a schematic representation of one variation of the system.
Figure 20:
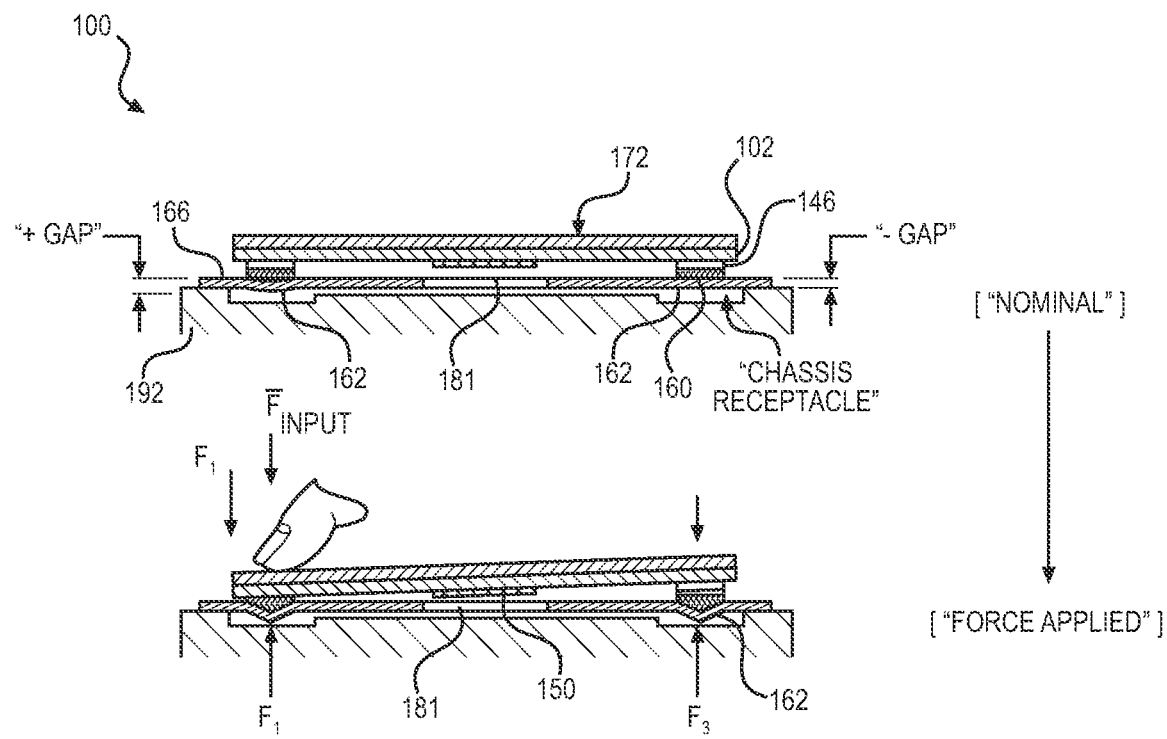
FIG. 20 is a flowchart representation of one variation of the system.

In one implementation shown in FIGS. 6 and 7, the sealing element includes a tape section 134 (e.g., solid tape, single-sided adhesive tape, double-sided adhesive tape) arranged partially about a perimeter of the baseplate 166 and adhered to a bottom surface of the cover layer 170. The foregoing implementation further includes a shim 135 (e.g., a strip of carbon steel, alloy steel, spring steel, stainless steel, brass, compressible rubber, plastic, foam, and/or metal mesh) arranged about a perimeter of the cover layer 170 configured to support the cover layer 170 on a chassis 192 for a computing device and attenuate glass deflection for touch inputs of high force magnitudes.

In one example, the cover layer 170 is: arranged over the touch and haptics PCBA; and bonded to the baseplate 166 to define a perimeter zone—exposing openings of the baseplate 166—about edges of the baseplate 166 and the bottom surface of the cover layer 170. In this example, the cover layer 170 extends entirely across the baseplate 166 to define the perimeter zone. The tape section 134 includes: a first portion adhered to a bottom surface of the baseplate 166; and a second portion adhered to the bottom surface of the cover layer 170 thereby sealing the exposed openings of the baseplate 166. In one variation, the tape section 134 extends entirely about the perimeter zone of the baseplate 166 and the cover layer 170. In another variation, the tape section 134 extends partially about the perimeter zone of the base plate and the glass plate, such as, about opposing perimeter sides of the perimeter zone.

In the foregoing example, the shim 135 is: arranged (e.g., bonded by a PSA) on a bottom surface of the cover layer 170; located about perimeter side ends of the cover layer 170; and configured to support deflecting regions the cover layer 170 on a chassis 192 of a computing device. In one variation, the shim 135 extends entirely about the perimeter of the cover layer 170. In another variation, the shim 135 extends partially about the perimeter of the glass plate, such as, about opposing perimeter sides of the glass plate supported on the chassis 192 of the mobile computing device.

Therefore, the tape section 134 reduces exposure of the touch and haptics PCBA to moisture and/or dust particles when integrated into a trackpad module. In this implementation, the tape section 134 can be integrated as an alternative sealing element to the foam insert to improve: accuracy of force inputs applied to the cover layer 170; and peak to peak haptic magnitudes delivered across the glass surface. Additionally, the shim 135 supports the glass to limit deflection of the cover layer 170 without attenuating vibrations for input forces of low magnitude.

10.6 Example: Trackpad+Keyboard Integration

In one example, the system 100 can form a trackpad and keyboard computer interface that includes a continuous touch sensor surface 172 defining a trackpad region and a keyboard region 191. In this example, the cover layer 170 spans across a top end of a chassis 192 (e.g., laptop chassis 192) to define the continuous surface.

In this example, the chassis 192 can include: a touchpad region 193; and a keyboard region 191 arranged adjacent the touchpad region 193. The touchpad region 193 includes: a first support region 197 defining a nominal plane; and a first cavity 198 inset from the nominal plane and locating the baseplate 166 within the chassis 192. The keyboard region 191 includes: a second support region 197—arranged adjacent the first support region 197—aligned with the nominal plane; and a second cavity 198 inset from the nominal plane. In this example, the cover layer 170 spans entirely across the touchpad region 193 and the keyboard region 191 of the chassis 192 to define a continuous surface. Additionally, the cover layer 170 includes: the first inactive touch region 176 coupled to the first support region 197 on the trackpad region of the chassis 192; a second inactive touch region 176—arranged adjacent the first inactive touch region 176—and coupled to the second support region 197 on the keyboard region 191 of the chassis 192; and a second active touch region 175 defining an array of key locations 108 over the keyboard region 191 on the chassis 192.

In this example, the system 100 further includes a second substrate 109: arranged within the second cavity 198 of the chassis 192; and including an array of inductors 103. Additionally, the second active touch region 175 of the cover layer 170: is arranged over the second substrate 109; and defines the array of key locations 108 over the array of inductors 103. The system 100 further includes a magnetic element 181: configured to inductively couple to an adjacent inductor in the array of inductors 103; and configured to move relative to the adjacent inductor responsive to application of a force at a key location 108, in the array of key locations 108, on the second active touch region 175 of the cover layer 170. Thus, the system 100 can include an array of magnetic element 113—including the magnetic element 181—facing the substrate 102 and configured to inductively couple the array of inductors 103.

Therefore, the system 100 can: read electrical values from the array of inductors 103; and detect a change in electrical value at a first inductor, in the array of inductors 103 based on the electrical values. The system 100 can then, in response to detecting a first change in electrical value at a first inductor, in the array of inductors 103: register a first keystroke of a first key type associated with a first key location 108—in the array of key locations 108—defined over the first inductor; and drive an oscillating voltage across the first inductor during a first haptic feedback cycle. Thus, the system 100: induces alternating magnetic coupling between the first inductor and a first magnetic element 181—in the array of magnetic elements 113—arranged proximal the first key location 108 on the second active touch region 175 of the cover layer 170; and oscillate the second active touch region 175, at the first key location 108, relative to the second substrate 109.

10.7 Example: Display Integration

In one example, the system 100 can include: a display element 195 arranged below the cover layer 170 and in alignment with the active touch region 175; and the set of drive and sense electrode pairs 105 arranged across the display element 195. Thus, the system 100: forms a mobile device defining a seamless touch sensor surface 172 (e.g., complex, flat); and can trigger haptic feedback cycles to oscillate the seamless touch sensor surface 172 responsive to applications of touch inputs on the active touch region 175.

In another example, the cover layer 170 includes a second active touch region 175: arranged opposite the first active touch region 175; and formed of a transparent material. Additionally, the system 100 can include a display element 195: arranged below the cover layer 170; and extending across the second active touch region 175 of the cover layer 170. Thus, the system 100 can: include the display element 195 arranged proximal the active touch region 175; and can output display elements 195 (e.g., images, prompts) responsive to user inputs on the touch sensor surface 172. For example, the system 100 can: read a first set of electrical values between drive electrodes and sense electrodes in the first set of drive and sense electrode pairs 105; generate a first touch image representing a lateral position and a longitudinal position of the first touch input on the first active touch region 175 of the continuous touch sensor surface 172 based on the first set of electrical values; and output a first touch image at the display element 195 representing the first location of the first input on the cover layer 170.

10.8 Example: Vehicle Integration

In one implementation, the system 100: includes the cover layer 170 arranged within a vehicle, such as at a display element 195 in the vehicle, at a steering wheel 123, and/or at the arm rest of the vehicle; and is configured to—responsive to control inputs received by an operator within the vehicle—deliver haptic feedback to the operator and/or passenger within the vehicle.

In this example, the system 100 includes a steering wheel 123 including: a rim 125 rotatable about a first axis to steer a vehicle; and a hub 124 coupled to the rim 125 and defining a cavity 198. In this example, the substrate 102 and the baseplate 166 are arranged within the cavity 198. The system 100 can then include the cover layer 170: extending across a front face of the hub 124; and defining a first key location 108 within the first active touch region 175 of the cover layer 170. Thus, the system 100 can: in response to detecting the first touch input at the touch sensor surface 172, register a first keystroke of a first key type (e.g., volume control, cruise control) associated with the first key location 108 defined over the first haptic actuator. Additionally and/or alternatively, the system 100 can include the cover layer 170 arranged at other target locations at the vehicle, such as at an arm rest, center console, doors, and/or infotainment display.

The system 100s and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other system 100s and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions. As a person skilled in the art will recognize from the previous detailed description and from the figures and claims, modifications and changes can be made to the embodiments of the invention without departing from the scope of this invention as defined in the following claims.

We claim:

1. A system for a seamless touch sensor comprising:
a substrate comprising:
   a top layer comprising a first set of drive and sense electrode pairs arranged across the top layer; and
   a bottom layer arranged below the top layer and comprising an array of force sensors arranged across the bottom layer;
a baseplate:
   arranged below the substrate; and
   comprising an array of spring elements coupling the baseplate to the bottom layer of the substrate, the array of spring elements configured to yield to displacement of the substrate responsive to forces applied over the substrate;
a first haptic actuator arranged below the substrate and comprising:

a first multi-layer inductor; and
a first magnetic element defining a first polarity facing the first multi-layer inductor;
a cover layer:
arranged over the substrate to define a continuous touch sensor surface spanning across the substrate and the baseplate; and
coupled to the top layer of the substrate to define a first active touch region and a first inactive touch region on the continuous touch sensor surface; and
a controller configured to, in response to detecting a first input at the first active touch region on the continuous touch sensor surface, drive an oscillating voltage across the multi-layer inductor to:
induce alternating magnetic coupling between the multi-layer inductor and the first magnetic element; and
oscillate the first active touch region of the cover layer relative to the first magnetic element.

2. The system of claim 1:
wherein the substrate further comprises a set of inductor layers:
arranged below the top layer of the substrate; and
comprising:
a first layer comprising a first spiral trace coiled in a first direction; and
the bottom layer arranged below the first layer and comprising a second spiral trace:
coiled in a second direction opposite the first direction;
coupled to the first spiral trace; and
cooperating with the first spiral trace to form the first multi-layer inductor of the first haptic actuator;
wherein the first magnetic element:
is arranged below the bottom layer of the substrate; and
is coupled to the baseplate to locate the first magnetic element facing the first multi-layer inductor; and
wherein the controller is configured to, in response to detecting the first input at the first active touch region, drive an oscillating voltage across the first spiral trace and the second spiral trace to:
induce alternating magnetic coupling between the multi-layer inductor and the first magnetic element; and
oscillate the first active touch region of the cover layer normal to the first magnetic element.

3. The system of claim 1:
wherein the first haptic actuator:
is arranged at a first location on the baseplate locating the first haptic actuator proximal a lateral edge of the first active touch region of the continuous touch sensor surface; and
comprises:
a set of inductor layers comprising:
a first layer coupled to the bottom layer of the substrate and comprising a first spiral trace coiled in a first direction; and
a second layer arranged below the first layer and comprising a second spiral trace:
coiled in a second direction opposite the first direction;
coupled to the first spiral trace; and
cooperating with the first spiral trace to form the first multi-layer inductor; and
the first magnetic element arranged below the second layer and defining the first polarity facing the first multi-layer inductor; and
wherein the controller is configured to, in response to detecting the first input proximal the lateral edge at the first active touch region, drive an oscillating voltage across the first spiral trace and the second spiral trace to:
induce alternating magnetic coupling between the multi-layer inductor and the first magnetic element; and
oscillate the first active touch region of the cover layer normal to the first magnetic element.

4. The system of claim 1:
further comprising an array of haptic actuators, including the first haptic actuator, arranged below the substrate and each haptic actuator, in the array of haptic actuators:
arranged proximal a lateral edge of the baseplate to locate the haptic actuator proximal a lateral edge of the first active touch region on the continuous touch sensor surface; and
coupled to the bottom layer of the substrate; and
wherein the controller is configured to:
read a set of electrical values from the first set of drive and sense electrode pairs;
interpret the first touch input proximal a first lateral edge on the first active touch region of the continuous touch sensor surface based on the set of electrical values; and
in response to interpreting the first touch input proximal the first lateral edge on the first active touch region, drive an oscillating voltage at the first haptic actuator, in the array of haptic actuators, proximal the first touch input to induce oscillations on the first active touch region proximal the first lateral edge.

5. The system of claim 1:
further comprising a chassis arranged below the cover layer, the chassis comprising:
a first support region defining a nominal plane;
a second support region, arranged opposite the first support region, aligned with the nominal plane; and
a cavity:
interposed between the first support region and the second support region;
inset from the nominal plane; and
locating the baseplate within the chassis; and
wherein the cover layer:
spans entirely across a top end of the chassis to define a continuous surface;
comprises the first inactive touch region coupled to the first support region on the chassis to define a first transition region on the cover layer:
interposed between the first inactive touch region and a first lateral edge of the first active touch region; and
configured to oscillate responsive to alternating magnetic coupling between the multi-layer inductor and the first magnetic element; and
comprises a second inactive touch region, arranged opposite the first inactive touch region, coupled to the second support region on the chassis to define a second transition region on the cover layer:
interposed between the second inactive touch region and a second lateral edge, opposite the first lateral edge, of the first active touch region; and configured to oscillate responsive to alternating magnetic coupling between the multi-layer inductor and the first magnetic element.

6. The system of claim 5:
wherein the chassis further comprises a first lead-in feature:
arranged proximal a first lateral edge of the first support region; and
defining a first tapered surface transitioning from the first lateral edge of the first support region downward toward a bottom surface of the cavity; and
wherein the cover layer comprises the first transition region extending across the first lead-in feature of the chassis, the first transition region cooperating with the first lead-in feature to vertically oscillate the first active touch region responsive to alternating magnetic coupling between the multi-layer inductor and the first magnetic element.

7. The system of claim 6:
further comprising a second substrate:
arranged within the second cavity of the chassis; and
comprising an array of inductors;
wherein the second active touch region of the cover layer:
is arranged over the second substrate; and
defines the array of key locations over the array of inductors;
further comprising an array of magnetic elements, each magnetic element in the array of magnetic elements:
arranged over the array of inductors;
configured to inductively couple to an adjacent inductor in the array of inductors; and
configured to move relative to the adjacent inductor responsive to application of a force at a key location, in the array of key locations, on the second active touch region of the cover layer; and
wherein the controller is configured to:
read electrical values from the array of inductors; and
at a first time, in response to detecting a first change in electrical value at a first inductor, in the array of inductors:
register a first keystroke of a first key type associated with a first key location, in the array of key locations, defined over the first inductor; and
drive an oscillating voltage across the first inductor during a first haptic feedback cycle to:
induce alternating magnetic coupling between the first inductor and a first magnetic element, in the array of magnetic elements, arranged proximal the first key location on the second active touch region of the cover layer; and
oscillate the second active touch region, at the first key location, relative to the second substrate.

8. The system of claim 5, further comprising an array of light elements defining an indicator about a periphery of the first active touch region on the cover layer, each light element in the array of light elements:
arranged on the top layer of substrate adjacent a lateral edge of the substrate;
facing the first active touch region of the cover layer; and
configured to illuminate a periphery of the first active touch region on the cover layer.

9. The system of claim 1:
further comprising a chassis comprising:
a touchpad region comprising:
a first support region defining a nominal plane; and
a first cavity inset from the nominal plane and locating the baseplate within the chassis; and
a keyboard region comprising:
a second support region, arranged adjacent the first support region, aligned with the nominal plane; and
a second cavity inset the nominal plane; and
wherein the cover layer:
spans entirely across the touchpad region and the keyboard region of the chassis to define a continuous surface; and
comprises:
the first inactive touch region coupled to the first support region on the trackpad region of the chassis;
a second inactive touch region, arranged adjacent the first inactive touch region, and coupled to the second support region on the keyboard region of the chassis; and
a second active touch region, opposite the first active touch region, and defining an array of key locations over the keyboard region on the chassis.

10. The system of claim 1:
wherein the cover layer further comprises:
a second active region:
arranged opposite the first active touch region; and
comprising a transparent material;
further comprising a display element:
arranged below the cover layer; and
extending across the second active region of the cover layer; and
wherein the controller is configured to:
read a first set of electrical values between drive electrodes and sense electrodes in the first set of drive and sense electrode pairs;
generate a first touch image representing a lateral position and a longitudinal position of the first touch input on the first active touch region of the continuous touch sensor surface based on the first set of electrical values; and
output a first touch image at the display element representing the first location of the first input on the cover layer.

11. The system of claim 1:
further comprising a steering wheel comprising:
a rim rotatable about a first axis to steer a vehicle; and
a hub coupled to the rim and defining a cavity;
wherein the substrate and the baseplate are arranged within the cavity;
wherein the cover layer:
extends across a front face of the hub; and
defines a first key location within the first active touch region of the cover layer; and
wherein the controller is configured to, in response to detecting the first touch input at the touch sensor surface, register a first keystroke of a first key type associated with the first key location defined over the first haptic actuator.

12. The system of claim 1, wherein the controller is configured to:
read a first set of electrical values between drive electrodes and sense electrodes in the first set of drive and sense electrode pairs;
read a second set of electrical values from the array of force sensors on the substrate;
detect a lateral position and a longitudinal position of the first touch input on the first active touch region of the continuous touch sensor surface based on the first set of electrical values;

interpret a first force magnitude of the first touch input based on the second set of electrical values from the array of force sensors; and in response to the first force magnitude deviating from a target force magnitude, drive the oscillating voltage across the multi-layer inductor to:
- induce alternating magnetic coupling between the multi-layer inductor and the first magnetic element; and
- oscillate the first active touch region of the cover layer relative to the first magnetic element.

13. The system of claim 1:
- wherein the bottom layer of the substrate defines an array of support locations arranged proximal lateral edges of the substrate;
- wherein the array of force sensors comprises a first set of sense electrodes arranged proximal the support locations on the bottom layer of the substrate;
- wherein the baseplate comprises a first set of drive electrodes arranged across a top surface of the baseplate facing the bottom layer of the substrate; and
- further comprising a set of spacers:
  - arranged at the array of support locations on the bottom layer of the substrate;
  - coupling the substrate to the array of spring elements on the baseplate;
  - locating the first set of sense electrodes on the bottom layer in alignment to the first set of drive electrodes on the baseplate to form an array of capacitive force sensors below the substrate; and
  - configured to compress responsive to application of the first touch input on the first active touch region to:
    - locate the bottom layer of the substrate at an offset distance, less than a nominal offset distance, above the top surface of the baseplate; and
    - increase magnetic coupling between the first set of sense electrodes and the second set of drive electrodes.

14. The system of claim 13:
- wherein each spring element, in the array of spring elements:
  - is formed in the baseplate proximal lateral edges of the baseplate;
  - defines a stage coupled to a support location, in the array of support locations, on the bottom layer of the substrate; and
  - is configured to return to approximately a nominal plane in response to absence of a touch input applied to the first active touch region on the touch sensor surface; and
- wherein each sense electrode, in the set of sense electrodes:
  - capacitively couples to an adjacent drive electrode, in the set of drive electrodes, arranged on the baseplate; and
  - moves toward the adjacent drive electrode in response to application of a force on the first active touch region on the touch sensor surface.

15. The system of claim 13, wherein the controller is configured to:
- access a force model representing a relationship between deviation from a baseline electrical value and force carried by the array of spring elements based on a spring constant for the array of spring elements;
- read a set of electrical values from the first set of sense electrodes on the bottom layer of the substrate;
- interpret the first force magnitude of the first touch input based on the first set of electrical values and the force model; and
- in response to the first force magnitude exceeding a threshold force magnitude:
  - interpret the first touch input at the first active touch region on the continuous touch sensor surface; and
  - drive an oscillating voltage across the multi-layer inductor to:
    - induce alternating magnetic coupling between the multi-layer inductor and the first magnetic element; and
    - oscillate the first active touch region of the cover layer relative to the first magnetic element.

16. A system for a seamless touch sensor comprising:
- a substrate comprising:
  - a top layer comprising a first drive and sense electrode pair arranged on the top layer; and
  - a bottom layer arranged below the top layer and comprising a first sense electrode arranged proximal a first support location on the bottom layer;
- a baseplate:
  - arranged below the substrate;
  - defining a first spring element arranged below the first support location;
  - a first spacer element coupling the first spring element to the first support location on the bottom layer, the first spacer element configured to yield to displacement of the substrate responsive to forces applied over the substrate;
  - comprising a first drive electrode arranged on a top surface of the baseplate in alignment within the first sense electrode to form a first force sensor;
- a first haptic actuator coupled to the substrate;
- a cover layer:
  - arranged over the substrate to define a continuous touch sensor surface spanning across the substrate and the baseplate; and
  - coupled to the top layer of the substrate to define a first active touch region and a first inactive touch region encircling the first active touch region on the continuous touch sensor surface; and
- a controller configured to, in response to detecting a first input at the first active touch region on the continuous touch sensor surface, trigger the first haptic actuator to generate normal oscillations across the first active touch region of the cover layer.

17. The system of claim 16:
- wherein the first haptic actuator comprises:
  - a set of inductor layers arranged below the top layer of the substrate, the set of inductor layers comprising:
    - a first layer comprising a first spiral trace coiled in a first direction; and
    - the bottom layer arranged below the first layer and comprising a second spiral trace:
      - coiled in a second direction opposite the first direction;
      - coupled to the first spiral trace; and
      - cooperating with the first spiral trace to form the first multi-layer inductor of the first haptic actuator; and
  - a first magnetic element:
    - arranged below the bottom layer of the substrate; and
    - defining a first polarity facing the first multi-layer inductor; and
- wherein the controller is configured to, in response to detecting the first input at the first active touch region, drive an oscillating voltage across the first spiral trace and the second spiral trace to:
- induce alternating magnetic coupling between the multi-layer inductor and the first magnetic element; and
- oscillate the first active touch region of the cover layer normal to the first magnetic element.

18. The system of claim 16, wherein the controller is configured to:
- read a first electrical value from the first drive and sense electrode pair on the top layer of the substrate;
- interpret a lateral position and a longitudinal position of a first touch input on the first active touch region of the cover layer based on the first electrical value;
- read a second electrical value from the first force sensor on the bottom layer of the substrate;
- interpret a first force magnitude of the first touch input based on the second electrical value; and
- in response to the first force magnitude exceeding a target force magnitude, trigger the first haptic actuator to generate normal oscillations across the first active touch region of the cover layer.

19. The system of claim 16:
further comprising a chassis arranged below the cover layer, the chassis comprising:
- a first support region defining a nominal plane; and
- a cavity inset from the nominal plane and locating the baseplate within the chassis; and wherein the cover layer:
- spans entirely across a top end of the chassis to define a continuous surface;
- comprises the first inactive touch region coupled to the first support region on the chassis to define a first transition region on the cover layer:
  - interposed between the first inactive touch region and the first active touch region; and
  - configured to oscillate responsive to alternating magnetic coupling between the multi-layer inductor and the first magnetic element.

20. A system for a seamless touch sensor comprising:
a substrate comprising:
- a top layer comprising a first set of drive and sense electrode pairs arranged across the top layer; and
- a bottom layer arranged below the top layer and comprising an array of force sensors arranged across the bottom layer;

a baseplate:
- arranged below the substrate;
- comprising an array of spring elements coupling the baseplate to the bottom layer of the substrate; and
- configured to yield displacement of the substrate responsive to forces applied to the touch sensor surface;

a first haptic actuator arranged below the substrate and comprising:
- a first multi-layer inductor; and
- a first magnetic element defining a first polarity facing the first multi-layer inductor;

a cover layer:
- arranged over the substrate to define a continuous touch sensor surface spanning across the substrate and the baseplate; and
- coupled to the top layer of the substrate to define a first active touch region and a first inactive touch region on the continuous touch sensor surface; and a chassis:
- arranged below the cover layer; and
- defining a support region coupling the chassis to the first inactive touch region of the cover layer that defines a first transition region interposed between the first active touch region and the first inactive touch region of the cover layer.

* * * * *